United States Patent
Jeong et al.

(10) Patent No.: US 10,427,982 B2
(45) Date of Patent: Oct. 1, 2019

(54) METHOD OF CARBON COATING ON NANOPARTICLE AND CARBON COATED NANOPARTICLE PRODUCED BY THE SAME

(71) Applicant: KOREA INSTITUTE OF ENERGY RESEARCH, Daejeon (KR)

(72) Inventors: Namjo Jeong, Daejeon (KR); Chan-Soo Kim, Jeju (KR); Ji Yeon Choi, Seoul (KR); Joo-youn Nam, Jeju (KR); Soon-chul Park, Jeju (KR); Moon seok Jang, Daejeon (KR); Kangmin Chon, Busan (KR); Ji-Hyung Han, Jeju (KR); Han-Ki Kim, Jeju (KR); Eun-Jin Jwa, Jeju (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 0 days.

(21) Appl. No.: 15/267,307

(22) Filed: Sep. 16, 2016

(65) Prior Publication Data

US 2017/0081248 A1 Mar. 23, 2017

(30) Foreign Application Priority Data

Sep. 17, 2015 (KR) .................... 10-2015-0131900
Sep. 17, 2015 (KR) .................... 10-2015-0131910
(Continued)

(51) Int. Cl.
*C04B 35/00* (2006.01)
*C04B 35/628* (2006.01)
(Continued)

(52) U.S. Cl.
CPC .......... *C04B 35/62839* (2013.01); *B22F 1/00* (2013.01); *C01B 32/05* (2017.08);
(Continued)

(58) Field of Classification Search
CPC ....... C04B 35/00; C04B 2235/00; B22F 1/00; B22F 9/00; C01B 33/00; H01M 4/00; B05D 1/00; B05D 3/00; B05D 5/00
See application file for complete search history.

(56) References Cited

U.S. PATENT DOCUMENTS

| | | | |
|---|---|---|---|
| 6,531,517 B1 * | 3/2003 | Wachter | B01J 23/8896 208/15 |
| 7,615,097 B2 * | 11/2009 | McKechnie | B01J 2/006 75/346 |

(Continued)

FOREIGN PATENT DOCUMENTS

| | | |
|---|---|---|
| EP | 2712842 | 4/2014 |
| JP | 2012-501951 | 1/2012 |

(Continued)

OTHER PUBLICATIONS

"Synthesis and characterization of larger diameter carbon nanotubes from catalytic pyrolysis of polypropylene", Junhao Zhang, Ju Li, Jie Cao, Yitai Qian, Materials Letters 62 (2008) 1839-1842.*

(Continued)

*Primary Examiner* — David P Turocy
*Assistant Examiner* — Mohammad Mayy
(74) *Attorney, Agent, or Firm* — Lex IP Meister, PLLC

(57) ABSTRACT

A method includes: supplying sources or nanoparticles of any one or two or more combinations selected from a group which consists of a carbon source, a doping source, a doped element containing carbon source, and a waste plastic source into a high-temperature and high-pressure closed autoclave, completely closing the high-temperature and high-pressure closed autoclave, and forming a nanoparticle-carbon core-shell structure by a single process by coating a carbon layer on the surface of the nanoparticles or forming a core-shell structure of nanoparticle-doped carbon by the single process by coating a carbon layer doped with the doped element on (Continued)

the surface of the nanoparticles under pressure self-generated in the autoclave and a reaction temperature in the range of 500 to 850° C. by heating the autoclave.

12 Claims, 138 Drawing Sheets

(30) Foreign Application Priority Data

Sep. 13, 2016 (KR) .......................... 10-2016-0118182
Sep. 13, 2016 (KR) .......................... 10-2016-0118183

(51) Int. Cl.
*B22F 1/00* (2006.01)
*C01B 33/02* (2006.01)
*C01B 32/05* (2017.01)

(52) U.S. Cl.
CPC ........ *C01B 33/02* (2013.01); *C04B 35/62884* (2013.01); *C04B 35/62886* (2013.01); *C04B 2235/52* (2013.01)

(56) References Cited

U.S. PATENT DOCUMENTS

| | | | |
|---|---|---|---|
| 2006/0052513 A1* | 3/2006 | Butz | C08F 293/00 524/555 |
| 2010/0009277 A1* | 1/2010 | Ogawa | B82Y 30/00 430/108.7 |
| 2010/0075055 A1* | 3/2010 | Suchanek | C30B 7/10 427/372.2 |
| 2011/0165468 A1 | 7/2011 | Alias | |
| 2014/0087268 A1 | 3/2014 | Kim et al. | |
| 2014/0127558 A1* | 5/2014 | Kang | H01M 4/0421 429/185 |
| 2014/0356705 A1* | 12/2014 | Shaw | C01B 17/22 429/212 |
| 2015/0104697 A1 | 4/2015 | Xia et al. | |

FOREIGN PATENT DOCUMENTS

| | | |
|---|---|---|
| KR | 10-2011-0112215 | 10/2011 |
| KR | 10-1146556 | 5/2012 |
| KR | 10-2013-0071070 | 6/2013 |
| KR | 10-2013-0071071 | 6/2013 |
| KR | 10-2014-0012588 | 2/2014 |
| KR | 10-2014-0107926 | 9/2014 |
| KR | 10-1465385 | 11/2014 |
| WO | 2010/029135 | 3/2010 |

OTHER PUBLICATIONS

C.N. He et al., "Low-temperature CVD synthesis of carbon-encapsulated magnetic Ni nanoparticles with a narrow distribution of diameters", Carbon, Sep. 2006, 44, 2330-2333.
V. Martin et al., "Coating of Nanoparticle Agglomerates via SAS in Fluidized Bed", 14th European Meeting on Supercritical Fluids, Conference paper, May 2014.
Hyojin Lee et al., "Sn78Ge22@Carbon Core-Shell Nanowires as Fast and High-Capacity Lithium Storage Media", Nano Letters, Jul. 28, 2007, vol. 7, No. 9, 2638-2641.
Swati V. Pol et al., "Stabilization of Metastable Face-Centered Cubic Cobalt and the Tetragonal Phase of Zirconia by a Carbon Shell: Reaction under Autogenic Pressure at Elevated Temperature of CoZr2(acac)2(OiPr)8", Chem. Mater., Apr. 1, 2004, vol. 16, No. 9, 1793-1798.
S. V. Pol et al., "The Effect of a Magnetic Field on a RAPET (Reaction under Autogenic Pressure at Elevated Temperature) of MoO(OMe)4: Fabrication of MoO2 Nanoparticles Coated with Carbon or Separated MoO2 and Carbon Particles", J. Phys. Chem. B, Apr. 24, 2004, vol. 108 No. 20, 6322-6327.
Swati V. Pol et al., "Reactions under Autogenic Pressure at Elevated Temperature (RAPET) of Various Alkoxides: Formation of Metals/Metal Oxides-Carbon Core-Shell Structures", Chem. Eur. J., Sep. 20, 2004, 10, 4467-4473.
S. V. Pol et al., "Fabrication and Magnetic Properties of Ni Nanospheres Encapsulated in a Fullerene-like Carbon", J. Phys. Chem. B, Apr. 8, 2005, vol. 109 No. 19, 9495-9498.
Junping Huo et al., "Formation and transformation of carbon-encapsulated iron carbide/iron nanorods", Carbon, Jul. 13, 2006, 44, 2849-2867.
P. P. George et al., "Synthesis and characterization of Nb2O5@C core-shell nanorods and Nb2O5 nanorods by reacting Nb(OEt)5 via RAPET (reaction under autogenic pressure at elevated temperatures) technique", Nanoscale Res Lett, Oct. 27, 2006, 2, 17-23.
Ayelet Odani et al., "Testing Carbon-Coated VOx Prepared via Reaction under Autogenic Pressure at Elevated Temperature as Li-Insertion Materials", Advanced Materials, Apr. 24, 2006, 18, 1431-1436.
Swati V. Pol et al., "Growth of carbon sausages filled with in situ formed tungsten oxide nanorods: thermal dissociation of tungsten(VI) isopropoxide in isopropanol", New Journal of Chemistry, Jan. 20, 2006, 30, 370-376.
Swati V. Pol et al., "Synthesis of Ferromagnetic Core-Shell Nanofibers", J. Phys. Chem. C, Oct. 20, 2007, vol. 111, No. 45, 16781-16786.
Vilas Ganpat Pol et al., "WS2 Breeds with Carbon to Create a Wormlike Nanostructure and Assembly: Reaction of W(CO)6 with S under Autogenic Pressure at Elevated Temperature under Inert Atmosphere", J. Phys. Chem. C, Nov. 24, 2006, vol. 111, No. 1, 134-140.
Swati V. Pol et al., "Encapsulating ZnS and ZnSe Nanocrystals in the Carbon Shell: A RAPET Approach", J. Phys. Chem. C, Aug. 21, 2007, vol. 111 No. 36, 13309-13314.
Vilas G. Pol et al., "Fabrication of Magnetic Nanoparticles Using RAPET Technique with or without Employing External Field", J. Phys. Chem. C, Apr. 10, 2008, vol. 112, No. 17, 6627-6637.
Vilas G. Pol et al., "Core-Shell Nanorods of SnS—C and SnSe—C: Synthesis and Characterization", Langmuir, Mar. 26, 2008, vol. 24, No. 9, 5135-5139.
P. P. George et al., "Synthesis of Ni3S2 and NiSe nanoparticles encapsulated in carbon shell and coating these onto stainless steel surfaces by RAPET", RSC Advances, Dec. 7, 2012, 2, 11725-11730.
Evgeny Butovsky et al., "Fabrication, Characterization, and Printing of Conductive Ink Based on Multi Core-Shell Nanoparticles Synthesized by RAPET", Adv. Funct. Mater., Jun. 10, 2013, 23, 5794-5799.
Evgeny Butovsky et al., "Synthesis of metal-carbon core-shell nanoparticles by RAPET (Reaction under Autogenic Pressure at Elevated Temperatures)", New J. Chem., Jan. 1, 2012, 36, 155-160.
Elena Holodelshikov et al., "Synthesis of Air Stable FeCo/C Alloy Nanoparticles by Decomposing a Mixture of the Corresponding Metal-Acetyl Acetonates under Their Autogenic Pressure", Inorg. Chem., Jan. 13, 2011, vol. 50, No. 4, 1288-1294.
Evgeny Butovsky et al., "Air stable core-shell multilayer metallic nanoparticles synthesized by RAPET: fabrication, characterization and suggested applications", J. Mater. Chem., Aug. 14, 2012, 22, 15025-15030.
Kuanping Gong et al., "Nitrogen-Doped Carbon Nanotube Arrays with High Electrocatalytic Activity for Oxygen Reduction", Science, Feb. 6, 2009, vol. 323, 760-764.
Gaku Imamura et al., "Synthesis of Nitrogen-Doped Graphene on Pt(111) by Chemical Vapor Deposition", J. Phys. Chem. C, May 4, 2011, 115, 10000-10005.
Long Qie et al., "Nitrogen-Doped Porous Carbon Nanofiber Webs as Anodes for Lithium Ion Batteries with a Superhigh Capacity and Rate Capability", Adv. Mater., Mar. 16, 2012, 24, 2047-2050.
Jae Yeong Cheon et al., "Ordered mesoporous porphyrinic carbons with very high electrocatalytic activity for the oxygen reduction reaction", Scientific Reports, Sep. 23, 2013, 3, 2715.

(56) References Cited

OTHER PUBLICATIONS

Fangcai Zheng et al., "High lithium anodic performance of highly nitrogen-doped porous carbon prepared from a metal-organic framework", Nature Communications, Nov. 6, 2014, 1-10.

Guan-Nan Zhu et al., "Carbon-coated nano-sized $Li_4Ti_5O_{12}$ nanoporous micro-sphere as anode material for high-rate lithium-ion batteries", Energy Environ. Sci., Oct. 1, 2011, 4, 4016-4022.

Ioannis Paraskevas et al., "Syntheses of carbon encapsulated magnetic FeNi nanoparticle via decompositions of methane and benzene", Letters to the Editor / Carbon 44, Nov. 17, 2005, pp. 820-823.

Johanna Forsman, "Production of Co, Ni, and Cu nanoparticles by hydrogen reduction", VTT Science 36, Aug. 27, 2013.

M. Makarewicz et al., "Magnetic investigation of carbon coated Co-, Ni- and Fe-Nanoparticles", Acta Physica Polonica A, Feb. 2009 vol. 115 No. 2, 568-571.

Chunli Guo et al., "Carbide nanoparticles encapsulated in the caves of carbon nanotubes by an in situ reduction-carbonization route", Journal of Nanomaterials, 2011, vol. 2011.

Jiang Gong et al., "One-pot synthesis of core/shell Co@C spheres by catalytic carbonization of mixed plastics and their application in the photo-degradation of Congo red", Journal of Materials Chemistry A May 28, 2014, Royal Society of Chemistry GBR, vol. 2, No. 20, May 2014, pp. 7461-7470.

Junping Huo et al., "Structural transformation of carbon-encapsulated iron nanoparticles during heat treatment at 1000° C.", Materials Chemistry and Physics, vol. 101, No. 1, Jan. 2007 (Jan. 15, 2007), pp. 221-227.

Junhao Zhang et al., "One-dimensional chain $Fe_3O_4$ nanoparticies encapsulated in worm-shaped carbon shell", Solid State Communications, Pergamon, GB, vol. 144, No. 3-4, Oct. 1, 2007 (Oct. 1, 2007), pp. 168-173.

Xiaohong Chen et al., "Structural features and magnetic property of nano-sized transition metal dispersed carbons from naphthalene by pressure", Journal of Materials Science, Kluner Academic Publishers, BO, vol. 42, No. 20, Jul. 2007.

Zhang J et al., "Converting polyethylene waste into large scale one-dimensional $Fe_3O_4$@C composites by a facile one-pot process", Industrial and Engineering Chemistry Research, American Chemical Society USA, vol. 52, No. 16, Apr. 24, 2013, pp. 5708-5712.

Hu Y et al., "$Fe_3C$-based oxygen reduction catalysts: Synthesis, hollow spherical structures and applications in fuel cells", Journal of Materials Chemistry A, vol. 3, No. 4, Jan. 2015, pp. 1752-1760.

Extended European Search Report of Application No. 16189164.3-1375, dated Feb. 6, 2017.

International Serach Report of Application No. PCT/EP2009/061772, dated Mar. 18, 2010.

X. Bai et al., "One-step fabricating nitrogen-doped $TiO_2$ nanoparticles coated with carbon to achieve excellent high-rate lithium storage performance", Electrochimica Acta 187, 2016, pp. 389-396.

\* cited by examiner

METHOD OF CARBON COATING ON NANOPARTICLE AND CARBON COATED NANOPARTICLE PRODUCED BY THE SAME

CROSS-REFERENCE TO RELATED APPLICATION

This application claims priority to and the benefit of Korean Patent Application Nos. 10-2015-0131900, 10-2015-0131910, 10-2016-0118183, and 10-2016-0118182 filed in the Korean Intellectual Property Office on Sep. 17, 2015, Sep. 17, 2015, Sep. 13, 2016, and Sep. 13, 2016, the entire contents of which are incorporated herein by reference.

BACKGROUND OF THE INVENTION

(a) Field of the Invention

The present invention relates to a method of carbon coating on nanoparticles and carbon coated nanoparticles produced by the same.

(b) Description of the Related Art

In the case where most materials exist with nano sizes, the most materials show various features different from a case contrary thereto. Sometimes, the most materials may show more excellent electrical and physical features or sometimes, the most materials may undergo a more critical chemical change. A most generally observed change is a phenomenon in which the most materials are easily oxidized by oxygen or a melting point of the most materials is lowered. Further, a phenomenon is observed, in which their shape and crystalline structure can be easily changed due to excessive volume expansion in the process of adsorption of the ions or gas. The change may act as a factor to significantly limit use of nanoparticles in potential applications. Therefore, developing a surface coatings and a scheme thereof which allow the most materials to maintain the natures as they are or show a more excellent properties even in the state of the nano sizes is very important.

Nano carbon materials represented by a carbon nanotube, graphene, and the like have been in the limelight in various application fields in recent years due to their very excellent properties. A largest advantage of the nano carbon material includes excellent elasticity, electrical conductivity, corrosion resistance, and chemical resistance. Therefore, coating the nanoparticles using the nano carbon materials can prevent the nanoparticles from being easily deteriorated even under severe physical and chemical environments and allow the nanoparticles to show properties which are more excellent and peculiar in addition to unique properties of carbon.

Further, application ranges of the carbon coated nanoparticles are very wide, which include an energy field including various electrode materials, catalytic materials, heat storage materials, and the like, an environmental field including adsorption materials of gas and liquid, an optical reaction material, and the like, a bio field including drug transfer and diagnosis, and an electric and electronic field including a magnetic material and an electrical conductive or shielding material. Therefore, development of a technology that uniformly mass-produces the carbon coated nanoparticles by a simple and inexpensive method is very important for commercialization of the nanoparticles.

In particular, the nanoparticles coated with doped carbon may be appropriate to increasing stability of the nanoparticles or increasing functionality. As one example, an N doped carbon structure can serve to improve electrochemical performance by further increasing an interaction with the ions as compared with a pure carbon structure and improve long-term stability as well as increase activation of catalyst in an electrochemical reaction. Accordingly, uniformly mass-producing the nanoparticles coated with the doped carbon is very important.

When the surface of the nanoparticles is massively coated with carbon by a general CVD method and a pyrolysis method which are known up to now, a disadvantage that non-uniformity, and the like may occur and the surface of the carbon may be just doped with N or only an N doped carbon structure may be just formed and the nanoparticles such as metal oxide are coated with N doped carbon cannot be disclosed.

SUMMARY OF THE INVENTION

As application fields of carbon coated nanoparticles and/or doped carbon coated nanoparticles are gradually extended, a method for producing carbon coated nanoparticles and/or doped carbon coated nanoparticles with improved quality while mass-producing by an economic method is required.

Therefore, the present invention has been made in an effort to provide a producing method capable of enhancing economics and producibility.

Further, the present invention has been made in an effort to provide a method capable of easily controlling a thickness of a coating layer while uniformly forming the coating layer.

Embodiments according to the inventive concept, may provide method including supplying nanoparticles and sources of any one or two or more combinations selected from a group which consists of a carbon source, a doping source, a doped element containing carbon source, and a waste plastic source into a high-temperature and high-pressure closed autoclave, completely closing the high-temperature and high-pressure closed autoclave, and forming a nanoparticle-carbon core-shell structure by a single process by coating a carbon layer on the surface of the nanoparticles or forming a core-shell structure of nanoparticle-doped carbon by the single process by coating a carbon layer doped with the doped element on the surface of the nanoparticles under pressure self-generated in the autoclave and a reaction temperature in the range of 500 to 850° C. by heating the autoclave.

In some embodiments of the inventive concepts, method may include supplying Si or Si—SiOx nanoparticles and a lithium source into a high-temperature and high-pressure closed autoclave, completely closing the high-temperature and high-pressure closed autoclave, and forming lithium doped (SiOx-Si), lithium doped (C—SiOx-Si), or lithium doped (N-doped C—SiOx-Si) nanoparticles by a single process by doping lithium on the surface of the nanoparticles under pressure self-generated in the autoclave and a reaction temperature in the range of 500 to 750° C. by heating the autoclave.

In some embodiments of the inventive concepts, method may include lithium doped (SiOx-Si), lithium doped (C—SiOx-Si), or lithium doped (N-doped C—SiOx-Si) nanoparticles, a lithium source, and a carbon source are together supplied into a high-temperature and high-pressure closed autoclave, completely closing the high-temperature and high-pressure closed autoclave, and forming carbon coated (SiLiOx-Si), carbon coated (SiLiOx-LiSi), doped carbon coated (SiLiOx-Si), or doped carbon coated (SiLiOx- LiSi) nanoparticles by a single process by coating a carbon layer on the surface of the nanoparticles under pressure self-generated in the autoclave and a reaction temperature in the range of 750 to 950° C. by heating the autoclave.

Embodiments according to the inventive concept, may provide a carbon shell connection structure wherein a plurality of nanoparticle-carbon core-shell structures is coated with a carbon layer again or a plurality of nanoparticle-doped carbon core-shell structures is coated with a doped carbon layer again to be connected with each other with a micron size.

In some embodiments of the inventive concepts, a lithium battery may includes carbon coated (SiLiOx-Si), carbon coated (SiLiOx-LiSi), doped carbon coated (SiLiOx-Si), or doped carbon coated (SiLiOx-LiSi) nanoparticles.

According to exemplary embodiments of the present invention, since a supplied source is used for fully coating nanoparticles without loss regardless of types of the coated nanoparticles, a coating layer can be controlled with a desired thickness by controlling only a supply amount of the source, thereby easily generalizing synthesis.

According to the exemplary embodiments of the present invention, since the source can be supplied between gaps of the nanoparticles at the uniform concentration, the thickness of a carbon layer can be uniformly formed in a sample on the whole.

According to the exemplary embodiments of the present invention, since a core-shell structure is coated with the carbon layer again to form a carbon shell connection structure having a micron size, physical and chemical properties are excellent, thereby improving stability while reaction with ions.

According to the exemplary embodiments of the present invention, economical efficiency of a coating method of the nanoparticles can be improved. In detail, since the coating method of the nanoparticles according to the exemplary embodiments of the present invention uses an inexpensive coating source and nanoparticles which have already been mass-manufactured at low cost and uses a very simple autoclave, the coating method according to the exemplary embodiments of the present invention is even more economical than a method in the related art.

In the coating method of the nanoparticles according to the exemplary embodiments of the present invention, since carbon coating and doped carbon coating are available even by using waste plastic which is left out, the coating method can assist solving an environmental problem while very economically coating the nanoparticles.

In the coating method of the nanoparticles according to the exemplary embodiments of the present invention, since the carbon coated nanoparticles or the nanoparticles coated with doped carbon can be synthesized and hydrogen energy can be collected by recovering gases remained in the reactor after the synthesis, the coating method is very energy-efficient.

According to the exemplary embodiments of the present invention, since the coated nanoparticles can be produced by supplying only a large quantity of nanoparticles and coating sources to a very simple autoclave, the nanoparticles can be mass-produced.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Figure 1A:
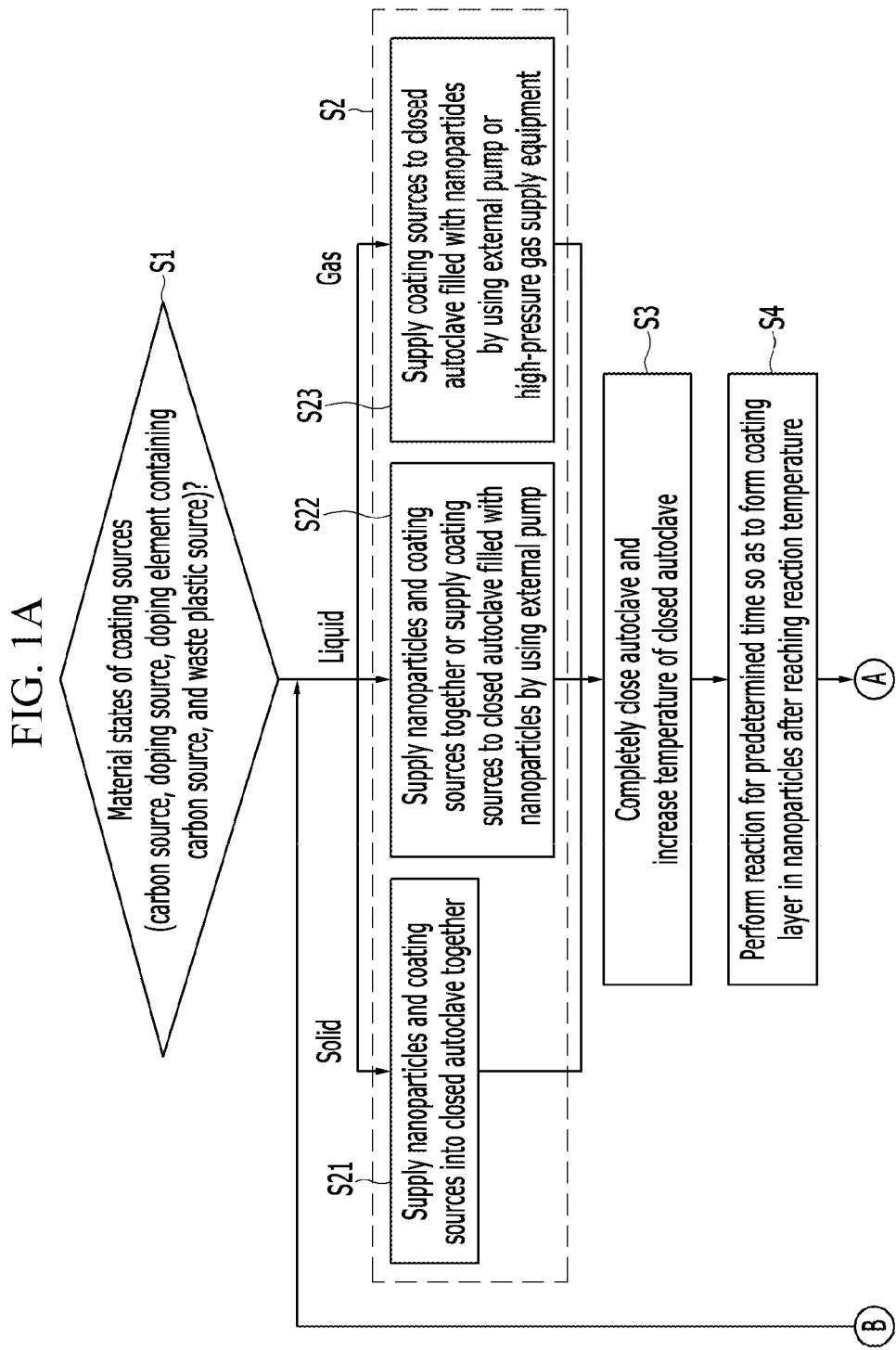
FIGS. 1A and 1B are flowcharts for describing a method of carbon coating on nanoparticles according to exemplary embodiments of the present invention.
Figure 1B:
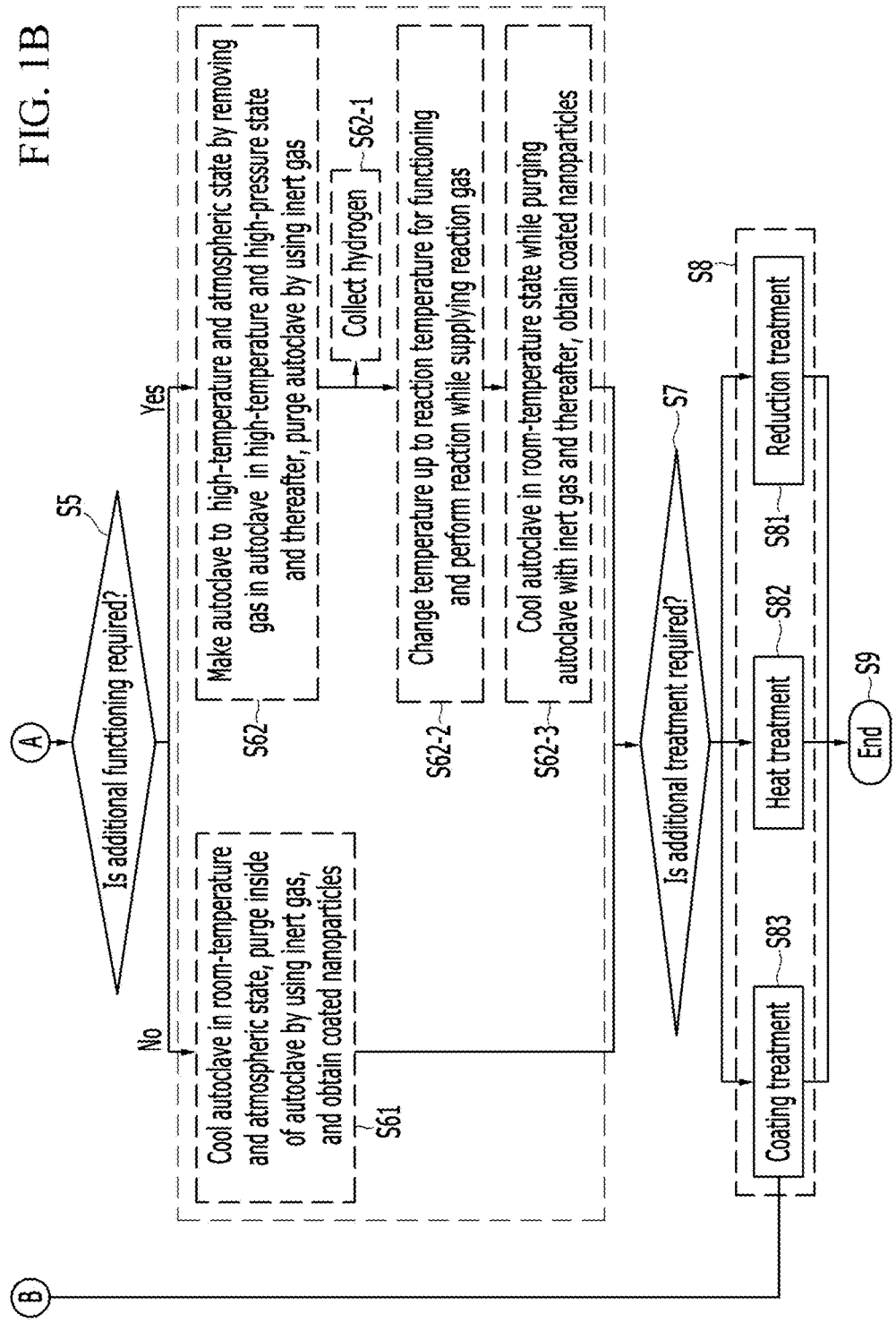

Hereinafter, a generalized coating method which is capable of performing carbon coating, doping, or doped carbon coating on nanoparticles according to exemplary embodiments of the present invention will be described with reference to a flowchart illustrated in FIG. 1.

First, a material state of a coating source (including a carbon source, a doping source, a carbon source containing a doped element, and a waste plastic source) to be used is determined (S1).

The material state of the coating source may be divided into a solid, a liquid, and gas, and the nanoparticles and the coating source are supplied to a high-temperature and high-pressure closed autoclave by a suitable method according to the material state of the coating source (S2).

The high-temperature and pressure closed autoclave is called a fully closed autoclave under reacting temperature and pressure. The high pressure means pressure higher than atmospheric pressure, and may be pressure of 10 atm or greater, pressure of 20 atm or greater, pressure of 30 atm or greater, or pressure of 40 atm or greater. The high temperature indicates a temperature range of at least 350° C. or greater and may include a temperature range of 500 to 850° C., preferably 550 to 850° C. in the exemplary embodiments of the present invention described with reference to FIG. 1.

As the simplest example of the high-temperature and pressure closed autoclave, a stainless-steel swagelok-type autoclave, but a shape of the autoclave may be changed in various shapes according to a reaction material, a reaction condition, and the like. The capacity of the autoclave is possible from at least 1 cc, but the maximum capacity may vary according to a design. The nanoparticle to be carbon coated has a diameter of 1 to 500 nm and preferably 10 to 200 nm.

The nanoparticle can use any one of metal, metal oxide, a semiconductor material, and semiconductor oxide. As the metal, Zn, Cu, Ni, Co, Fe, Mn, Zr, Mo, Al, Pt, Ag, Ru, Rh, Ir, Au, or the like may be used, but is just exemplified and is not limited thereto. The metal oxide may use $Fe_3O_4$, ZnO, $ZrO_2$, NiO, $Al_2O_3$, $LiCoO_2$, $LiMn_2O_4$, $LiNiCoAlO_2$, $LiNi_{0.5}Mn_{1.5}O_4$, $LiNiCoMnO_2$, $LiSiO_x$, and the like, but is just exemplified and not limited thereto. The semiconductor material may use Si, Ge, Sn, In, Ga, and the like, but is just exemplified and not limited thereto. The semiconductor oxide may use $SiO_x$, $GeO_2$, $SnO_2$, $In_2O_3$, $Ga_2O_3$, and the like, but is just exemplified and not limited thereto. Further, a nanoparticle complex combining various nanoparticles may be used, and Ti-doped positive active nanoparticles may be used.

The carbon source may use a carbon source which is much cheaper than an organic metal source which has been used for forming an existing nanoparticle-carbon core-shell. A liquid carbon source may use benzene ($C_6H_6$), toluene ($C_7H_8$), styrene ($C_8H_8$), indene ($C_9H_8$), hexane ($C_6H_{14}$), octane ($C_8H_{18}$), or liquid paraffin oil ($C_xH_y$), but is just exemplified and not limited thereto.

A solid carbon source may use naphthalene ($C_{10}H_8$), anthracene fluorene ($C_{13}H_{10}$), solid paraffin ($C_xH_y$), pyrene ($C_{16}H_{10}$), and polymer, but is just exemplified and not limited thereto. The polymer may use a polymer consisting of monomers having 2 to 8 carbon atoms, such as polyethylene ($C_2H_4n$), polypropylene ($C_3H_6n$), polystyrene ($C_8H_8n$), and the like. Further, wastes of plastic products manufactured by using the polymer may also be used as the solid carbon source, but it will be described by varying exemplary embodiments.

The gas carbon source may use acetylene ($C_2H_2$), ethylene ($C_2H_4$), propane ($C_3H_8$), methane ($CH_4$), or the like.

The doped element-containing carbon source may use a doped element-containing carbon source which is much cheaper than a metal organic framework (MOF) which has been used for forming an existing nanoparticle-doped carbon core-shell. As the doped element, N, B, P, Li, or the like may be used and a doped element may be selected according to a doping purpose. As the solid N doped carbon source, melamine ($C_3H_6N_6$) may be used. As the liquid N doped carbon source, pyridine ($C_5H_5N$), acrylonitrile ($C_3H_3N$), pyrrole ($C_4H_5N$), or the like may be used. As the gas N doped carbon source, mixed gas of ammonia ($NH_3$) and hydrocarbon gas may be used. In this case, as the used hydrocarbon gas, acetylene ($C_2H_2$), ethylene ($C_2H_4$), propane ($C_3H_8$), methane ($CH_4$), or the like may be used.

As the liquid P doped carbon source, tributylphosphine ($[CH_3(CH_2)_3]_3P$), phosphorine ($C_5H_5P$), or the like may be used.

As the solid B doped carbon source, triphenylborane ($(C_6H_5)_3B$) may be used. As the liquid B doped carbon source, borinine ($C_5H_5B$), triethylborane ($(C_2H_5)_3B$), trimethylboron ($B(CH_3)_3$), or the like may be used. As the gas B doped carbon source, trimethylboron-d9 ($B(CD_3)_3$) may be used.

As the solid Li doped source, Lithium acetylacetonate ($LiO_2C_5H_7$), Lithium carbonante ($Li_2CO_3$), Lithium sulfide (LiS), Lithium hydride (LiH), Lithium dimethylamide (NIi$(CH_3)_2$), and Lithium acetoacetate ($LiO_3C_4H_5$) may be used. In particular, Lithium carbonante ($Li_2CO_3$), Lithium sulfide (LiS), and Lithium hydride (LiH) may be singly used in order to dope only Li, but the doping source may be supplied simultaneously with the carbon sources in order to perform Li doping simultaneously with carbon coating.

Further, in order to dope two or more elements of N, P, B, and Li, a complex precursor including a combination of the aforementioned materials or two or more elements may be used. For example, borane dimethylamine, borane pyridine, borane trimethylamine, borane-ammonia, tetrabutylammonium cyanoborohydride, ammonium tetraphenylborate, tetrabutylammonium borohydride, (tetramethylammonium triacetoxyborohydride, 2,4,6-triphenylborazine, borane diphenylphosphine, and the like may be used, but it is just exemplified and not limited thereto.

When the coating source is the solid, the nanoparticles and the coating source are supplied in the closed autoclave together (S21). When the coating source is the liquid, the coating source is supplied in the autoclave together with the nanoparticles or may be additionally supplied in the closed autoclave filled with the nanoparticles by using an external pump (S22). In the case where the liquid coating source is a harmful material, there is an advantage of performing a process without discharging the harmful material when the liquid coating source is supplied by the pump. When the coating source is the gas, coating source gas is injected to the closed autoclave filled with the nanoparticles by using an external pump or high-pressure supply equipment (S23).

When the coating source is supplied (S2), a supply amount of the coating source is controlled to control a thickness of a coating shell with a desired thickness.

When the coating source is the solid, the supply amount of coating source may be controlled on the basis of a weight ratio of the coating source to the nanoparticles. When the coating source is the liquid, the supply amount of coating source may be controlled on the basis of a ratio of a volume of the coating source to a volume of the autoclave. When the coating source is the gas, the supply amount of coating source may be controlled by controlling pressure of the gas. For example, a thickness of the carbon shell may be in a thickness range of 1 to 100 nm by controlling the supply amount of carbon source. The thickness range of 1 to 100 nm is just exemplified according to a thickness range required in a technical field where the nanoparticle-carbon core-shell is mainly applied, and the nanoparticle-carbon core-shell can be formed with the thickness required in the applied technical field by controlling the supply amount of carbon source. That is, according to the exemplary embodiments of the present invention, the shell thickness of the nanoparticle-coating core-shell may be variously controlled by controlling the supply amount of coating source, and a diameter of the used nanoparticle may also be freely selected to optimize the coated nanoparticle structure according to a use.

The quantity of and a connection structure of the doped elements in the doped carbon layer may be controlled by varying the quantity or the types of the doped element containing carbon sources or through a change in heat treatment temperature after synthesis. For example, in the case of using pyridine as the doped carbon source, when a ratio of the N-element containing carbon source is small, pyridine type N (N6) and pyrrolic type N (N5) structures are dominant, but while the ratio of the source is increased, the pyrrolic type N (N5) structure tends to be gradually decreased and a quaternary type (N3) structure tends to be gradually increased.

Meanwhile, when the supply amount of coating source is too small, bare nanoparticles without almost coating exist as they are. On the other hand, when the supply amount of coating source is too large, by-products (including carbon spheres with micro sizes and an N doped nanocarbon structure) which should not be formed are formed together with the coated nanoparticle structure to cause nonuniformity of a synthesized material. When only the coating source is supplied without supply of the nanoparticles, the by-products (including carbon spheres with micro sizes and an N doped nanocarbon structure) are mainly formed. Accordingly, in the exemplary embodiments of the present invention, the supply amount of coating source is controlled in a range of preventing the nanoparticles from being singly generated and the by-products from being generated. For example, when only benzene is supplied, the carbon spheres having the micro sizes are formed and only the pyridine is supplied to the autoclave to be switched to an N doped carbon structure having the nano size.

Subsequently, the autoclave is fully closed and the temperature of the closed autoclave rises (S3).

The reaction temperature may vary according to a material or a capacity of the autoclave. In the exemplary embodiments of the present invention, the temperature rises to be 500° C., for example, 550 to 850° C. When the temperature is too low, the carbon coating reaction may not occur well. When the temperature is too high, secondary byproducts may be varied according to a kind of nanoparticle, but generated by a side reaction between molecules gasified from the nanoparticles such as Al, Zn, Sn, In, and the like with a low melting point and pyrolized molecules of the coating source. In addition, it is difficult to select a material compared with deformation and the like of the autoclave, thereby increasing manufacturing cost of the autoclave and increasing producing cost. When the temperature reaches the reaction temperature, the nanoparticles react for a predetermined time so that the coating layer is formed in the nanoparticles (S4).

While the temperature in the autoclave rises to the reaction temperature, the coating source supplied for coating is gasified (in the case of the solid or the liquid) or expanded (in the case of the gas) or pyrolized in the autoclave and thus internal pressure of the autoclave increases.

When the supplied coating source is the liquid and the solid, self-generated pressure is generated in the autoclave by a gas constant corresponding to a synthesis temperature.

When the supplied coating source is the gas, the volume of the autoclave is limited when the carbon source is supplied at atmospheric pressure in an initial stage and thus it is difficult to generate the pressure when the liquid and solid sources are supplied. Accordingly, when the gas is supplied to the autoclave (S23), the pressure in the initial step is set and then supplied to the autoclave by considering pressure to be formed in the autoclave at the reaction temperature.

For example, when the carbon source in the gas state is supplied (S23) by setting initial pressure at a room temperature to be pressure between 2 to 20 atm, the pressure of the autoclave according to an increase in temperature is added to the pressure increased according to the initial pressure and the increase in temperature and then the self-generation pressure is generated in the autoclave.

The reaction time may be 10 minutes to 2 hours, but is exemplified and may vary according to sizes of nanoparticles, a thickness of a carbon shell to be formed, and the like.

When the reaction is completed, it is examined whether additional functioning is required (S5).

When the additional functioning is not required, the temperature of the reaction drops to the room temperature and thereafter, a pressure control valve is slowly opened so as to lower the pressure in the autoclave to the atmospheric pressure. When the autoclave finally reaches the room temperature and the atmospheric pressure state, the inside of the autoclave is purged by using inert gas such as argon or nitrogen and the autoclave is opened to obtain a resulting material including the coated nanoparticle structure (S61).

When the additional functioning is required, the inside of the autoclave is made to a state at the atmospheric pressure and the high-temperature by removing the gas in the autoclave in the state of the high-pressure and high-temperature and thereafter, the inside of the autoclave is purged by using the inert gas (S62). A considerable amount of hydrogen which remains after used in gas generated through the pyrolysis process from the supplied coating source exists in gas discharged in the process of removing the pressure in the autoclave and the hydrogen is collected from the discharged gas by using a hydrogen collection equipment (S62-1). Thereafter, when the pressure and temperature of autoclave is remaining stable, the temperature of the autoclave is changed to the reaction temperature for the functioning, the reaction gas is supplied, and a functioning reaction is performed (S62-2). When the reaction is completed, the temperature of the autoclave is lowered to the room temperature while purging the autoclave with the inert gas and thereafter, the coated nanoparticles are obtained (S62-3).

According to the exemplary embodiments of the present invention, the coated nanoparticle structure may be mass-produced by the unit of several or tens of kg unlike a CVD method in the related art. The reason is that in the existing general CVD method, the coating source is not uniformly transferred according to positions of nanoparticles on a support layer and thus the thickness of the coating layer is ununiformly formed and the loss of the used coating source is large, whereas according to the exemplary embodiments of the present invention, the coating source is supplied between gaps of the nanoparticles at the uniform concentration under a high-pressure atmosphere to be used 100% without loss.

Figure 2A:
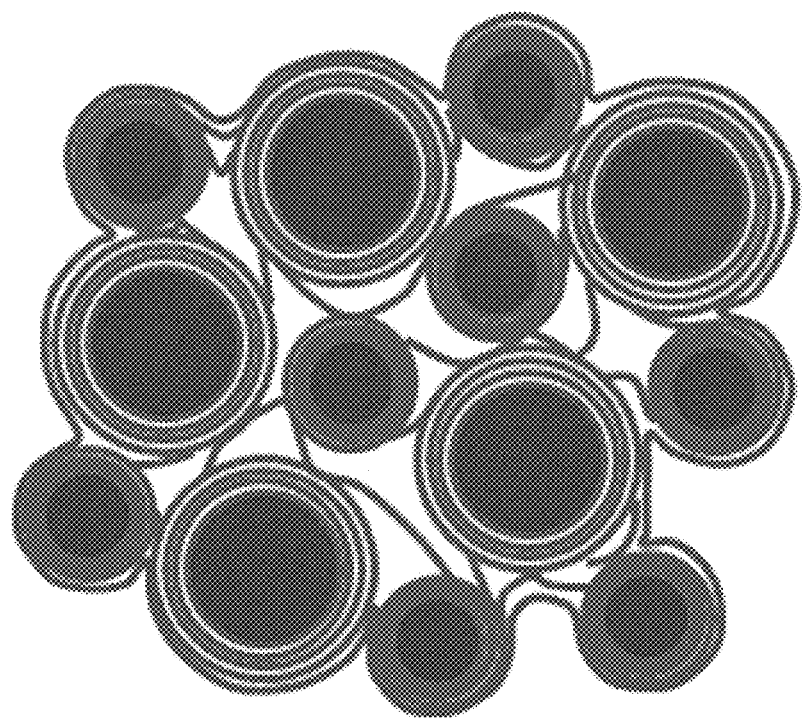
FIGS. 2A to 2C are a schematic diagram and a transmission electron microscopy (TEM) images for describing that a plurality of nanoparticle-carbon core-shell structures are coated with carbon layers again to form structures which are connected to each other with micron sizes.
Figure 2B:
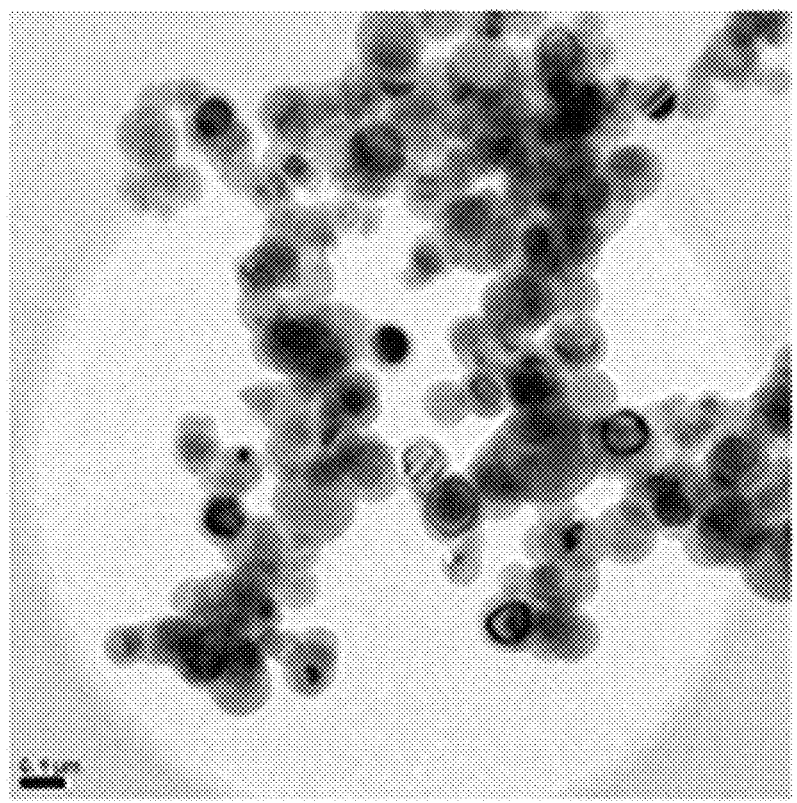
Figure 2C:
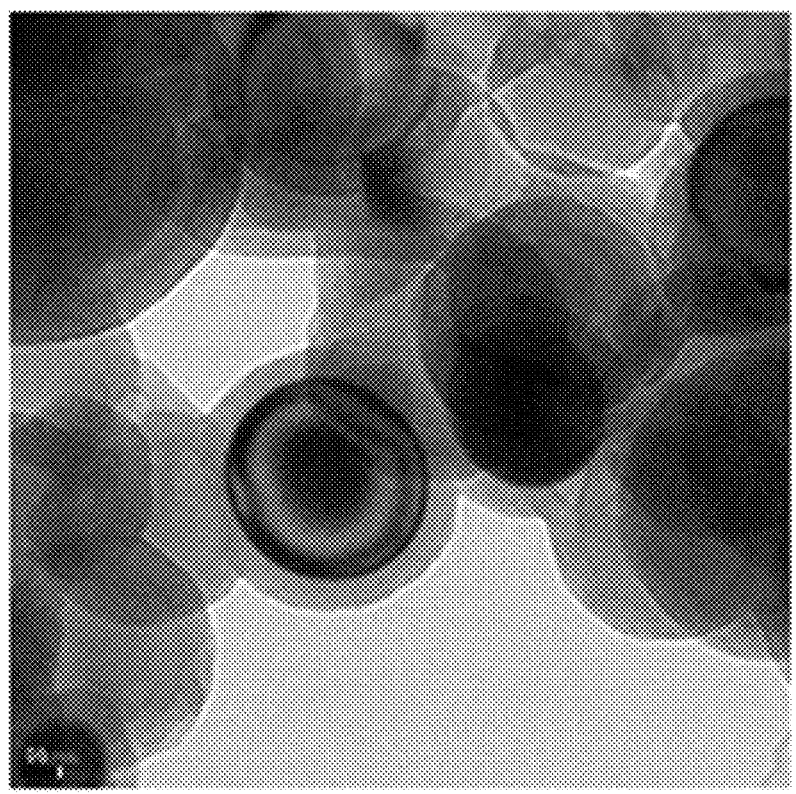

In addition, in the obtained resulting material, because the coating source may be supplied between the gaps of the nanoparticles at the uniform concentration, like the drawing schematically exemplified in FIG. 2 and the TEM images actually measured in FIGS. 2B and 2C, a structure in which a plurality of nanoparticle-carbon core-shell structures are coated with the carbon layer again to be connected to each other with micro-sizes is formed. As such, the structure in which the plurality of nanoparticle-carbon core-shell structures are coated with the carbon layer again to be connected to each other with micro-sizes may have excellent physical and chemical characteristics and excellent stability as compared with the case of using a plurality of nanoparticle-carbon core-shell structures which are respectively separated from each other.

When a reacting material is obtained, it is examined whether additional treatment (including reduction treatment, heat treatment, or secondary coating treatment) is required (S7).

According to the exemplary embodiments of the present invention, a non-oxidized nanoparticle-carbon core-shell structure may be very simply formed. In the existing methods, since a nanoparticle core component may be easily changed to oxide, the nanoparticle core is not present in a non-oxidized form and the nanoparticles may be unintentionally oxidized in the producing process. Particularly, Si, Al, Ge, Sn, and the like in which oxygen exists in the source and the nanoparticles are easily changed to oxides may be changed to $SiO_x$, $SnO_2$, $GeO_2$, $Al_2O_3$, and the like in a final product. Accordingly, in the exiting method, it is difficult to implement Si/C, Al/C, Ge/C, Sn/C, or the like, whereas in the exemplary embodiments of the present invention, these structures may be very easily implemented. Further, in the exemplary embodiments of the present invention, nanoparticles ($SiO_x$ $SnO_2$, $GeO_2$, $Al_2O_3$) in the oxidized state which is much cheaper than the non-oxidized state are used as an initial raw material to form the non-oxidized nanoparticle-carbon core-shell structure, thereby much more improving the economics.

Therefore, in some cases, with respect to the obtained coated nanoparticle structure, the reduction treatment may be further performed (S81). The reduction treatment may be performed immediately while reduced gas is supplied after the synthesis reaction is completed in the high-temperature and high-pressure closed autoclave forming the coated nanoparticle structure (S62-2) and performed through a general autoclave for reduction after obtaining the resulting material (S81).

The reduction treatment (S81) may be performed through heat treatment with hydrogen. The reduction treatment (S81) may be performed in a temperature range of 200 to 600° C. at a mixed atmosphere of inert gas and hydrogen gas for approximately 1 to 2 hours. In the case of heat treatment at a temperature of less than 200° C., the reduction of the nanoparticles configuring the core may not be sufficient, and in the case of heat treatment at a temperature of greater than 600° C., materials having a low melting point are reduced and then gasified to be discharged outside the doped carbon shell. The temperature needs to be determined by considering gibbs free energy of related materials.

The reduction may be performed to obtain a metal nanoparticle-carbon core-shell structure or a semiconductor nanoparticle-carbon core-shell structure by reducing metal oxide or semiconductor oxide in a metal oxide nanoparticle-carbon core-shell structure or a semiconductor oxide nanoparticle-carbon core-shell structure. Generally, the metal oxide nanoparticles or the semiconductor oxide nanoparticles are cheaper, mass production is possible, and circulation in large quantity is also possible. Accordingly, it may be much more economical that the metal oxide nanoparticle-carbon core-shell structure or semiconductor oxide nanoparticle-carbon core-shell structure is formed by using the metal oxide or semiconductor oxide nanoparticles instead of the metal or semiconductor nanoparticles and then reduced to be reduced to the metal nanoparticle-carbon core-shell structure or semiconductor nanoparticle-carbon core-shell structure.

Further, the heat treatment may be further performed in order to enhance crystallinity of the obtained coated nanoparticle structure (S82).

The heat treatment is a selective step and may be additionally performed in order to enhance crystallinity of the carbon shell in the obtained nanoparticle-carbon core-shell structure as described in the exemplary embodiment. The heat treatment may be performed for about 1 to 6 hours in a temperature range of 900 to 1,300° C. under an inert gas atmosphere at atmospheric pressure. When the heat treatment is performed at a temperature of less than 900° C., a difference from the synthesis temperature is small and thus it may be difficult to largely expect the effect, and when the heat treatment is performed at a temperature of greater than 1,300° C., a phenomenon in which nanoparticles of the core are gasified or deformed may be deteriorated and when the core is the oxide, the carbon shell may be removed through a reaction of the oxide and the carbon shell.

Last, secondary coating may be performed with respect to the obtained coated nanoparticles (S83). The secondary coating may be performed again in the process of S2 by using a closed autoclave synthesis method of the present invention or performed by using the coating method in the related art. As described in the exemplary embodiment, carbon-coating Li doped $Si/SiO_x$ core-shell nanoparticles, Li doped $Si/SiO_x/C$ core-shell nanoparticles, or carbon coated Li doped $Si/SiO_x$ core-shell nanoparticles again may be one example.

The structure in which the coated nanoparticle structures produced by the exemplary embodiments of the present invention or the plurality of coated nanoparticle structures are coated with the carbon layer again to be connected to each other with micro sizes may be applied in various fields, such as (1) electrochemical materials such as fuel cells (Pt/C, Ru/C, Rh/C, Ir/C, Pt/N-doped C, Ru/N-doped C, Rh/N-doped C, Ir/N-doped C, and alloy/N-doped C), batteries (Si/C, Ge/C, Sn/C, $SnO_2/C$, $SiO_x/C$, Si/SiOx/C, Si/Li-$SiO_x/C$ $LiCoO_2/C$, $LiMn_2O_4/C$, $LiNiCoAlO_2/C$, $LiNi_{0.5}Mn_{1.5}O_4/C$, $LiNiCoMnO_2/C$, Ti-doped cathode active material/C, Si/SiOx/C, $Si/LiSiO_x/C$, Si/N-doped C, Ge/N-doped C, Sn/N-doped C, $SnO_2$/N-doped C, $SiO_x$/N-doped C, Si/SiOx/N-doped C, $Si/LiSiO_x$/N-doped C, $LiCoO_2$/N-doped C, $LiMn_2O_4$/N-doped C, $LiNiCoAlO_2$/N-doped C, $LiNi_{0.5}Mn_{1.5}O_4$/N-doped C, $LiNiCoMnO_2$/N-doped C, and Ti-doped cathode active material/N-doped C), and reverse electrodialysis salinity gradient power generation (Pt/C, Ru/C, Rh/C, Ir/C, Cu/C, Ag/C, Pt/N-doped C, Ru/N-doped C, Rh/N-doped C, Ir/N-doped C, Cu/N-doped C, and Ag/N-doped C alloy/N-doped C), (2) heat storage materials (Al/C, Sn/C, Zn/C), (3) application ($Fe_3O_4/C$, Ni/C, Co/C, and magnetic alloy/C) using a magnetic material such as a ultra-conductor or a bio-diagnostic material, (4) desalination materials which serve to adsorb the ions and gas (Zeolite/C, MOF/C, Zeolite/N-doped C, and MOF/N-doped C) and in which the core serves as an excellent electrical conductor and an excellent magnetic body ($Fe_3O_4$/C, Cu/C, Ag/C, Al/C, $Fe_3O_4$/N-doped C, Cu/N-doped C, Ag/N-doped C, and Al/N-doped C), and the like.

A required thickness of the carbon or doped carbon shell may vary for each application field. For example, in the case of application technologies of fuel cells, batteries, reverse electrodialysis salinity gradient power generation, ultra-conductors, and magnetic materials, it is preferred that the thickness of the coating shell is decreased. However, in the case of technologies such as heat storage materials or desalination materials, it is preferred that the thickness of the coating shell is increased. Accordingly, according to the exemplary embodiments of the present invention that may control the thickness of the coating shell by controlling only the coating source supply amount, there is an advantage of freely controlling the thickness of the coating shell in a desired coated nanoparticle structure according to an application thereof.

Experimental Example 1

Si nanoparticles having a diameter of about 80 nm and crystallinity and benzene ($C_6H_6$) as a carbon source were supplied in an autoclave at atmospheric pressure and room temperature. In this case, the carbon source was supplied to have a Vol % ratio of the carbon source to an autoclave capacity of 1:0.2. The autoclave was fully closed and a temperature was increased to 750° C., and then reaction was performed for 1 hour. After the reaction was completed, when the autoclave was cooled to the room temperature and the temperature of the autoclave dropped to the room temperature, a pressure control valve was slowly opened in order to lower the pressure in the autoclave to the atmospheric pressure, and then a Si nanoparticle-carbon core-shell structure was obtained.

Figure 3A:
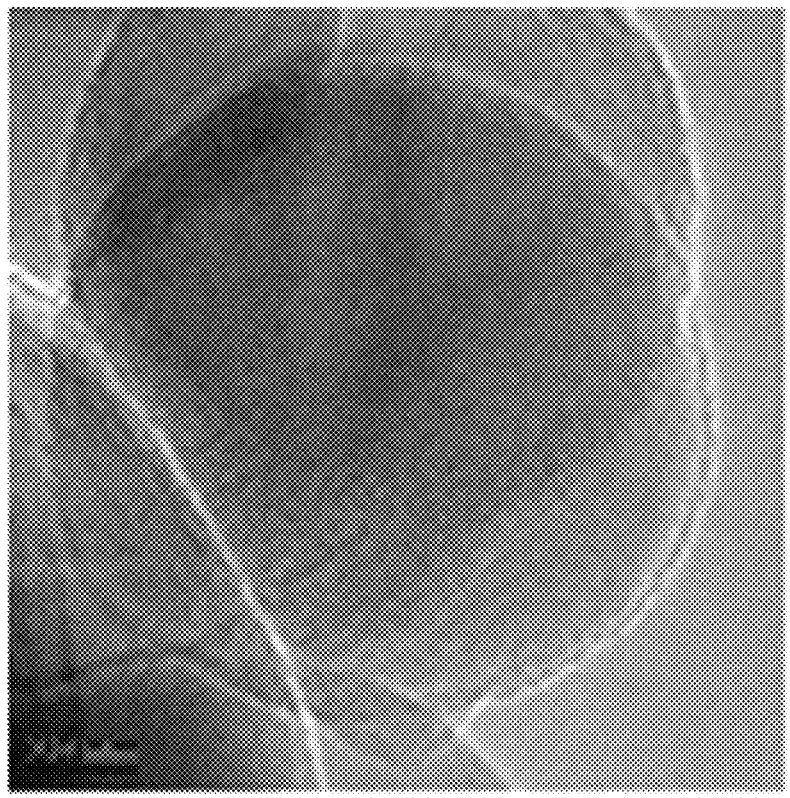
FIG. 3A illustrates a TEM image of Si nanoparticles before carbon coating and FIGS. 3B and 3C illustrate a TEM image and scanning TEM (STEM) images after carbon coating, respectively.
Figure 3B:
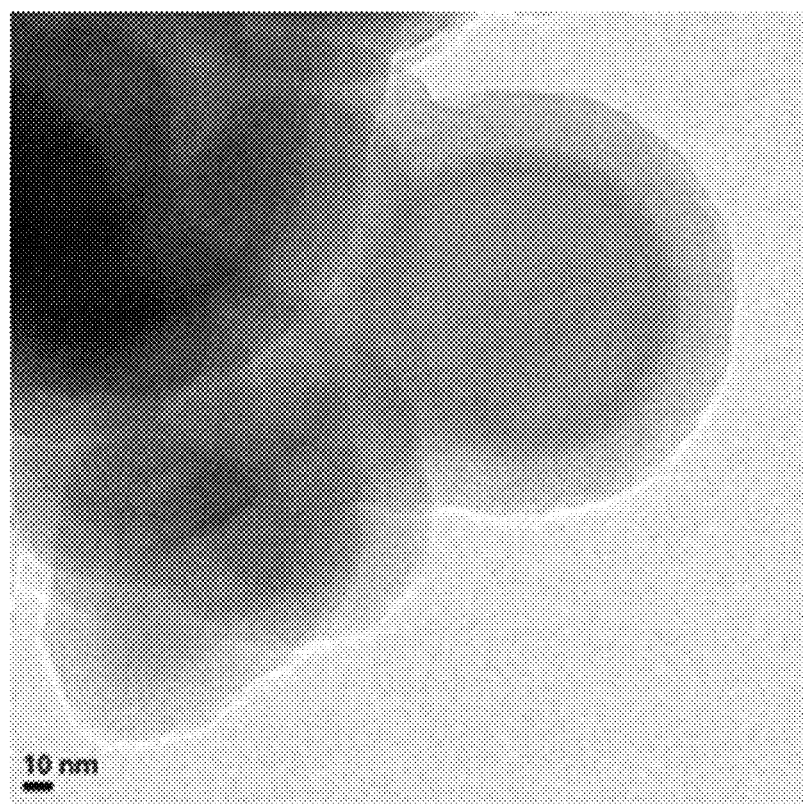
Figure 3C:
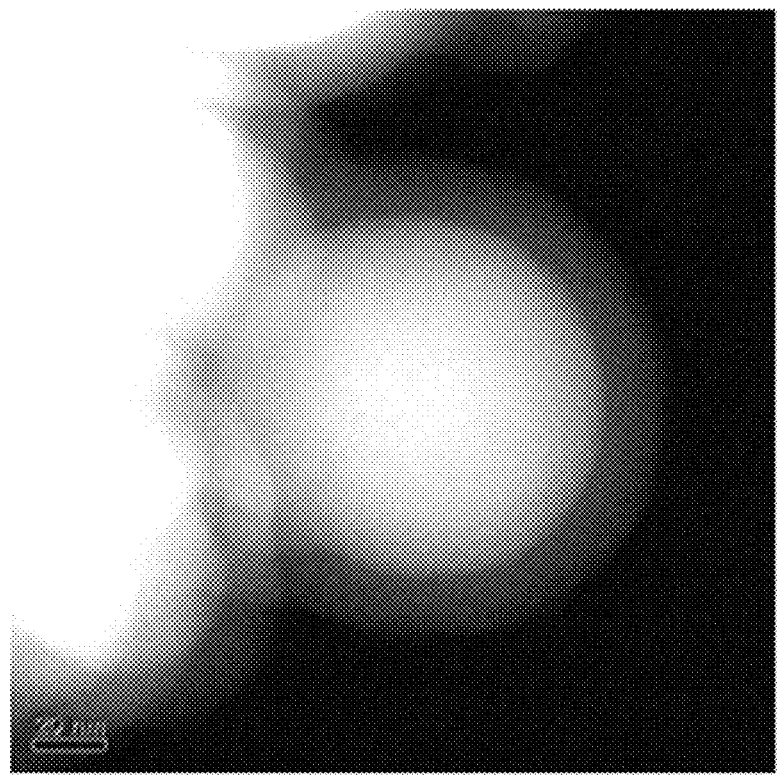
Figure 4A:
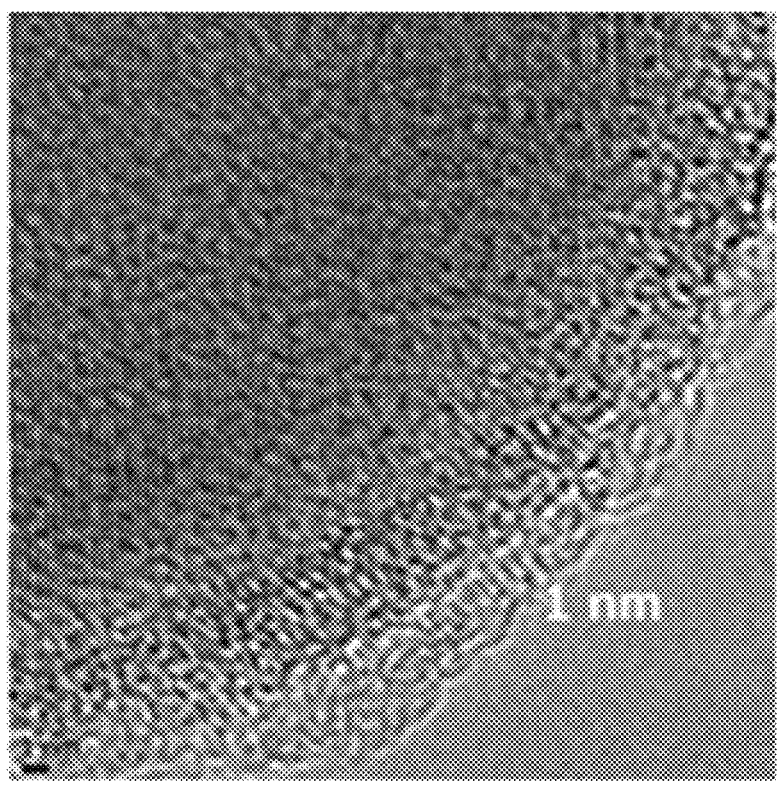
FIGS. 4A to 4E illustrate images obtained by measuring resulting materials obtained in Experimental Examples 2-1 to 2-5 by high-resolution TEM (HRTEM)
Figure 4B:
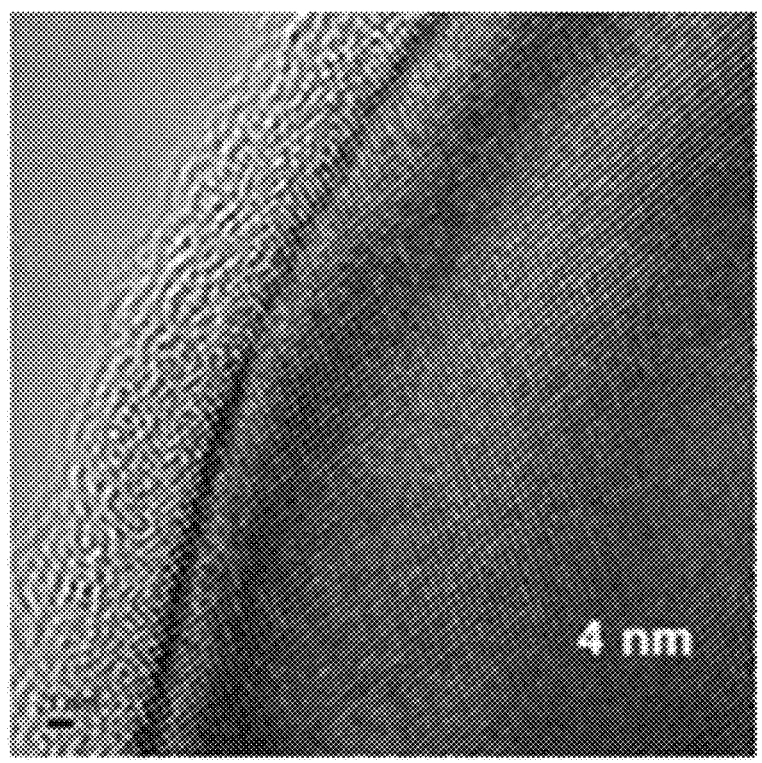
Figure 4C:
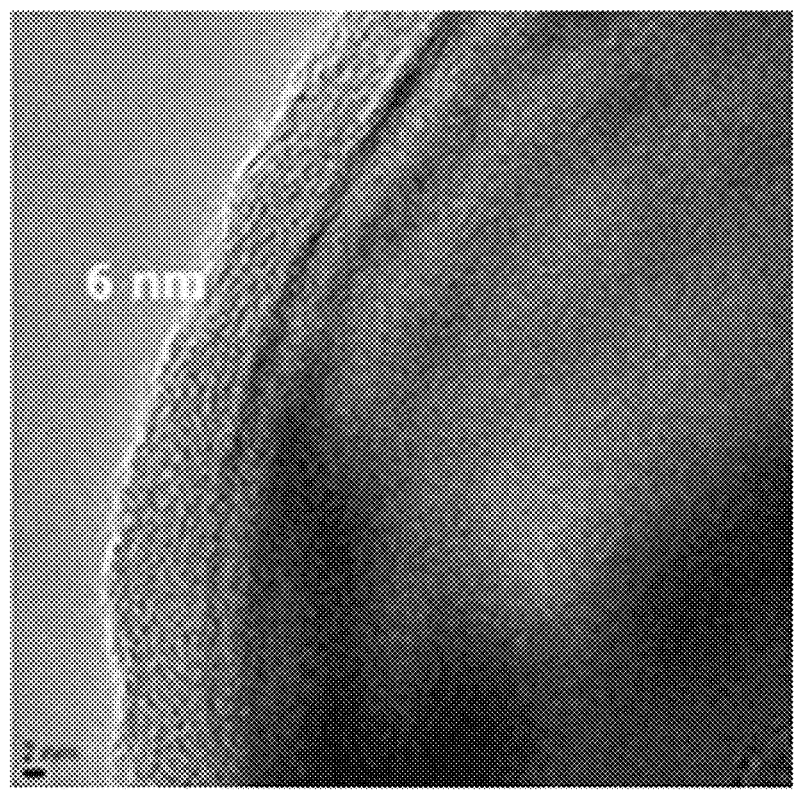
Figure 4D:
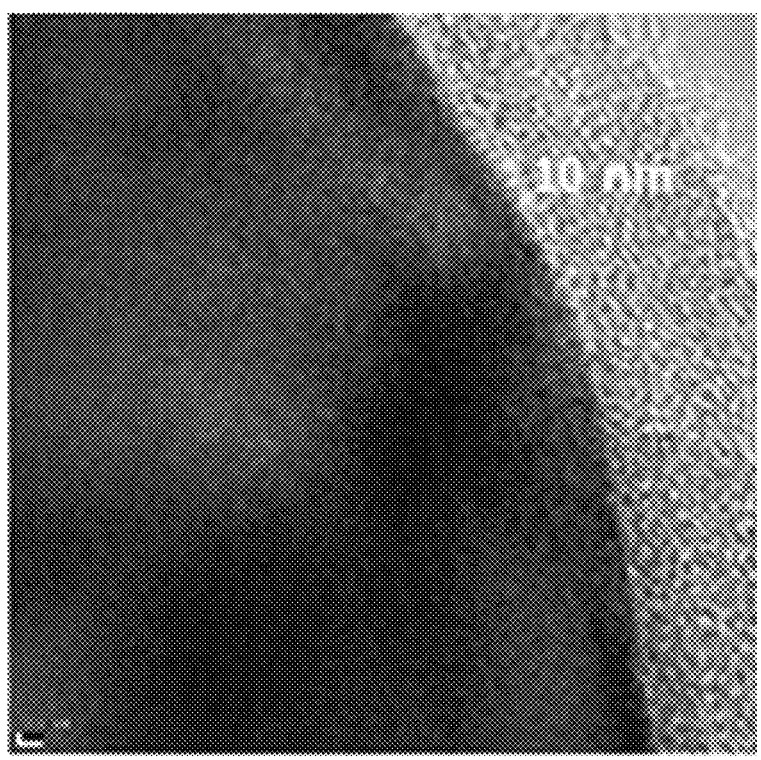
Figure 4E:
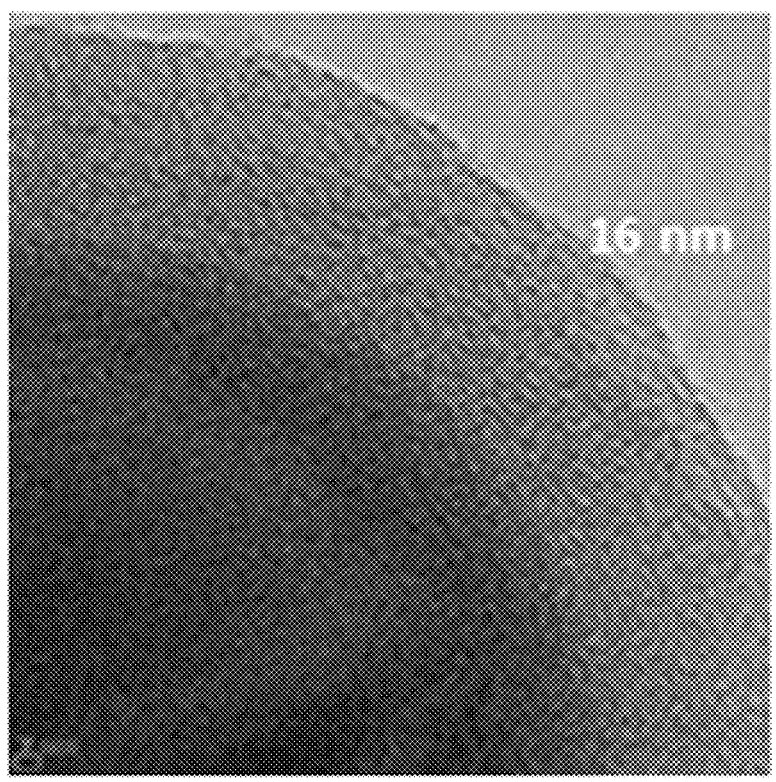

FIG. 3A illustrates a transmission electron microscopy (TEM) image of Si nanoparticles before carbon coating and FIGS. 3B and 3C illustrate a TEM image and scanning TEM (STEM) images after carbon coating, respectively. After coating, it can be seen that carbon shells having a thickness of 15 nm are uniformly formed on the surface of the Si nanoparticles.

Experimental Example 2

Like Experimental Example 1, Si nanoparticles having a diameter of about 80 nm and crystallinity and benzene ($C_6H_6$) were supplied. However, a reaction was performed by varying vol % ratios of a carbon source to an autoclave capacity as illustrated in Table 1 below and then in the obtained Si nanoparticle-carbon core-shell structure, the thickness of the carbon shell was measured.

TABLE 1

| Experimental Example | Vol % ratio | Thickness of carbon shell (nm) |
|---|---|---|
| 2-1 | 1:0.015 | 1 |
| 2-2 | 1:0.0375 | 4 |
| 2-3 | 1:0.06 | 6 |
| 2-4 | 1:0.12 | 10 |
| 2-5 | 1:0.2 | 16 |

FIGS. 4A to 4E illustrate images obtained by measuring results obtained in Experimental Examples 2-1 to 2-5 by high-resolution TEM (HRTEM). It can be seen that the thickness of the formed carbon shell may be controlled by controlling the vol % ratio of the carbon source to the autoclave capacity.

Experimental Example 3

In Experimental Example 3, in order to determine an effect of the reaction temperature, other conditions were the same as the experiment of Experimental Example 1. A result of measuring a Raman spectrum for the resulting material obtained after varying the reaction temperature as (a) 550° C., (b) 650° C., (c) 750° C., and (d) 850° C. was illustrated in FIG. 5.

Figure 5:
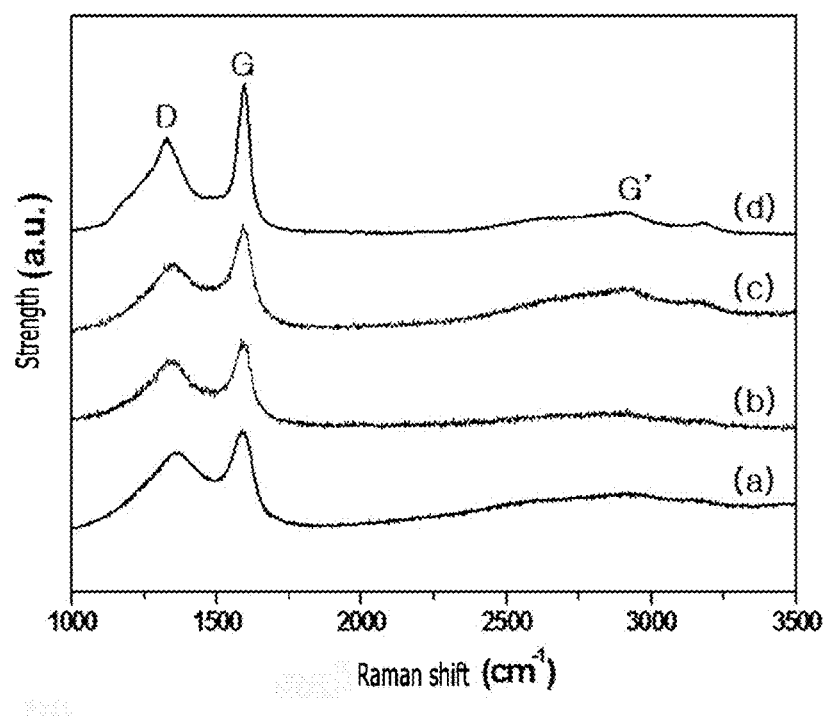
FIG. 5 is a Raman spectrum of resulting materials obtained by varying a reaction temperature.

From the result of FIG. 5, it was verified that as the temperature was increased, sharpness of a G-peak (1590 $cm^{-1}$) meaning crystallinity of the carbon shell was increased. Accordingly, it can be seen that as the synthesis temperature is increased, the crystallinity of the carbon shell is enhanced.

Experimental Example 4

In Experimental Example 4, like Experimental Example 1, Si nanoparticles having a diameter of about 80 nm and crystallinity and benzene ($C_6H_6$) as a carbon source were supplied. However, a reaction was performed by varying vol % ratios of a carbon source to an autoclave capacity as illustrated in Table 2 below and then the obtained resulting material was observed. In Experimental Example 4-4, the Si nanoparticles were not supplied, but only the carbon source was supplied.

TABLE 2

| Experimental Example | Vol % ratio | Whether to supply Si nanoparticles | Product |
|---|---|---|---|
| 4-1 | 1:0 | o | Si nanoparticles |
| 4-2 | 1:0.2 | o | 100% Si nanoparticle-carbon core-shell |
| 4-3 | 1:0.3 | o | Si nanoparticle-carbon core-shell & carbon spheres having 5 μm size |
| 4-4 | 1:1.0 | x | 100% carbon spheres having 5 μm size |

Figure 6A:
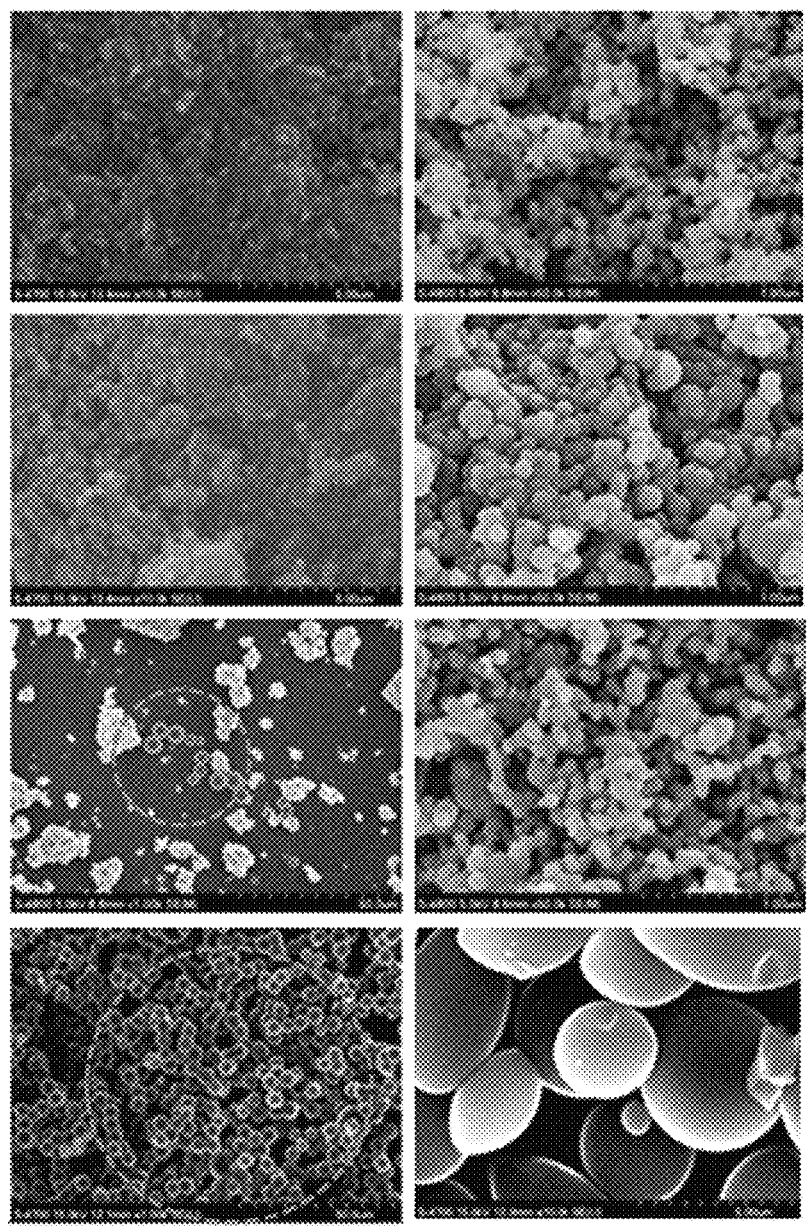
FIGS. 6A to 6D illustrate images obtained by measuring resulting materials obtained in Experimental Examples 4-1 to 4-4 by scanning electron microscopy (SEM)
Figure 6B:
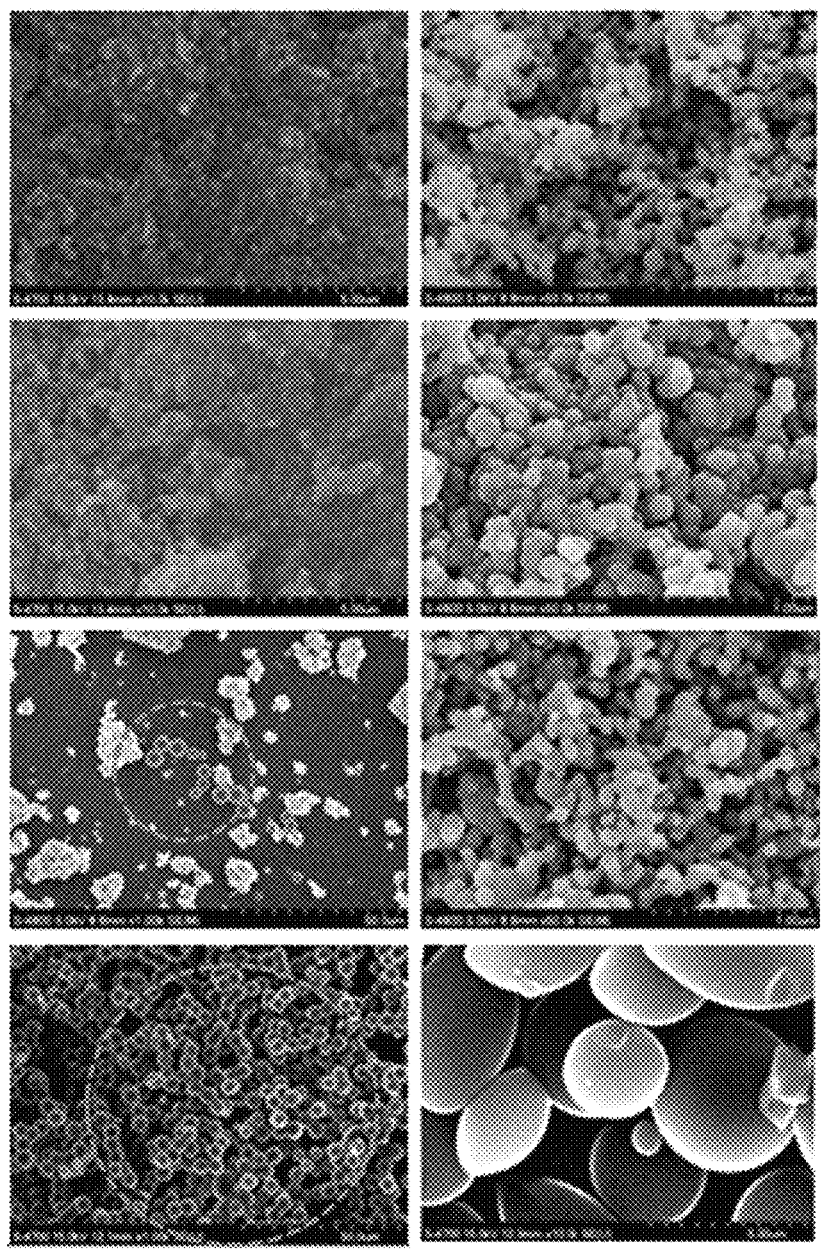
Figure 6C:
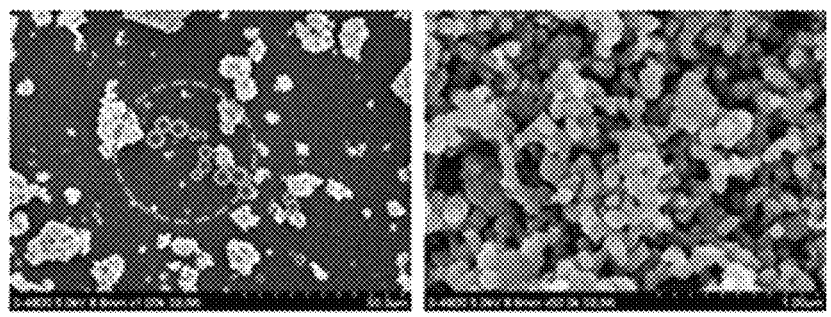
Figure 6D:
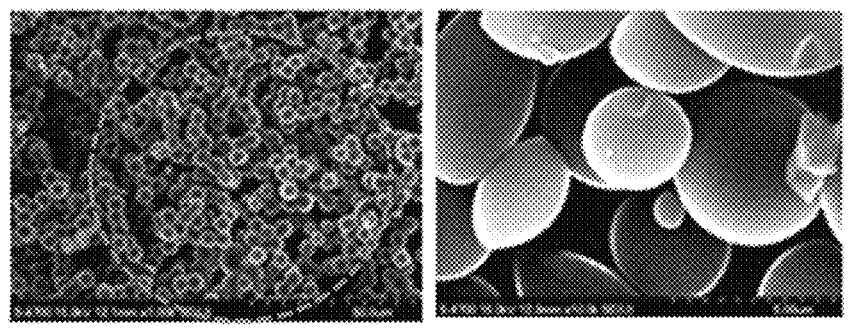

FIGS. 6A to 6D illustrate images obtained by measuring products obtained in Experimental Examples 4-1 to 4-4 by SEM. In the case where the nanoparticles were supplied and the carbon source was not present, only the Si nanoparticles were present and a large change was not shown (FIG. 6A) and as a value of an autoclave volume to a volume of the carbon source was increased, the thickness of the carbon shell in the Si nanoparticle-carbon core-shell structure was increased (FIGS. 6B and 6C). However, it was verified that when the value was equal to or greater than 0.3, carbon spheres (marked by a circle) having about 5 μm size were simultaneously formed. It was verified that when the Si nanoparticles were not supplied and only the carbon source was supplied, only the carbon spheres having about 5 μm size were generated 100% (FIG. 6D).

As a result, it can be seen that when there is no supply amount of carbon source, bare particles without almost carbon coating are formed as they are, and when the supply amount of carbon source is too large, the nanoparticle-carbon core-shell structure is not formed, but the carbon spheres with micro sizes are mainly formed. Accordingly, it can be seen that it is important to control the supply amount of carbon source to a range of preventing the bare nanoparticles without carbon coating and the carbon spheres with micro sizes from being generated.

Experimental Example 5

Experimental Example 5 is to verify whether a Si nanoparticle-carbon core-shell structure is formed like Experimental Example 1 in the case of using various carbon sources. Under a condition disclosed in Table 3 below, Si nanoparticles and different carbon sources were supplied and reacted for 1 hour at 750° C. like Experimental Example 1 to obtain the Si nanoparticle-carbon core-shell structure. However, only in Experimental Example 5-3, the Si nanoparticles and the carbon sources reacted with each other for 1 hour at 800° C. like Experimental Example 1 to obtain a Ni nanoparticle-carbon core-shell structure.

TABLE 3

| Experimental Example | Nanoparticle (diameter, property) | Carbon source | Supply condition |
|---|---|---|---|
| 5-1 | Si (80 nm, crystalline) | Paraffin ($C_xH_y$) | Autoclave capacity:N containing carbon source = 1:0.2 (vol % ratio) |
| 5-2 | Si (80 nm, crystalline) | Pyrene ($C_{16}H_{10}$) | Si nanoparticle:carbon source (1:0.05 (wt. % ratio)) |
| 5-3 | Ni (50 nm, crystalline) | methane ($CH_4$) | 15 atm |
| 5-4 | Si (10 nm, crystalline) | Paraffin ($C_xH_y$) | Autoclave capacity:carbon source = 1:0.5 (vol % ratio) |
| 5-5 | Si (10 nm, crystalline) | Pyrene ($C_{16}H_{10}$) | Si nanoparticle:carbon source (1:0.1 (wt. % ratio)) |

Figure 7A:
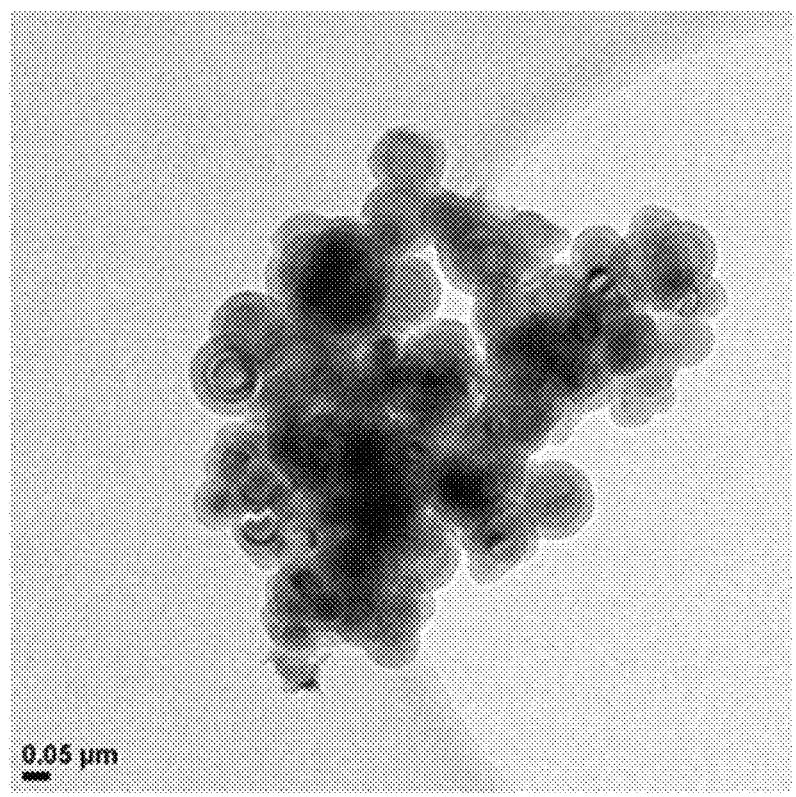
FIGS. 7A and 7B are images obtained by measuring a resulting material obtained in Experimental Example 5-1 by TEM and HRTEM, respectively.
Figure 7B:
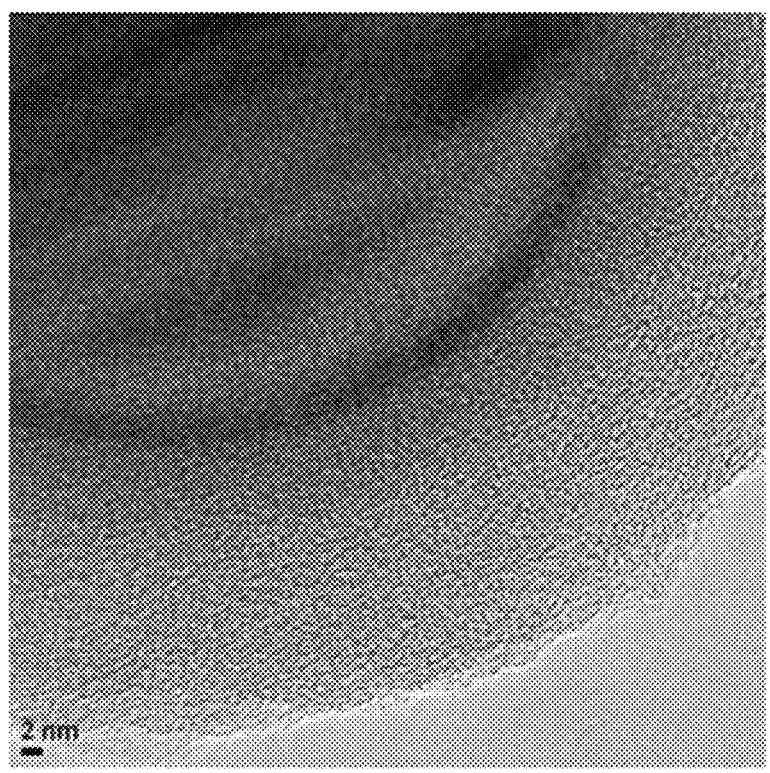

FIGS. 7A and 7B are images obtained by measuring a resulting material obtained in Experimental Example 5-1 by TEM and HRTEM, respectively, and in FIG. 7A, it can be seen that the carbon shell is coated on the surface of the Si nanoparticle. In FIG. 7B, it can be seen that a carbon shell with a thickness of 15 nm is coated on the surface of the Si nanoparticle.

Figure 8:
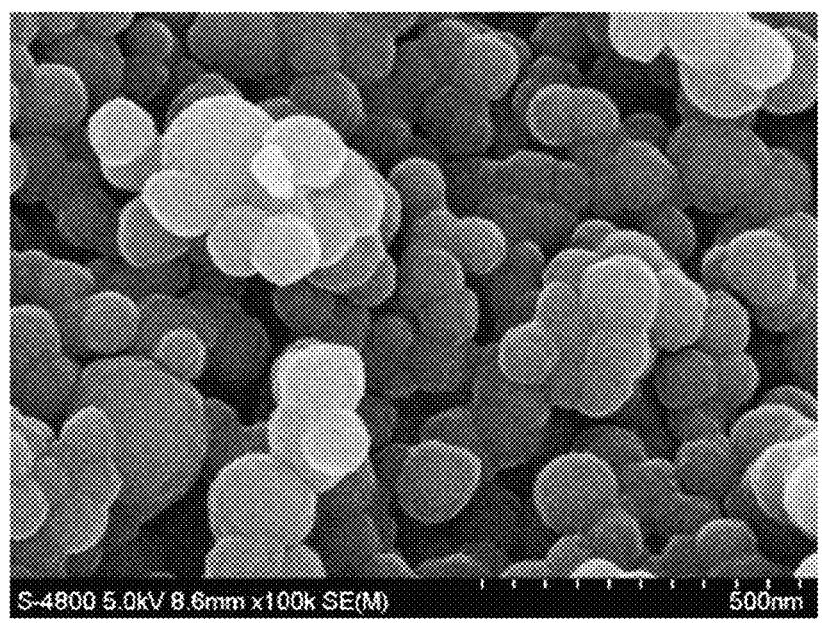
FIG. 8 is an image obtained by measuring a resulting material obtained in Experimental Example 5-2 by SEM.

FIG. 8 illustrates a result obtained by measuring a resulting material obtained in Experimental Example 5-2 by a scanning electron microscopy (SEM). In FIG. 8, it can be seen that the carbon shell is coated on the surface of the Si nanoparticle. Further, with respect to the obtained resulting material, in the inside of the resulting material obtained from an energy dispersive X-ray (EDX) mapping result, a component was verified as Si and most of an outer surface layer was verified as a C component, and it can be seen that the detected O component is caused from an oxide naturally formed on the surface of the Si nanoparticle.

Figure 9A:
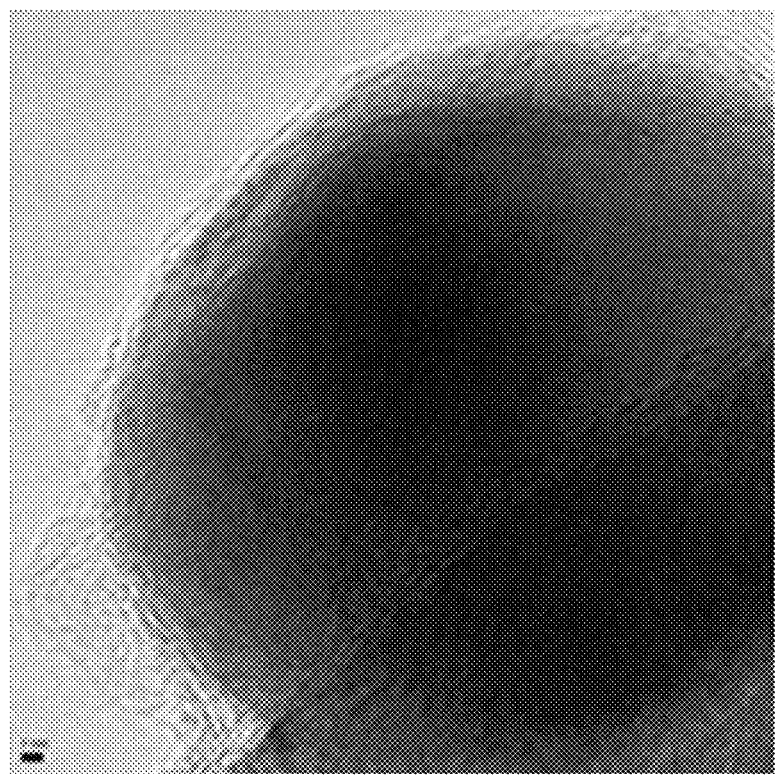
FIGS. 9A and 9B are images obtained by measuring a resulting material obtained in Experimental Example 5-3 by TEM and EDX, respectively.
Figure 9B:
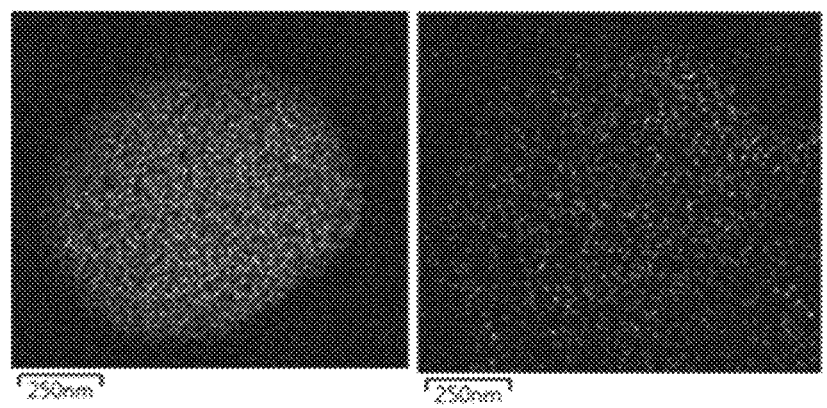
Figure 10A:
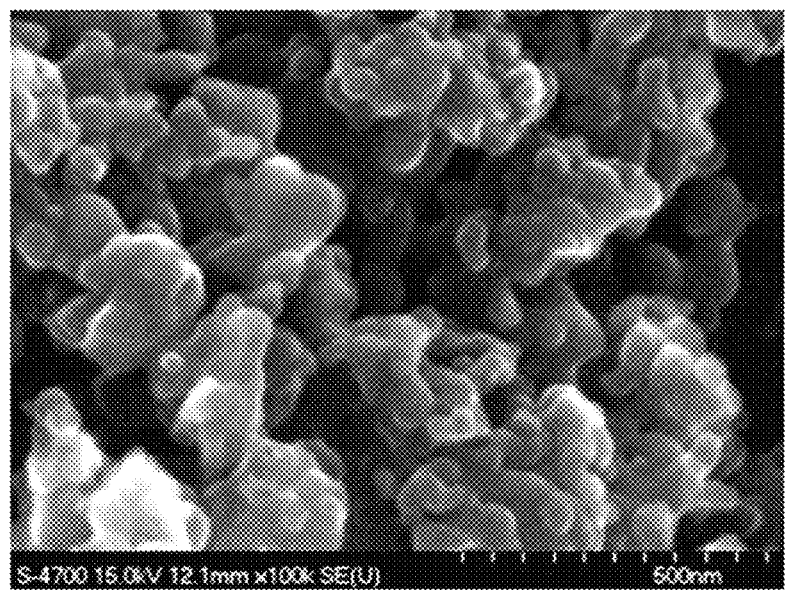
FIGS. 10A and 10B are images obtained by measuring a resulting material obtained in Experimental Example 5-4 by SEM and HRTEM, respectively.
Figure 10B:
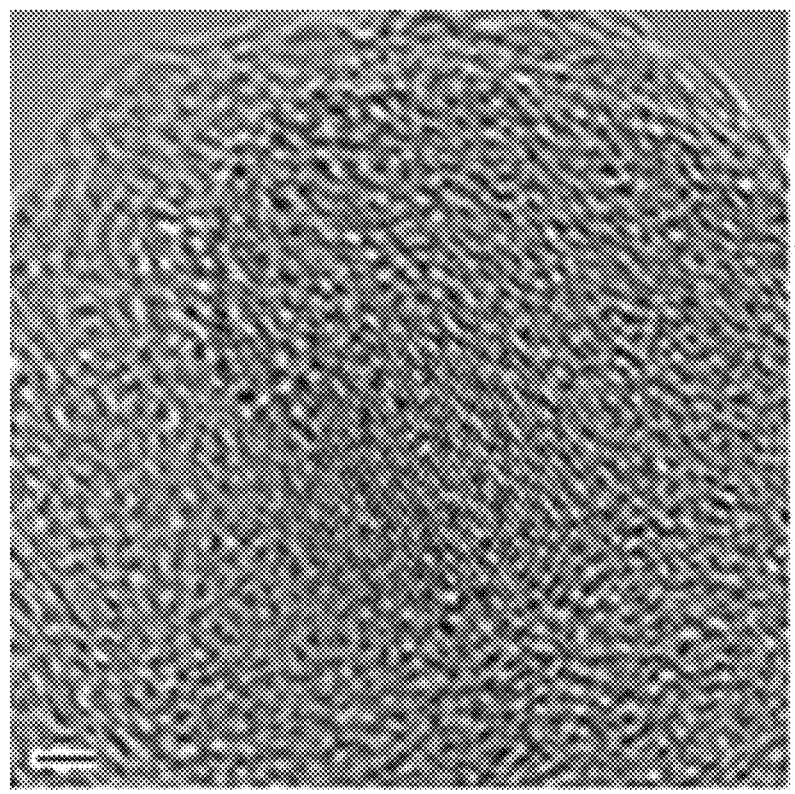

FIGS. 9A and 9B are results obtained by measuring a resulting material obtained in Experimental Example 5-3 by TEM and EDX, respectively. The used nanoparticles are crystalline Ni nanoparticles with sizes of 50 nm. In FIG. 9A, it is verified that the surface of the Ni nanoparticle is coated with a carbon layer of about 1 to 2 nm. FIG. 9B shows an EDX mapping image of the coated Ni nanoparticles. In FIGS. 9A and 9B, it can be seen that the Ni nanoparticles are coated with the carbon layer well. FIGS. 10A and 10B illustrate a result obtained by measuring a resulting material obtained in Experimental Example 5-4 by SEM and HRTEM, respectively. From the result of FIGS. 10A and 10B, it can be seen that the carbon shell is coated on the surface of the Si nanoparticle.

Figure 11:
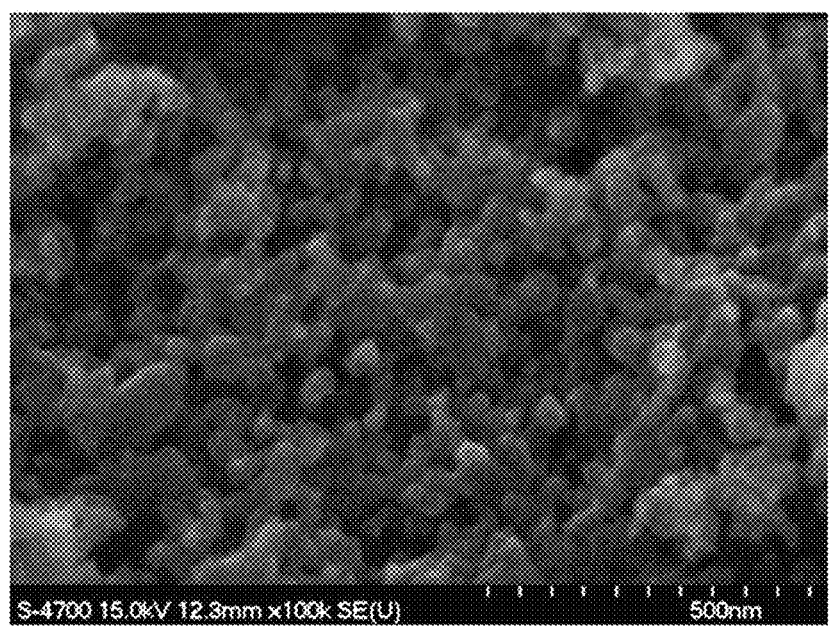
FIG. 11 is an image obtained by measuring a resulting material obtained in Experimental Example 5-5 by SEM.

FIG. 11 illustrates a result obtained by measuring a resulting material obtained in Experimental Example 5-5 by a scanning electron microscopy (SEM). In FIG. 11, it can be seen that the carbon shell is coated on the surface of the Si nanoparticle. Further, with respect to the obtained resulting material, at the inside of the resulting material obtained from an EDX mapping result, a component was verified as Si and most of an external surface layer was verified as a C component.

Experimental Example 6

Experimental Example 6 is to verify whether a nanoparticle-carbon core-shell structure is formed like Experimental Example 1 in the case of using various metal or semiconductor nanoparticles. Under a condition disclosed in Table 4 below, various nanoparticles and carbon sources were supplied and reacted with each other for 1 hour at a reaction temperature disclosed in Table 4 below to obtain a nanoparticle-carbon core-shell structure.

TABLE 4

| Experimental Example | Nanoparticle (diameter, property) | Carbon source | Supply condition | Reaction temperature (° C.) |
|---|---|---|---|---|
| 6-1 | Ge (<200 nm, crystalline) | Benzene ($C_6H_6$) | 1:0.12 (Vol % ratio) | 750 |
| 6-2 | Cu (80 nm, crystalline) | Benzene ($C_6H_6$) | 1:0.12 (Vol % ratio) | 750 |
| 6-3 | Fe (50 nm, crystalline) | Benzene ($C_6H_6$) | 1:0.06 (Vol % ratio) | 750 |
| 6-4 | Al (40 nm, crystalline) | Benzene ($C_6H_6$) | 1:0.06 (Vol % ratio) | 600 |
| 6-5 | Al (40 nm, crystalline) | paraffin ($C_xH_y$) | 1:0.06 (Vol % ratio) | 600 |
| 6-6 | Pt (5~10 nm, crystalline) | Benzene ($C_6H_6$) | 1:0.0375 (Vol % ratio) | 750 |
| 6-7 | Pt (5~10 nm, crystalline) | Benzene ($C_6H_6$) | 1:0.01 (Vol % ratio) | 750 |
| 6-8 | Ag (300 nm, crystalline) | Benzene ($C_6H_6$) | 1:1 (Vol % ratio) | 750 |

Figure 12:
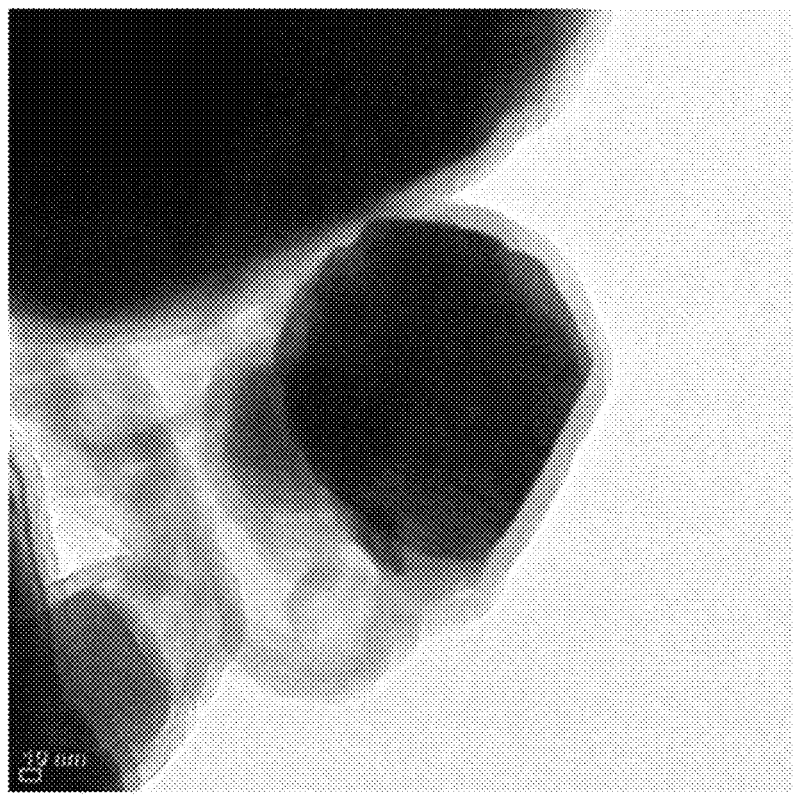
FIG. 12 is an image obtained by measuring a resulting material obtained in Experimental Example 6-1 by TEM.

FIG. 12 is an image obtained by measuring a resulting material obtained in Experimental Example 6-1 by TEM and it may be verified that a carbon shell with a thickness of 15 nm is coated on the surface of a Ge nanoparticle. In addition, a diffraction pattern obtained from a fast Fourier transform (FFT) for the obtained resulting material verifies that an internal core is crystalline Ge. Further, with respect to the obtained resulting material, at the inside of the resulting material obtained from an EDX mapping result, a component was verified as Ge and most of an external surface layer was verified as a C component, and O and N were almost not observed.

Figure 13A:
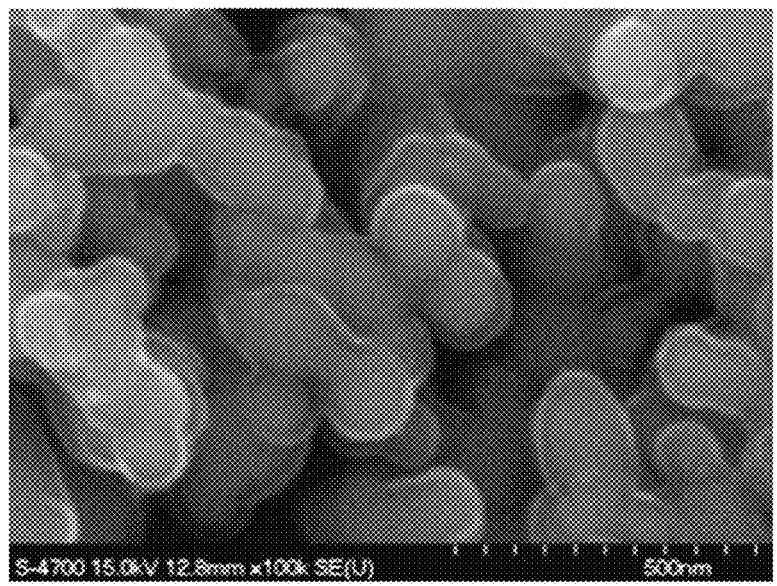
FIGS. 13A and 13B are images obtained by measuring a resulting material obtained in Experimental Example 6-2 by SEM and TEM, respectively.
Figure 13B:
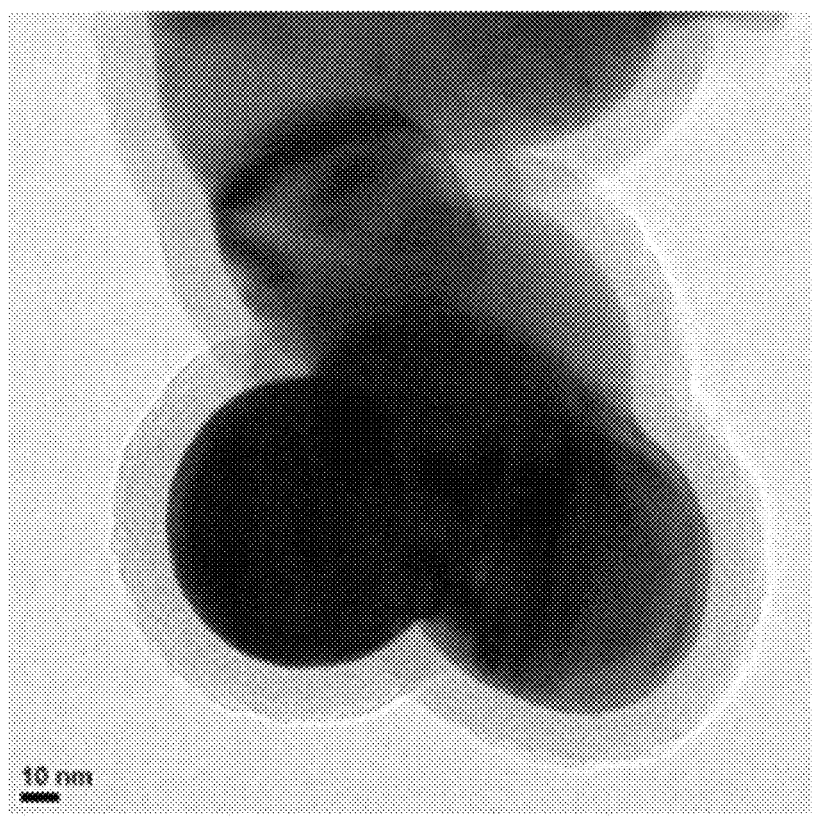
Figure 14A:
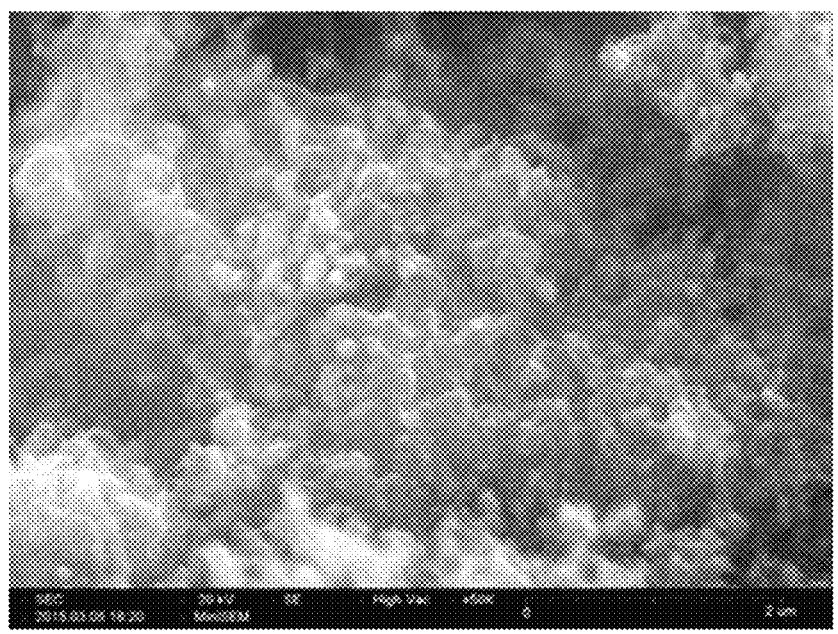
FIGS. 14A and 14B are an SEM image and an EDX graph of a resulting material obtained in Experimental Example 6-3, respectively.
Figure 14B:
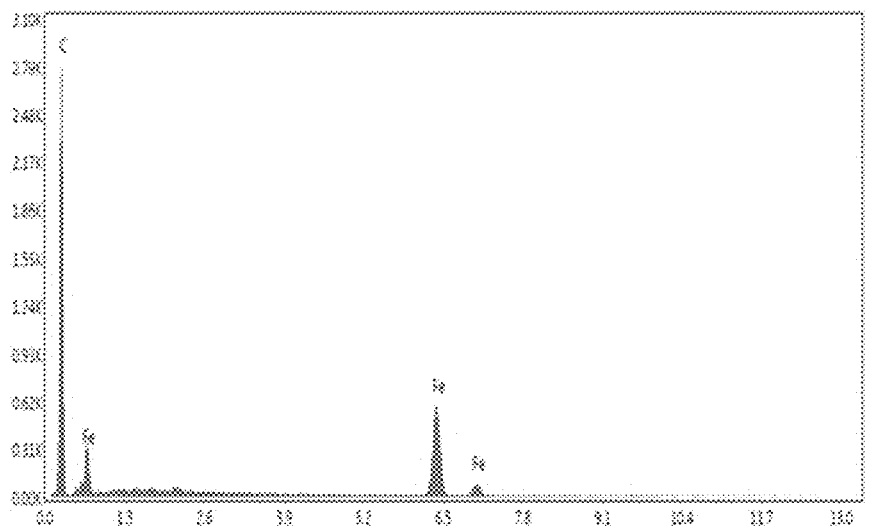

FIGS. 13A and 13B are images obtained by measuring a resulting material obtained in Experimental Example 6-2 by SEM and TEM, respectively. It may be verified that a Cu nanoparticle is coated well by a carbon shell, and it may be verified that a Cu nanoparticle is coated by a carbon shell of 100 nm. FIGS. 14A and 14B are an SEM image and an EDX graph of a resulting material obtained in Experimental Example 6-3, respectively. In FIG. 14A, it may be verified that a Fe nanoparticle is coated by the carbon shell well. In FIG. 14B, it can be seen that Fe and C are dominantly observed, Fe corresponds to a core, C is verified as a coating layer stacking the Fe nanoparticles, and the O component is not observed.

Figure 15A:
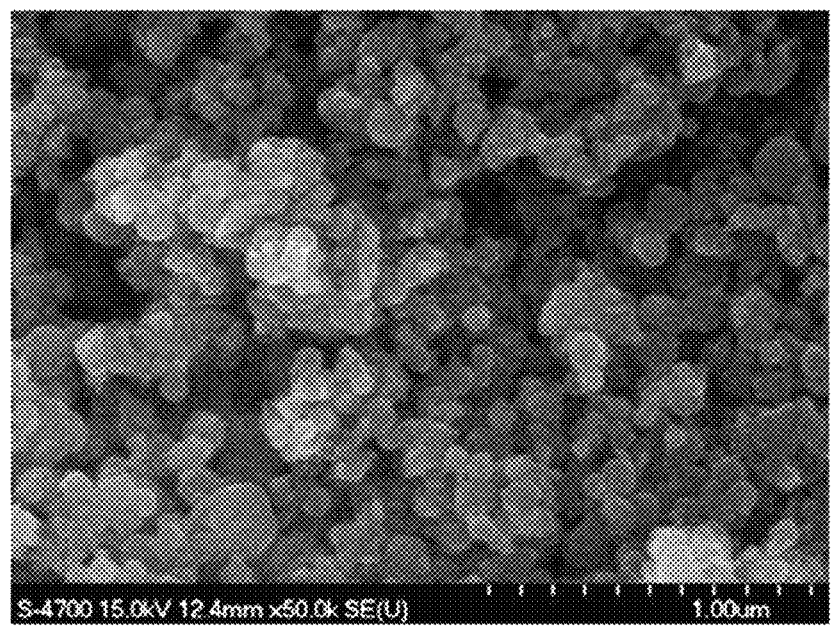
FIGS. 15A and 15B are an SEM image and an EDX graph of a resulting material obtained in Experimental Example 6-4, respectively.
Figure 15B:
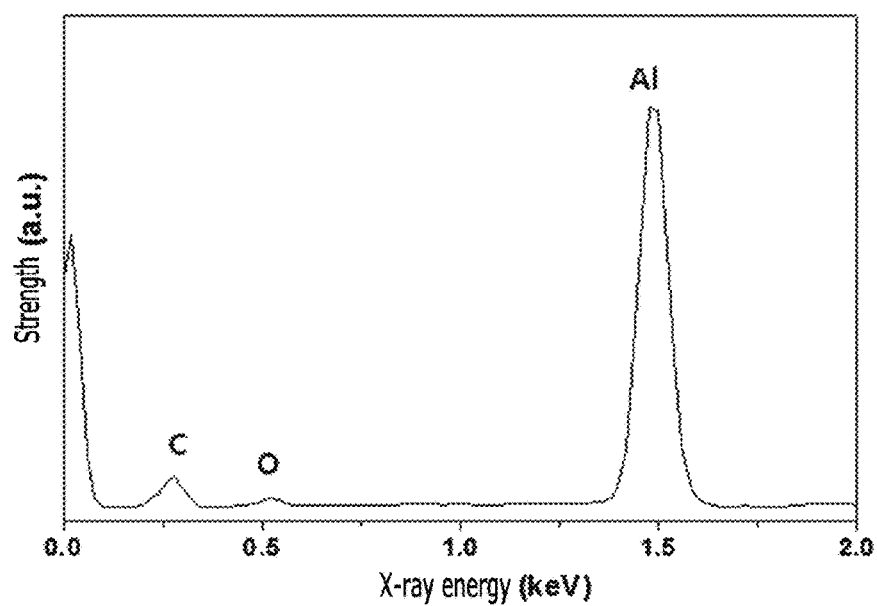

FIGS. 15A and 15B are an SEM image and an EDX graph of a resulting material obtained in Experimental Example 6-4, respectively. In FIG. 15A, it may be verified that an Al nanoparticle is coated by a carbon shell well. In FIG. 15B, it can be seen that Al and C are dominantly observed, Al corresponds to a core, C is verified as a coating layer on which the Al nanoparticles are stacked. It is verified that a small amount of O component is derived from an oxide layer formed on the Al surface before coating.

Figure 16A:
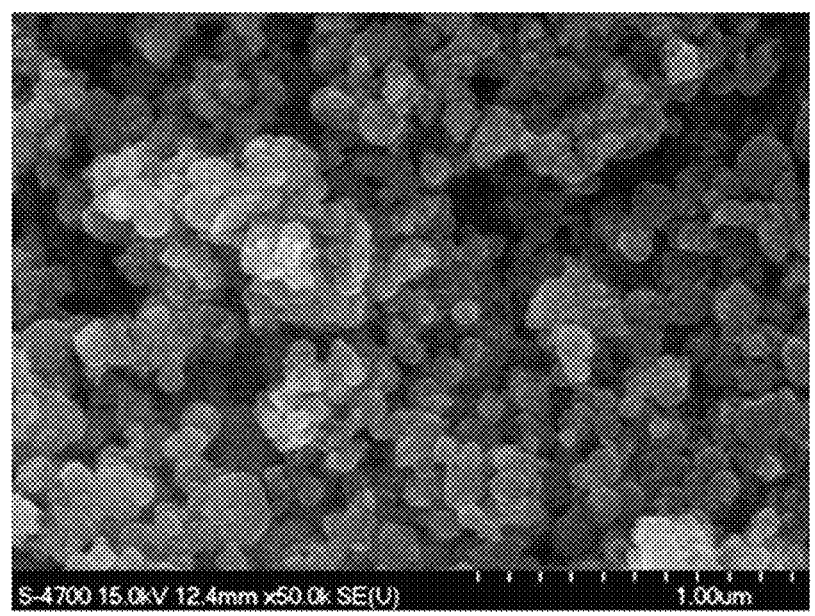
FIGS. 16A and 16B are an SEM image and a TEM image of a resulting material obtained in Experimental Example 6-5, respectively.
Figure 16B:
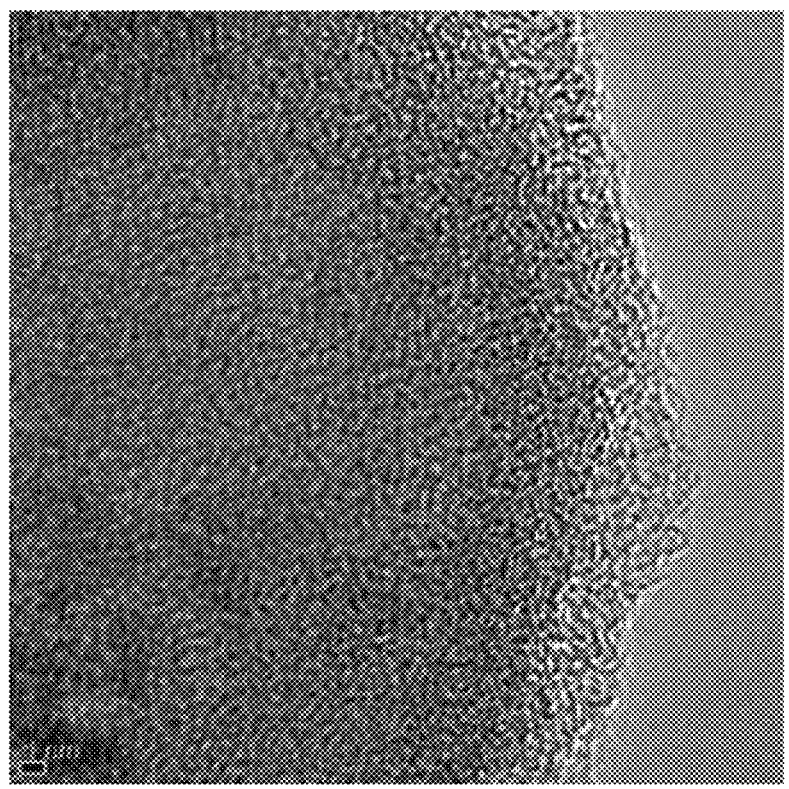

FIGS. 16A and 16B are an SEM image and a TEM image of a resulting material obtained in Experimental Example 6-5, respectively. In FIG. 16A, it may be verified that an Al nanoparticle is coated by a carbon shell well. In FIG. 16B, it may be verified that the Al nanoparticle is coated by the carbon shell with a thickness of 3 nm. In addition, a diffraction pattern obtained from a fast Fourier transform (FFT) for the obtained resulting material verifies that an internal core is crystalline Al. Further, with respect to the obtained resulting material, in the inside of the resulting material obtained from the EDX mapping result, a component was Al and most of outer surface layer was verified as a C component, and it is verified that an O component observed with a small amount is derived from an oxide layer formed on the Al surface before coating.

Figure 17A:
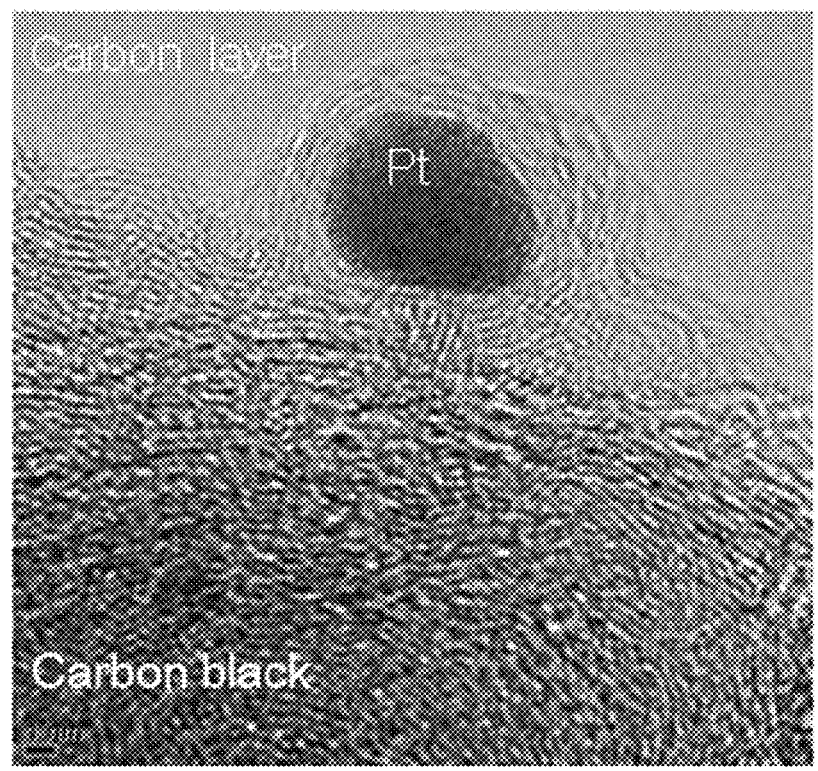
FIGS. 17A and 17B are TEM images of resulting materials obtained in Experimental Example 6-6, respectively.
Figure 17B:
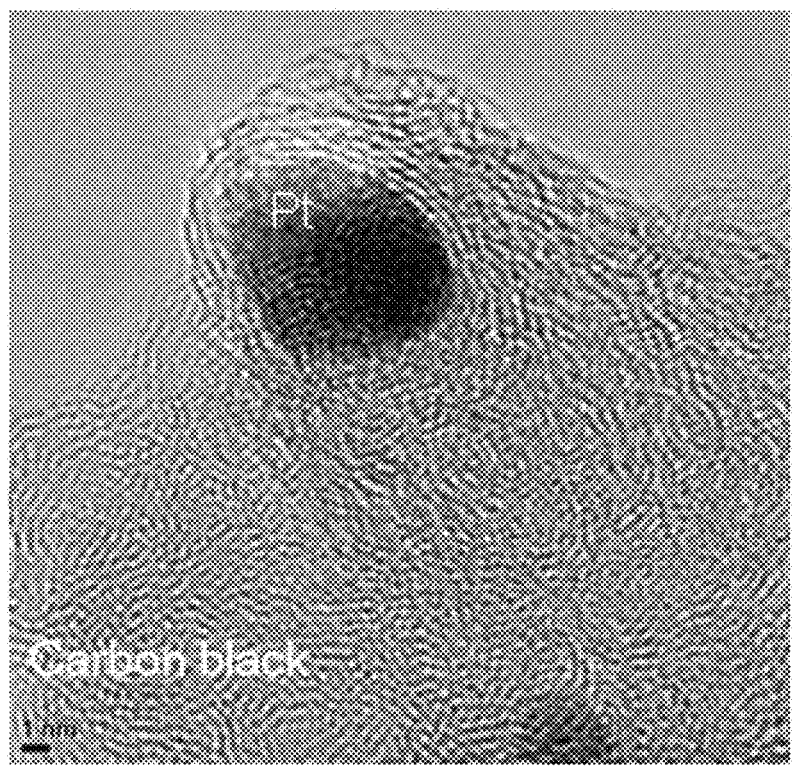

FIG. 17 is a TEM image of a resulting material obtained in Experimental Example 6-6. In FIG. 17, it may be verified that Pt nanoparticles are uniformly coated by carbon shells with thicknesses of 3 to 4 nm. Further, with respect to the obtained resulting material, it is verified that at the inside of the resulting material obtained from the EDX mapping result, a component is Pt and most of outer surface layer is verified as a C component.

Figure 18A:
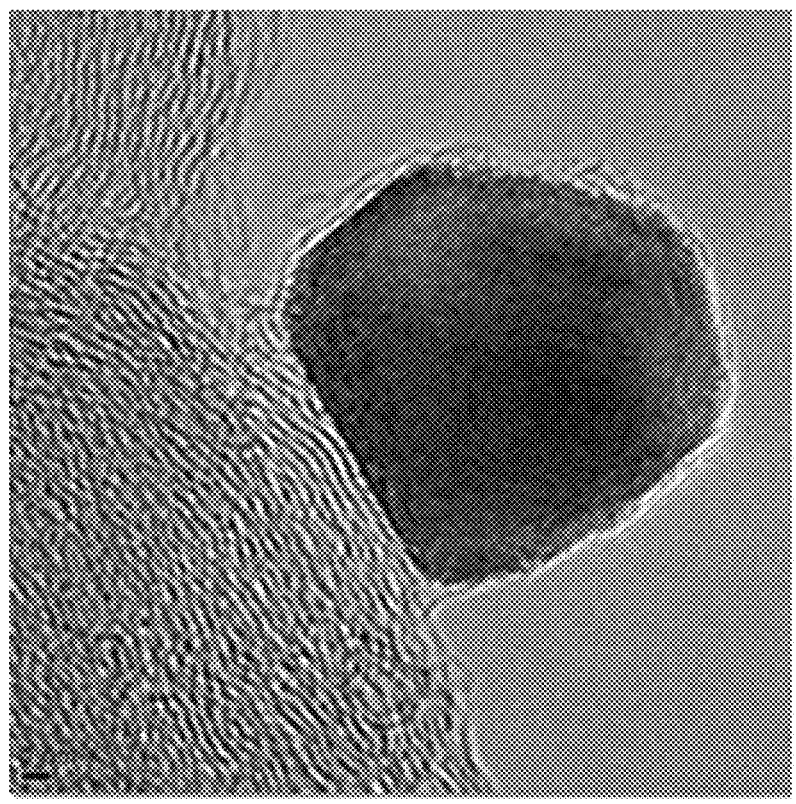
FIGS. 18A and 18B are TEM images of resulting materials obtained in Experimental Example 6-7, respectively.
Figure 18B:
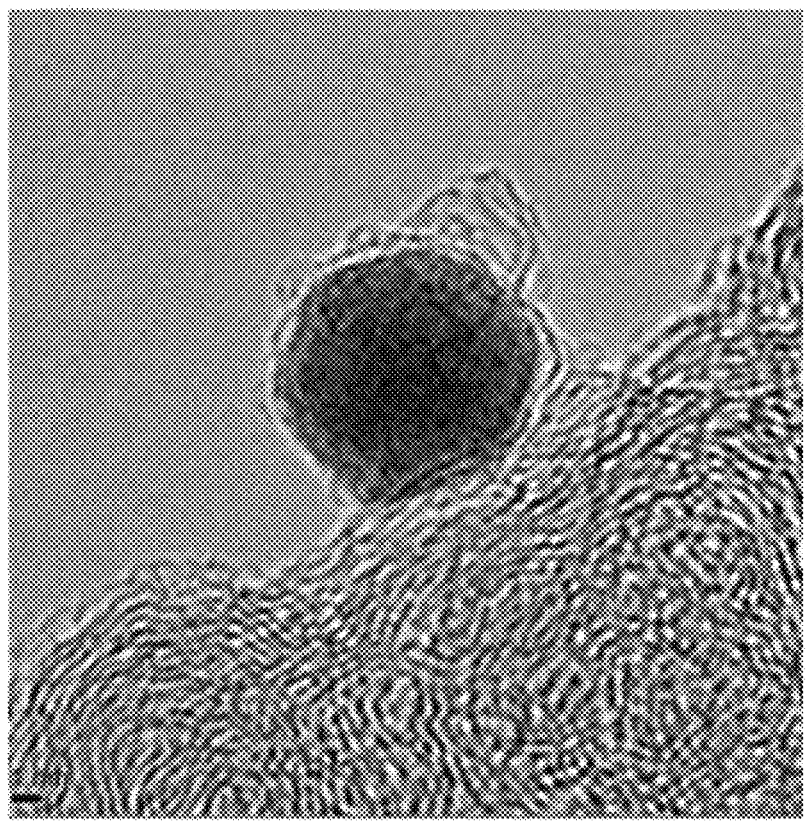

FIG. 18 is a TEM image of a resulting material obtained in Experimental Example 6-7. In FIG. 18, it may be verified that Pt nanoparticles are uniformly coated by carbon shells with thicknesses of about 1 nm. From the results of Experimental Example 6-6 and Experimental Example 6-7, it can be seen that even in the metal nanoparticles, the thickness of the carbon shell coated on the surface of the metal (Pt) nanoparticle may be controlled by controlling the amount of carbon source.

Figure 19A:
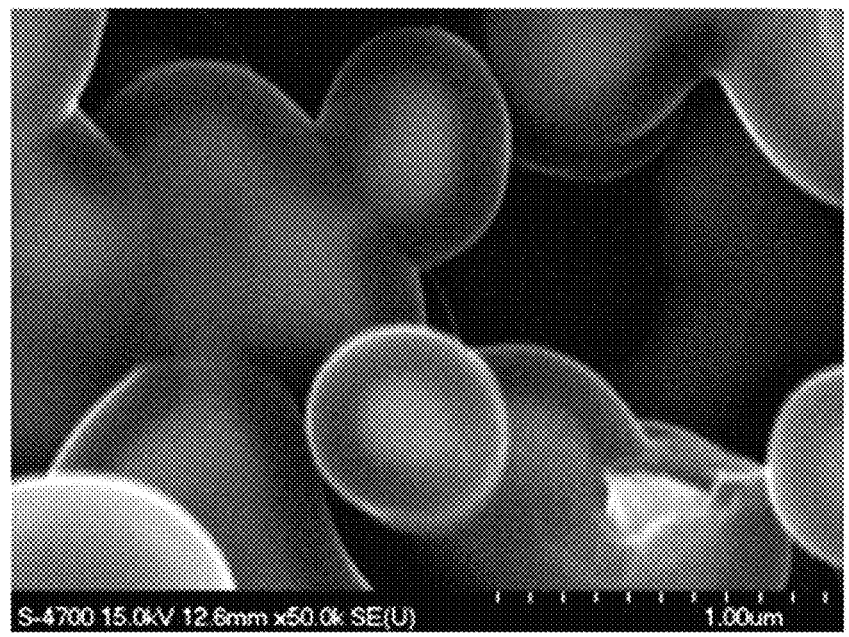
FIGS. 19A and 19B are an SEM image and a TEM image of a resulting material obtained in Experimental Example 6-8, respectively.
Figure 19B:
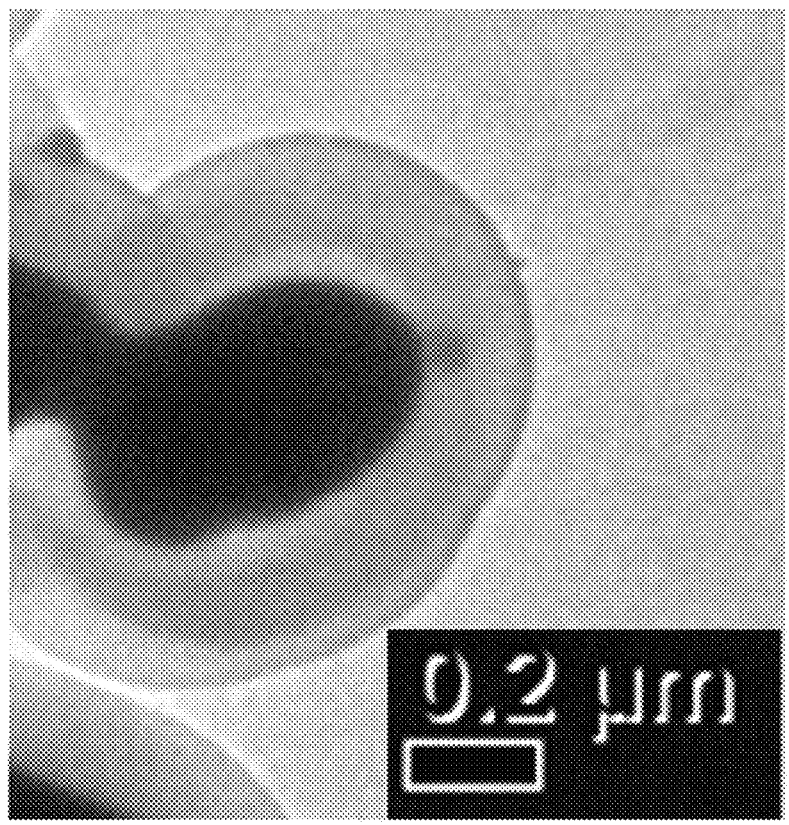

FIGS. 19A and 19B are an SEM image and a TEM image of a product obtained in Experimental Example 6-8, respectively. It may be verified that an Ag nanoparticle is coated well by a carbon shell, and it may be verified that an Ag nanoparticle is coated with a carbon shell of 100 nm.

Experimental Example 7

Experimental Example 7 is to verify whether a nanoparticle-carbon core-shell structure is formed even in the case of using various metal oxide nanoparticles. Under a condition disclosed in Table 5 below, various nanoparticles and carbon sources were supplied and reacted with each other for 1 hour at a reaction temperature disclosed in Table 4 below to obtain a nanoparticle-carbon core-shell structure.

TABLE 5

| Experimental Example | Nanoparticle (diameter, property) | Carbon source | Supply condition | Reaction temperature (° C.) |
| --- | --- | --- | --- | --- |
| 6-1 | Fe$_3$O$_4$ (50 nm, crystalline) | Benzene (C$_6$H$_6$) | 1:0.12 (Vol % ratio) | 750 |
| 6-2 | SnO$_2$ (50 nm, crystalline) | Benzene (C$_6$H$_6$) | 1:0.15 (Vol % ratio) | 750 |
| 6-3 | ZnO (100 nm, crystalline) | Benzene (C$_6$H$_6$) | 1:0.12 (Vol % ratio) | 750 |
| 6-4 | Al$_2$O$_3$ (40 nm, crystalline) | Benzene (C$_6$H$_6$) | 1:0.06 (Vol % ratio) | 550~600 |
| 6-5 | SiOx nanorod (20 nm, crystalline) | Benzene (C$_6$H$_6$) | 1:0.06 (Vol % ratio) | 750 |

Figure 20A:
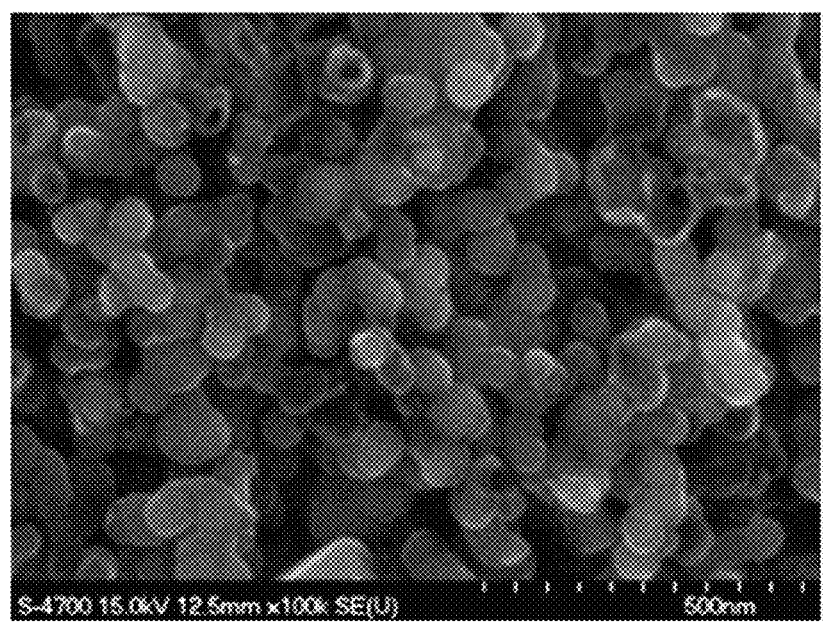
FIGS. 20A and 20B are SEM and TEM images of a resulting material obtained in Experimental Example 7-1 and FIGS. 20C and 20D are photographs illustrating that $Fe_3O_4$ nanoparticle-carbon core-shell structures are drawn in a direction close to a magnet.
Figure 20B:
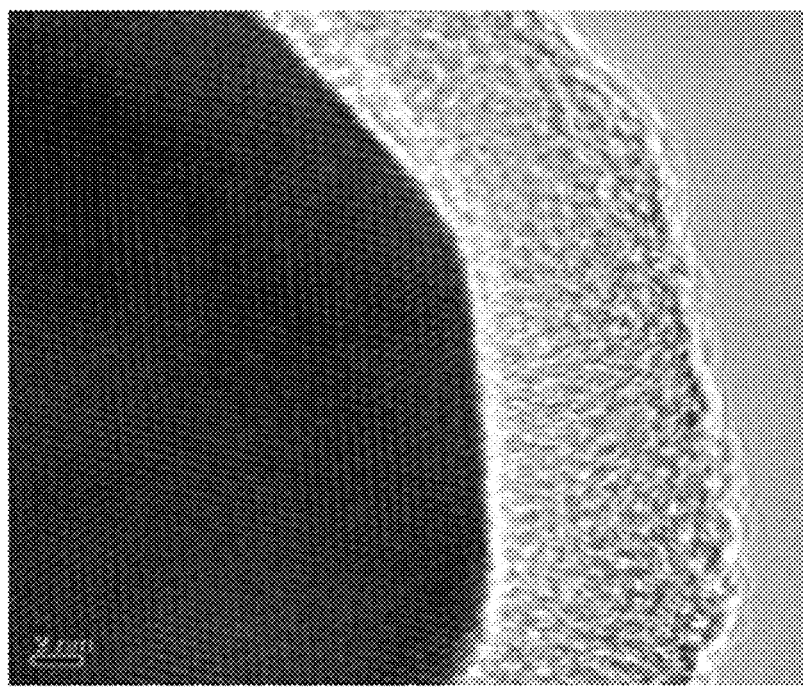

FIGS. 20A and 20B are SEM image and TEM images of a resulting material obtained in Experimental Example 7-1, respectively. It may be verified that a Fe$_3$O$_4$ nanoparticle is coated by a carbon shell well, and it may be verified that a Fe$_3$O$_4$ nanoparticle is coated by a carbon shell of 10 nm. Further, with respect to the obtained resulting material, it is verified that at the inside of the resulting material obtained from the EDX mapping result, a component was verified as Fe$_3$O$_4$, most of outer surface layer was verified as a C component, and O was verified in both the core and the surface coating layer.

Figure 20C:
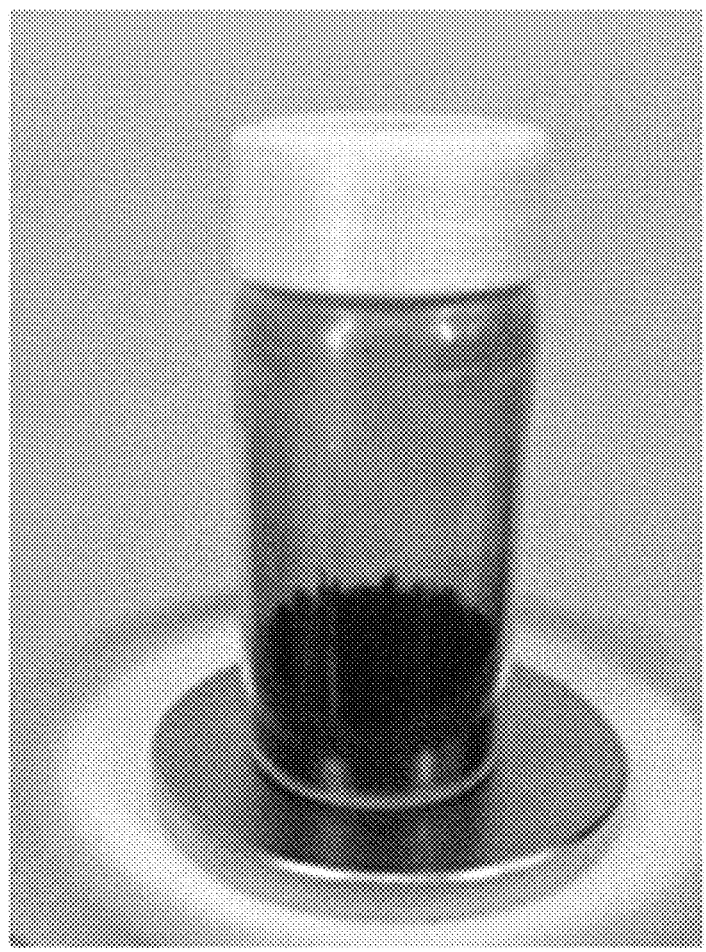
Figure 20D:

FIGS. 20C and 20D are diagrams illustrating that Fe$_3$O$_4$ nanoparticle-carbon core-shell structures are drawn in a direction close to a magnet, and in FIGS. 20C and 20D, it is shown that even after carbon coating, magnetism of the Fe$_3$O$_4$ nanoparticle is maintained as it is.

Figure 21A:
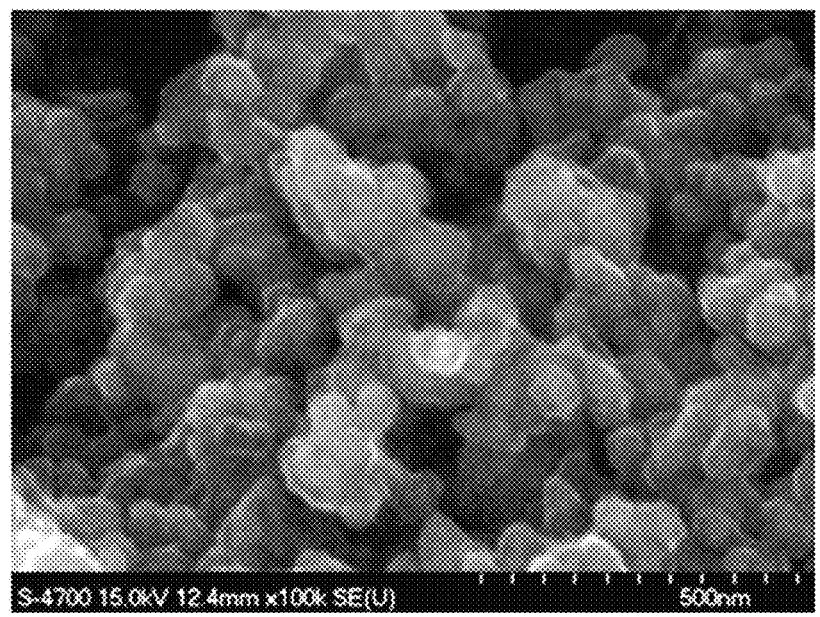
FIGS. 21A to 21C are an SEM image, a TEM image, and an EDX graph of a resulting material obtained in Experimental Example 7-2.
Figure 21B:
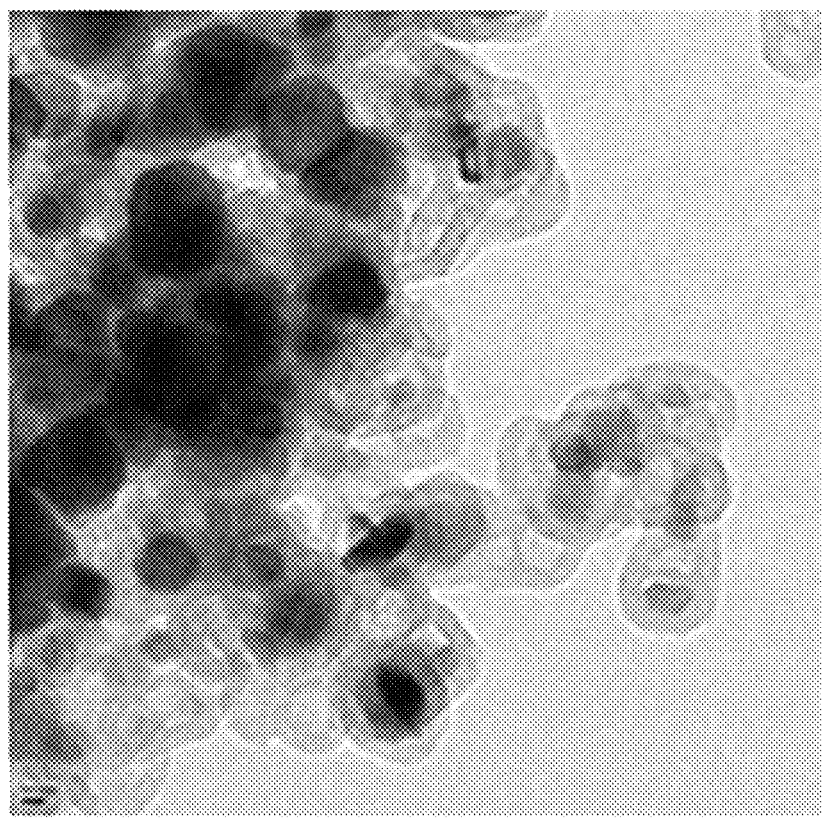
Figure 21C:
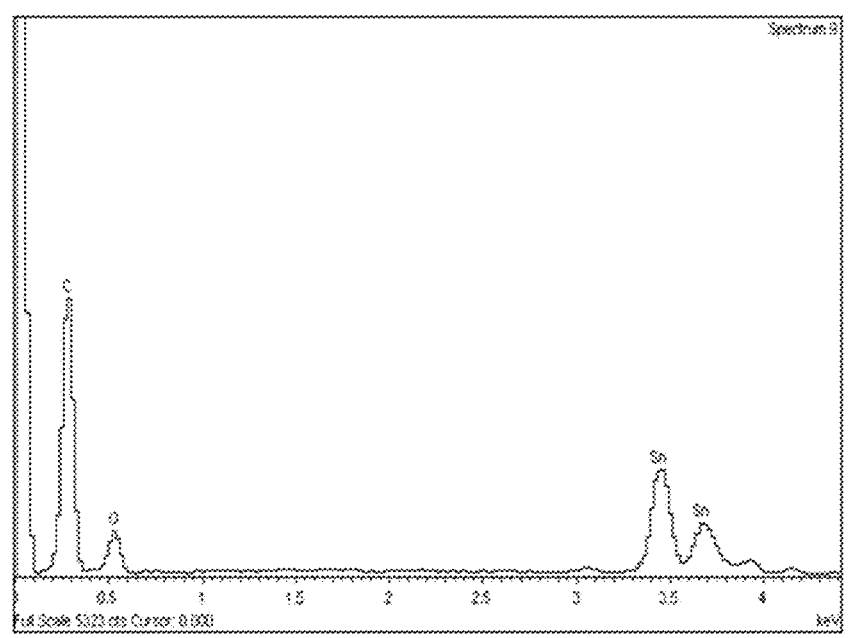

FIGS. 21A and 21B are SEM image and TEM images of a resulting material obtained in Experimental Example 7-2. In FIGS. 21A and 21B, it may be verified that SnO$_2$ nanoparticles are uniformly coated by carbon shells. Further, FIG. 21C is an EDX graph for the obtained resulting material. In FIG. 21C, Sn and C are dominantly observed and a large amount of O component is observed, and thus it can be seen that in a synthesis process, SnO$_2$ is not reduced to Sn in a high-pressure pyrolysis process of benzene as a carbon source, but is present as it is.

Figure 22A:
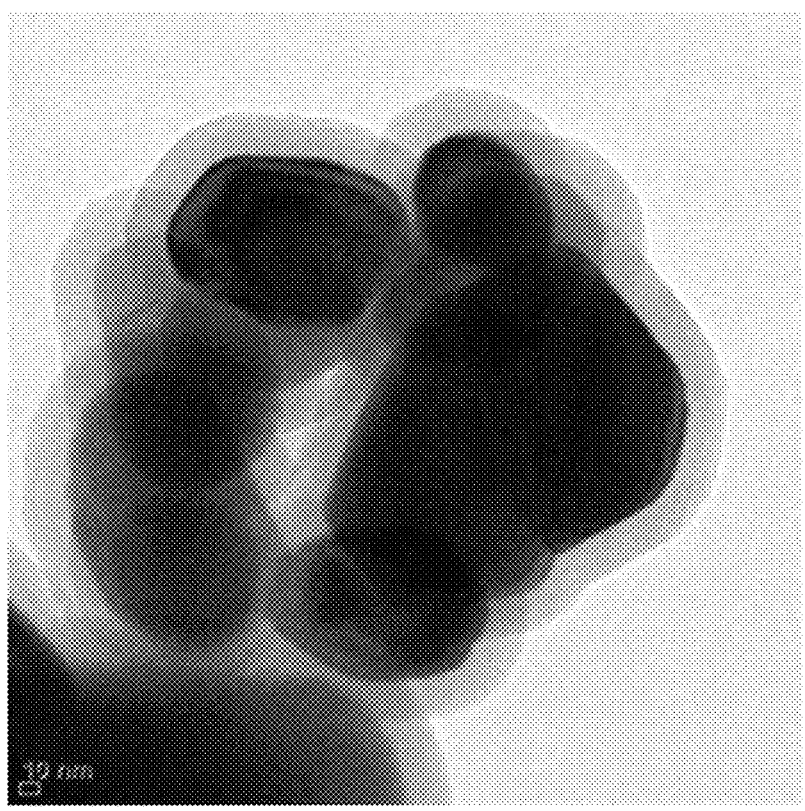
FIG. 22A is a TEM image of a resulting material obtained in Experimental Example 7-3 and FIG. 22B is an EDX graph thereof.
Figure 22B:
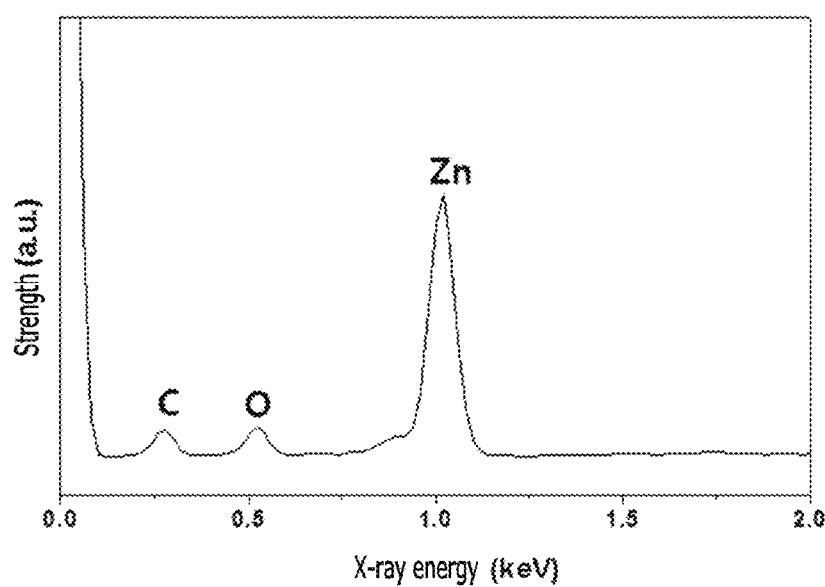

FIG. 22A is a TEM image of a resulting material obtained in Experimental Example 7-3 and FIG. 22B is an EDX graph thereof. In FIG. 22A, it can be verified that ZnO nanoparticles are uniformly coated by carbon shells. In FIG. 22B, Zn and C are dominantly observed and a large amount of O component is observed, and thus it can be seen that in a synthesis process, ZnO is not reduced to Zn in a high-pressure pyrolysis process of benzene as a carbon source, but is present as it is.

Figure 23A:
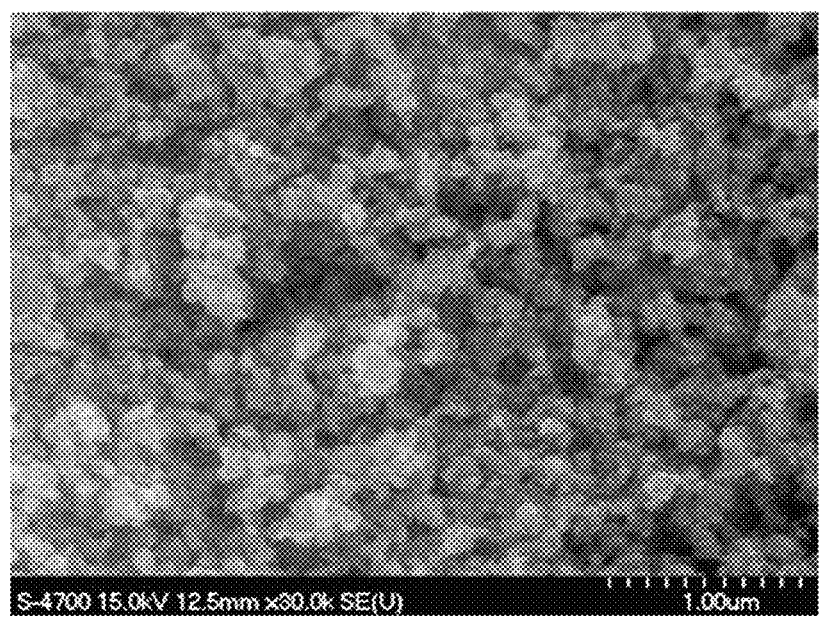
FIG. 23A is an SEM image of a resulting material obtained in Experimental Example 7-4 and FIG. 23B is an EDX graph thereof.
Figure 23B:
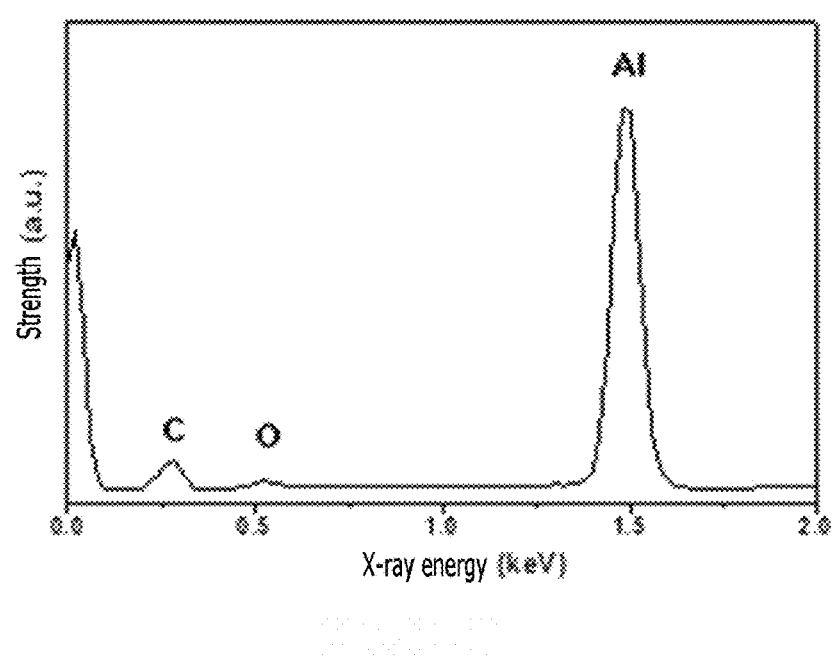

FIG. 23A is an SEM image of a resulting material obtained in Experimental Example 7-4 and FIG. 23B is an EDX graph thereof. In FIG. 23A, it can be verified that Al$_2$O$_3$ nanoparticles are uniformly coated by carbon shells. In FIG. 23B, it can be verified that Al, O, and C are dominantly observed. As a result, it can be verified that the Al$_2$O$_3$ nanoparticle is coated by the carbon shell.

Figure 24A:
FIG. 24A is an SEM image of a SiOx nanorod before carbon coating.
Figure 24B:
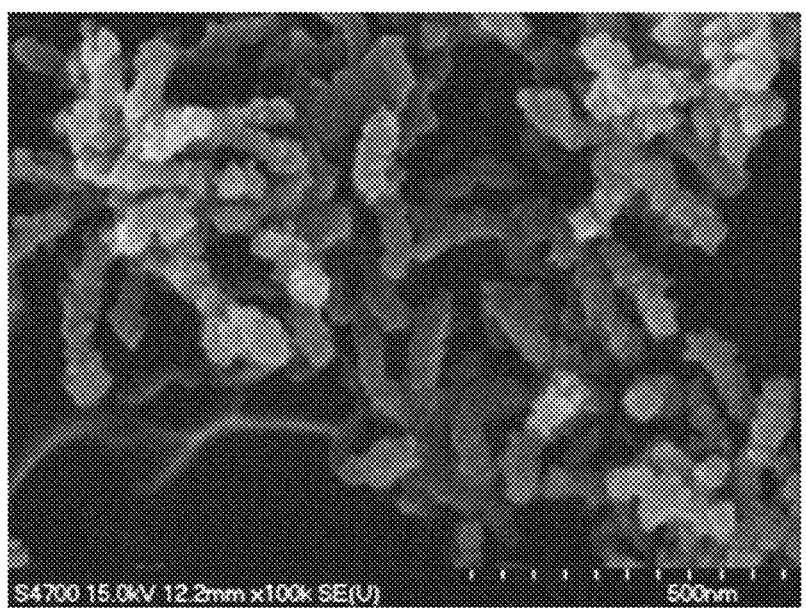
FIGS. 24B to 24D are an SEM image, an STEM image, and an EDX graph of a resulting material obtained in Experimental Example 7-5, respectively.
Figure 24C:
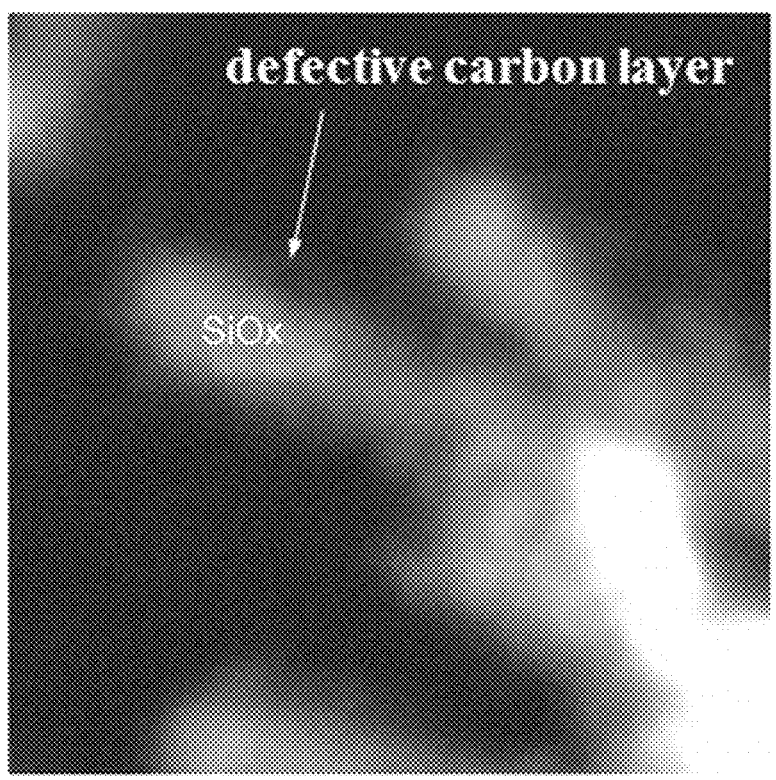
Figure 24D:
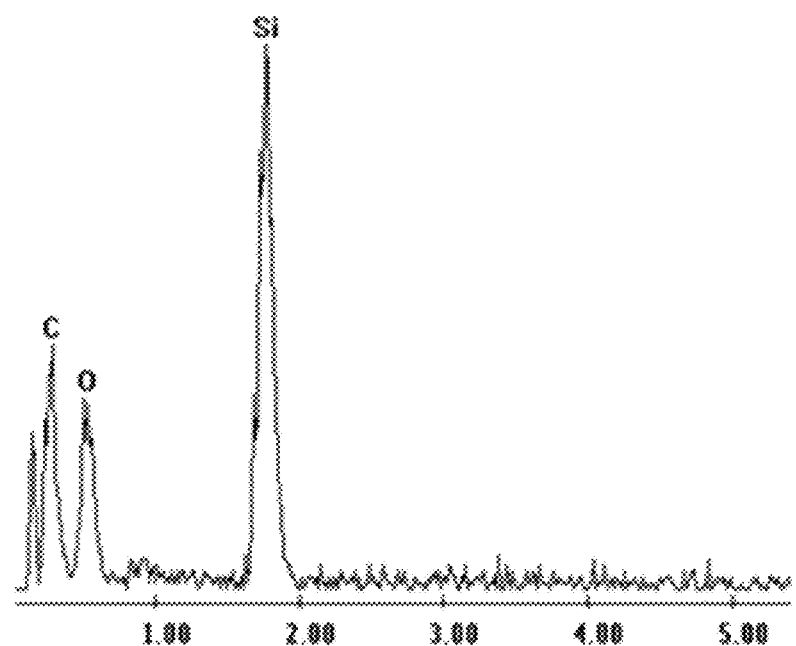

FIG. 24A is an SEM image of a SiOx nanorod before carbon coating, and FIGS. 24B to 24D are an SEM image, an STEM image, and an EDX graph of a resulting material obtained in Experimental Example 7-5, respectively. It can be verified that before coating, SiOx nanorods with a thickness of about 20 nm are interlaced with each other and then in FIGS. 24B and 24C, the SiOx nanorods are coated by a defect carbon layer well. Further, FIG. 24D is an EDX graph for the obtained resulting material. In FIG. 24D, Si, O and C are dominantly observed and thus it can be seen that in a synthesis process, SiO$_x$ is not reduced to Si in a high-pressure pyrolysis process of benzene as a carbon source, but is present as it is.

Experimental Example 8

Experimental Example 8 is to verify whether a nanoparticle-carbon core-shell structure is formed even in the case of a nanoparticle complex. Like Experimental Example 1, $Al_2O_3$ nanoparticles supported with NiO having a diameter of about 5 nm and benzene ($C_6H_6$) as a carbon source were supplied in an autoclave at atmospheric pressure and room temperature. In this case, the carbon source was supplied to have a Vol % ratio of the carbon source to an autoclave capacity of 1:0.0375. The autoclave was fully closed and a temperature was increased to 750° C., and then reaction was performed for 1 hour. After the reaction was completed, when the autoclave was cooled to the room temperature and the temperature of the autoclave dropped to the room temperature, a pressure control valve was slowly opened in order to lower the pressure in the autoclave to the atmospheric pressure, and then a $NiO/Al_2O_3$ nanoparticle-carbon core-shell structure was obtained.

Figure 25:
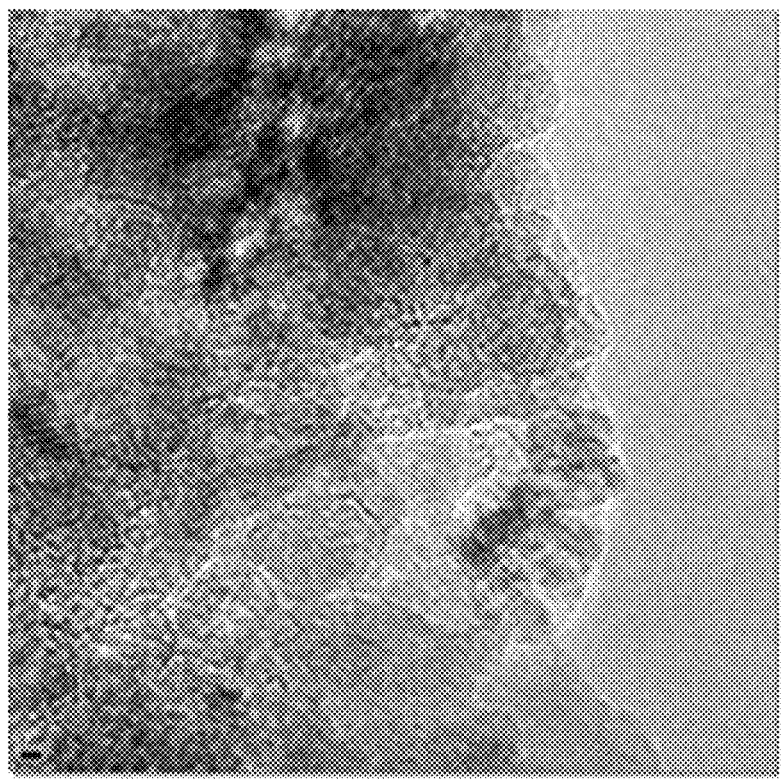
FIG. 25 is a TEM image of a resulting material according to Experimental Example 8.

FIG. 25 is a TEM image of a resulting material according to Experimental Example 8. Referring to FIG. 25, it can be seen that carbon shells are uniformly formed on the surface of $NiO/Al_2O_3$ nanoparticles. Further, at the inside of the resulting material obtained form the EDX mapping result, a component was $NiO/Al_2O_3$ and most of outer surface layer was verified as a C component.

Experimental Example 9

Experimental Example 9 is to show that a metal nanoparticle-carbon core-shell structure can be produced by using a metal oxide nanoparticle as a starting material. Like Experimental Example 1, $SnO_2$ nanoparticles having a diameter of about 50 nm and benzene ($C_6H_6$) as a carbon source were supplied in an autoclave at atmospheric pressure and room temperature. In this case, the carbon source was supplied to have a Vol % ratio of the carbon source to an autoclave capacity of 1:0.15. The autoclave was fully closed and a temperature was increased to 750° C., and then reaction was performed for 1 hour. After the reaction was completed, when the autoclave was cooled to the room temperature and the temperature of the autoclave dropped to the room temperature, a pressure control valve was slowly opened in order to lower the pressure in the autoclave to the atmospheric pressure, and then a $SnO_2$ nanoparticle-carbon core-shell structure was obtained. Subsequently, the obtained $SnO_2$ nanoparticle-carbon core-shell structure was reduced for 1 hour at 750° C. at a hydrogen atmosphere containing 10 vol % of $H_2$ gas in argon gas to obtain a Sn nanoparticle-carbon core-shell structure.

Figure 26A:
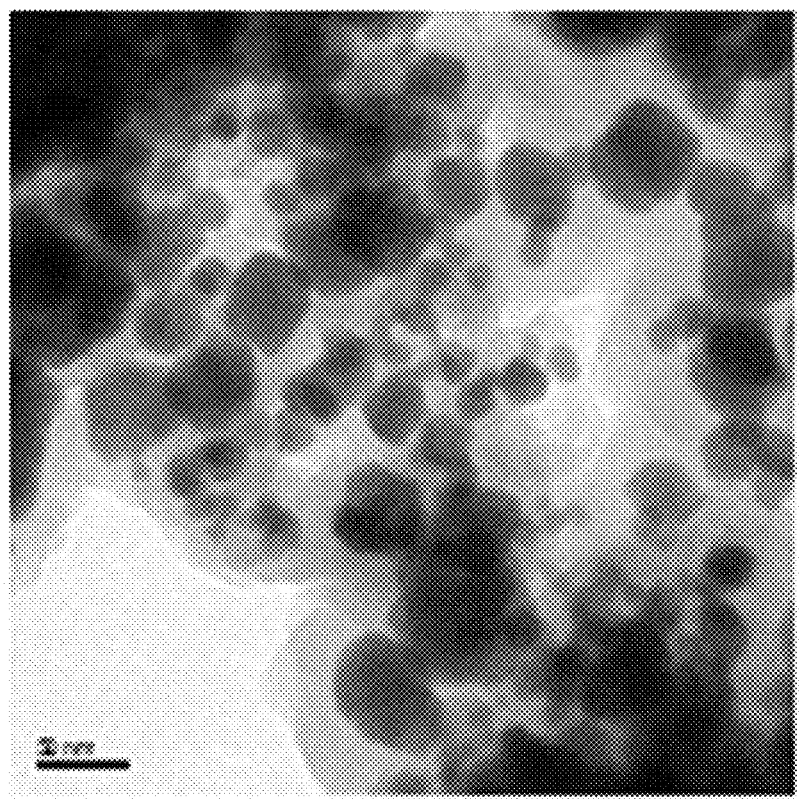
FIGS. 26A and 26B are TEM and HRTEM images of a Sn nanoparticle-carbon core-shell structure obtained in Experimental Example 9, respectively.
Figure 26B:
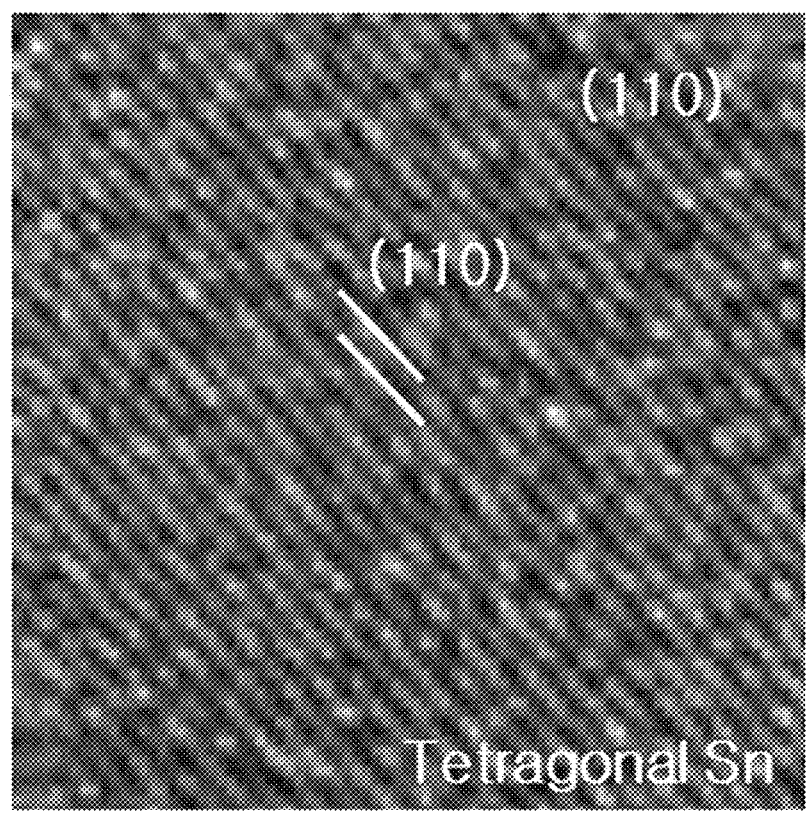
Figure 26C:
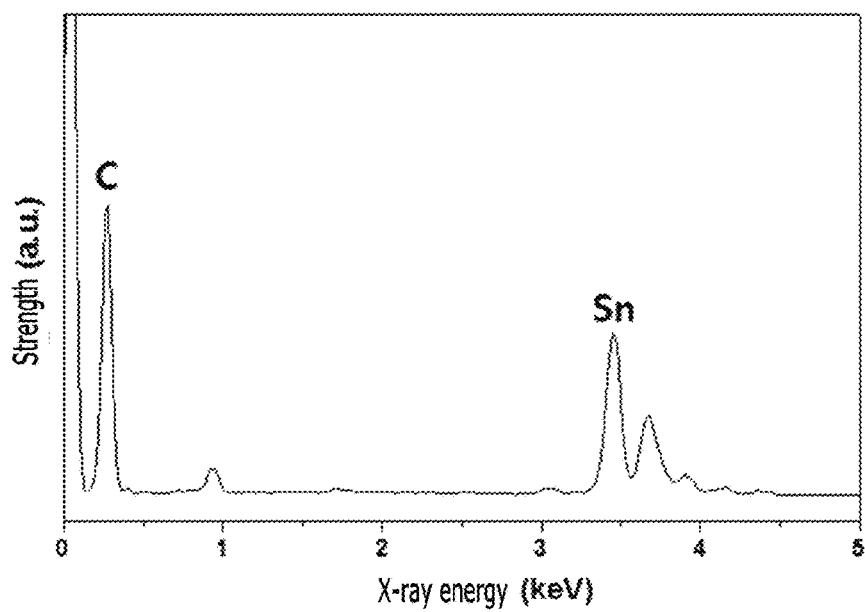
FIG. 26C is an EDX graph thereof.

FIGS. 26A and 26B are TEM and HRTEM images of a Sn nanoparticle-carbon core-shell structure obtained in Experimental Example 9, respectively. Form the result of FIG. 26A, it can be verified that nanoparticles are distributed well in the carbon layer. In FIG. 26B, it can be seen that a high-magnification image corresponding to one particle is a Sn nanoparticle having a tetragonal structure from a measurement of a distance between crystal surfaces of the internal material. In FIG. 23C, it can be verified that Sn and C are dominantly observed. As a result, it can be verified that in a sample, when an O component almost disappears, in a reduction process, a $SnO_2$ nanoparticle is reduced to Sn by $H_2$.

Experimental Example 9

Experimental Example 9 is to show that crystallinity of the obtained core-shell may be enhanced through heat treatment. Like Experimental Example 1, Si nanoparticles having a diameter of about 80 nm and crystalline and benzene ($C_6H_6$) as a carbon source were supplied in an autoclave at atmospheric pressure and room temperature. In this case, the carbon source was supplied to have a Vol % ratio of the carbon source to an autoclave capacity of 1:0.06. The autoclave was fully closed and a temperature was increased to 750° C., and then reaction was performed for 1 hour. After the reaction was completed, when the autoclave was cooled to the room temperature and the temperature of the autoclave dropped to the room temperature, a pressure control valve was slowly opened in order to lower the pressure in the autoclave to the atmospheric pressure, and then a Si nanoparticle-carbon core-shell structure was obtained. Subsequently, the obtained Si nanoparticle-carbon core-shell structure was heated for 2 hours at an inert atmosphere of 1,100° C. and 1,300° C.

Figure 27A:
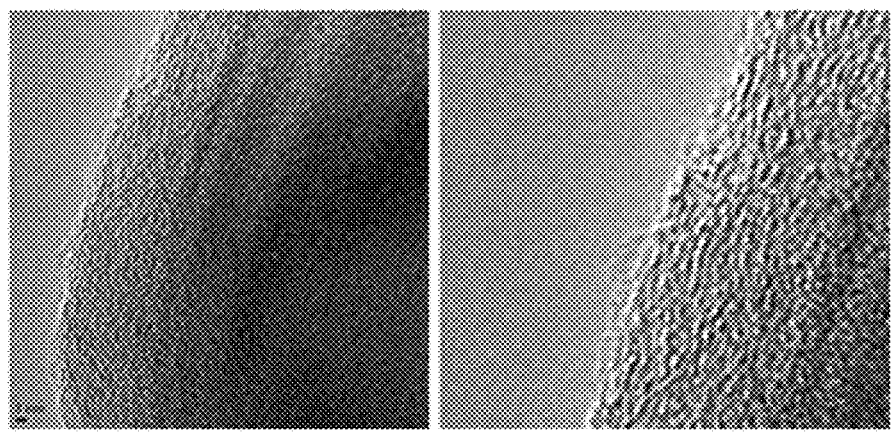
FIG. 27A is an HRTEM image illustrating an Si nanoparticle-carbon core-shell structure before heat treatment.
Figure 27B:
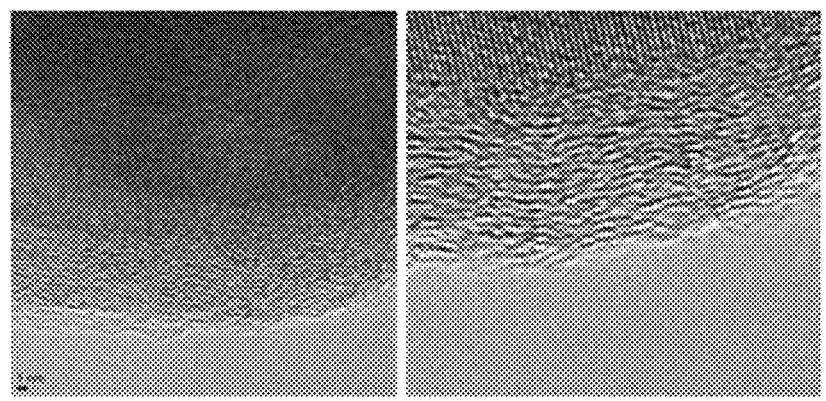
FIG. 27B is an HRTEM image illustrating an Si nanoparticle-carbon core-shell structure heated at 1,100° C.
Figure 27C:
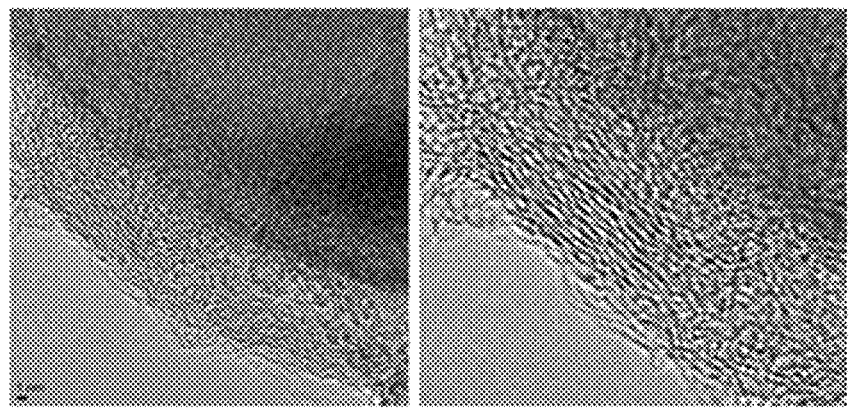
FIG. 27C is an HRTEM image illustrating an Si nanoparticle-carbon core-shell structure heated at 1,300° C.

FIG. 27A is an HRTEM image illustrating a Si nanoparticle-carbon core-shell structure before heat treatment, FIG. 27B is an HRTEM image illustrating a Si nanoparticle-carbon core-shell structure heated at 1,100° C., and FIG. 27C is an HRTEM image illustrating a Si nanoparticle-carbon core-shell structure heated at 1,300° C.

In FIG. 27A, it can be verified that the carbon shell before heat treatment has many defects and crystallinity thereof is not good. In FIG. 27B, it can be verified that many defects are still present in the carbon shell, but the crystallinity thereof is good. In FIG. 27C, as compared with the case of heat treatment at 1,100° C., in the case of heat treatment at 1,300° C., it can be seen that more defects are decreased and the crystallinity is more excellent.

Hereinabove, the method of carbon coating on nanoparticles was described with reference to FIGS. 1 to 27C, and hereinafter, a method of doped carbon coating on nanoparticles according to exemplary embodiments of the present invention will be described.

Experimental Example 10

Si nanoparticles having a diameter of about 80 nm and crystallinity and pyridine ($C_5H_5N$) as an N element-containing carbon source were supplied in an autoclave at atmospheric pressure and room temperature. In this case, the carbon source was supplied to have a Vol % ratio of the N element-containing carbon source to an autoclave capacity of 1:0.06. The autoclave was fully closed and a temperature was increased to 750° C., and then reaction was performed for 1 hour. After the reaction was completed, when the autoclave was cooled to the room temperature and the temperature of the autoclave dropped to the room temperature, a pressure control valve was slowly opened in order to lower the pressure in the autoclave to the atmospheric pressure, and then a Si nanoparticle-N doped carbon core-shell structure was obtained.

Figure 28A:
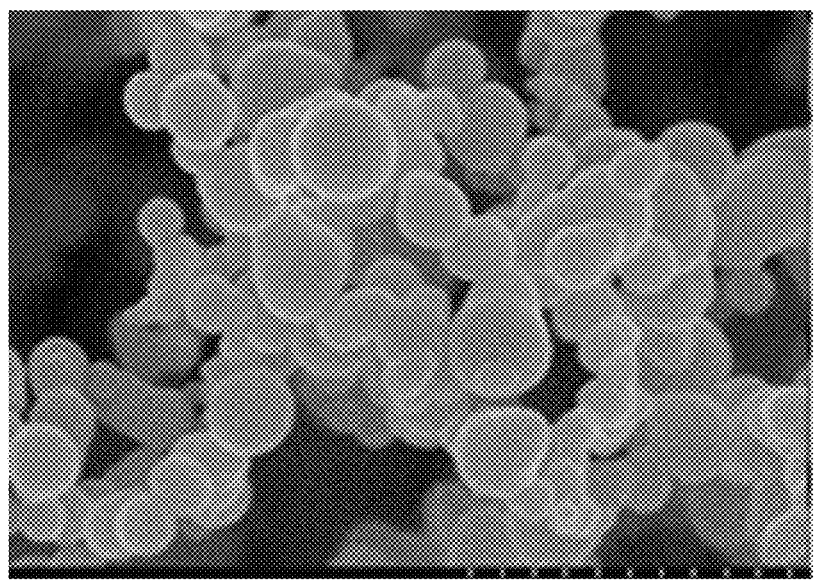
FIG. 28A illustrates an SEM image of Si nanoparticles before N-doped carbon coating.
Figure 28B:
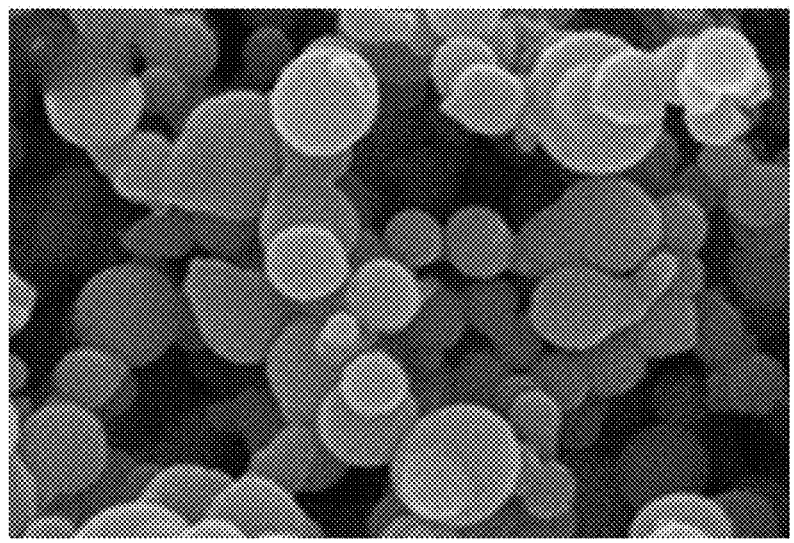
FIG. 28B illustrates an SEM image of the Si nanoparticles after N-doped carbon coating.
Figure 28C:
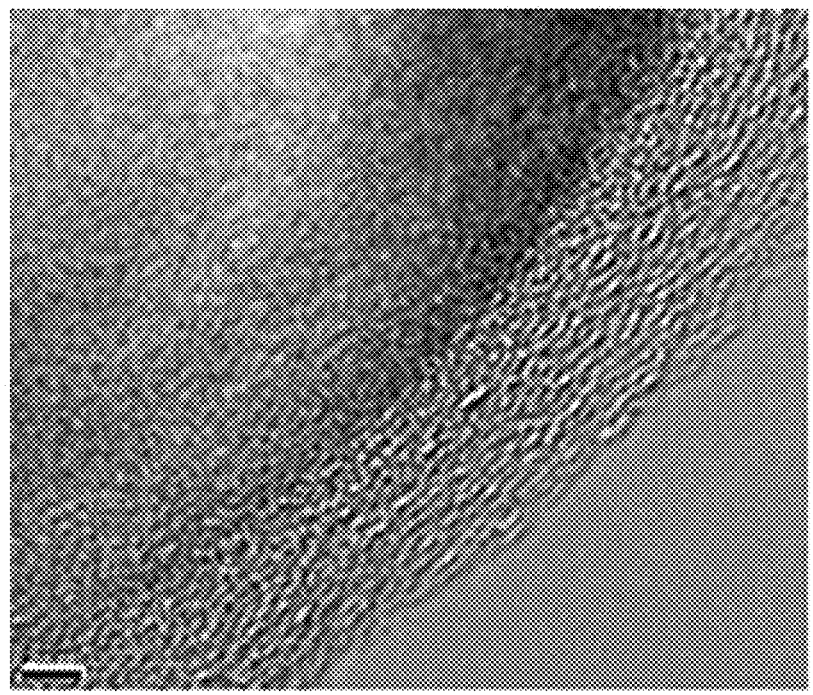
FIG. 28C illustrates a HRTEM image of the Si nanoparticles after N-doped carbon coating.
Figure 28D:
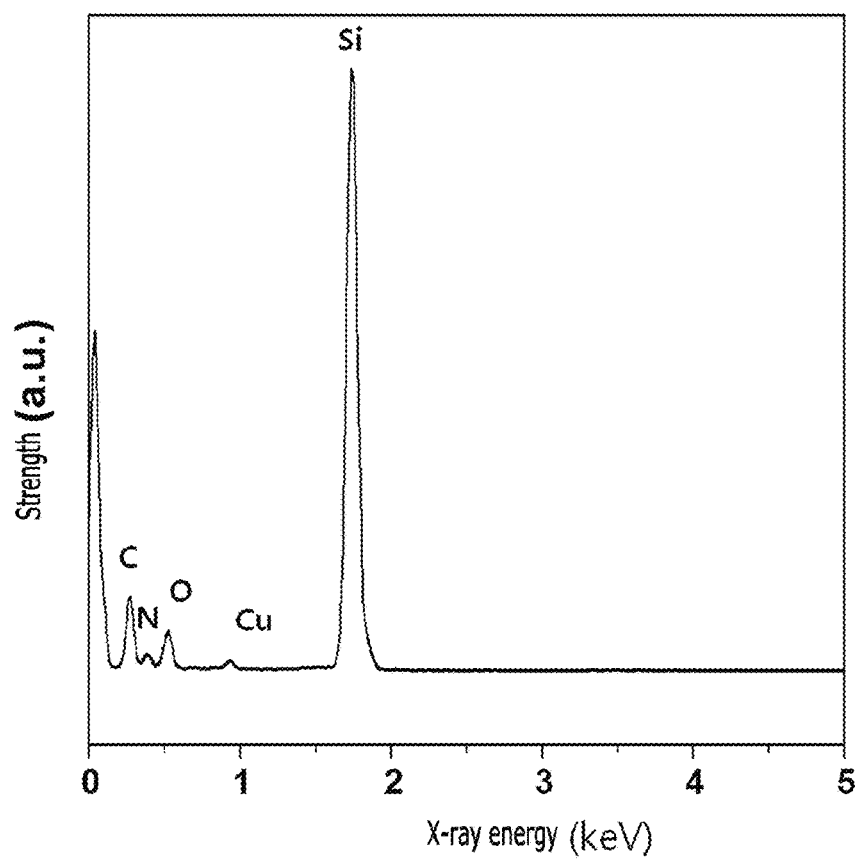
FIGS. 28D to 28G illustrate an EDX line graph, an XRD spectrum, a Raman spectrum, and an electron energy loss spectroscopy (EELS) after N-doped carbon coating, respectively.

FIG. 28A illustrates a scanning electron microscopy (SEM) image of a Si nanoparticle before N doped carbon coating, FIG. 28B illustrates an SEM image before N doped carbon coating, and FIG. 28C illustrates a high resolution TEM (HRTEM) image after N doped carbon coating. It can be seen that carbon shell having a thickness of 6 nm is uniformly formed on the surface of the Si nanoparticle.

Further, with respect to the obtained resulting material, at the inside of the resulting material obtained, a component was verified as Si and most of external surface layer was verified as C and N components. An O component was verified in the surface of the Si core and the surface coating layer.

Figure 28E:
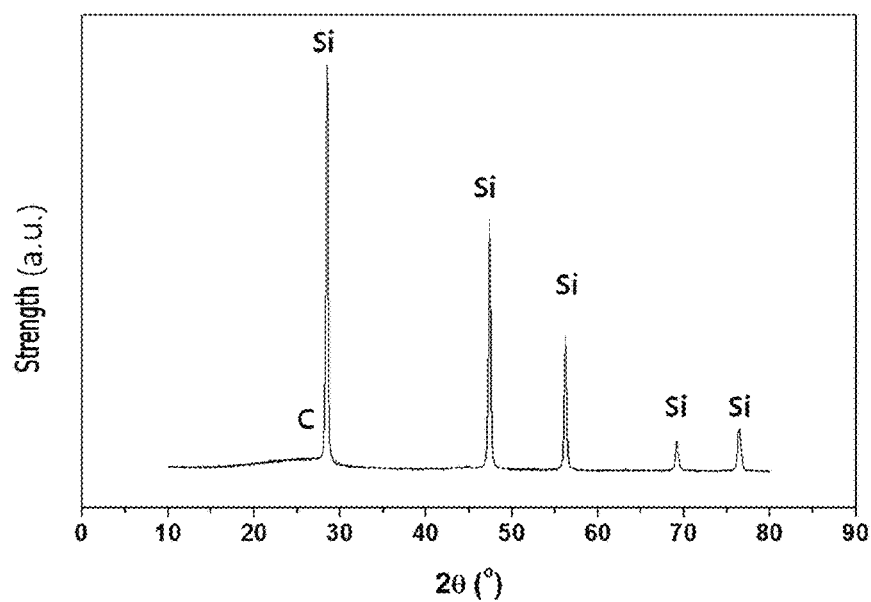
Figure 28F:
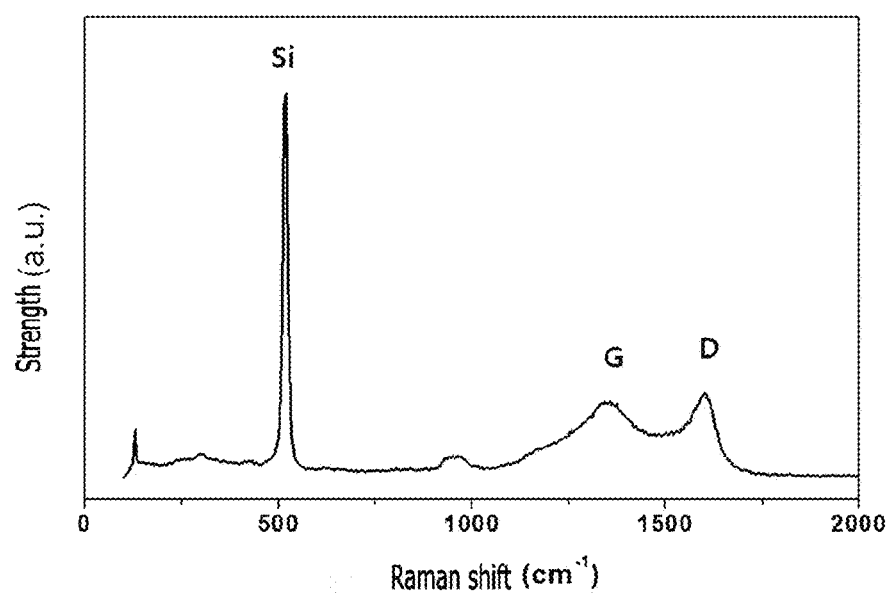

Meanwhile, results of measuring an XRD spectrum and a Raman spectrum for the obtained resulting material are illustrated in FIGS. 28E and 28F. From the XRD graph of FIG. 28E, it can be seen that the Si crystallinity is dominantly observed in a Si sample. Meanwhile, a peak related with carbon is widely observed around 25.6 degrees, and it can be seen that the carbon layer is configured by crystallinity having many defects. From the Raman graph of FIG. 28F, a peak related with the Si nanoparticle was observed around 500 cm$^{-1}$ and graphite structure (G) and disordered structure of defects (D) peaks for the carbon structure were observed around 1350 and 1590 cm$^{-1}$.

Figure 28G:
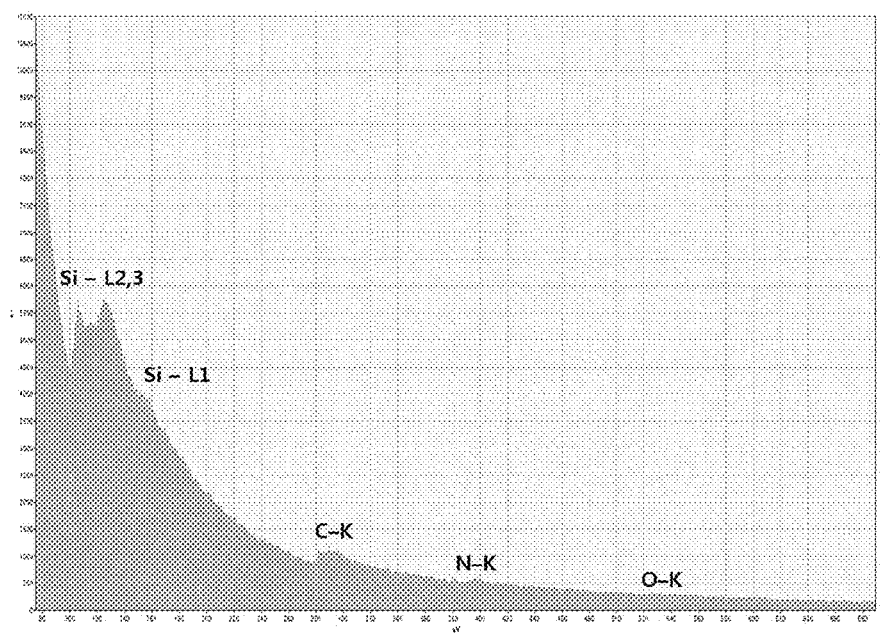

FIG. 28G illustrates an electron energy loss spectroscopy (EELS) measurement result. Si-L2 and 3 peaks were observed between 110 eV and 140 eV, a Si-L1 peak was observed around 150 eV, a C—K peak was observed around 285 eV, and N—K and O—K peaks were observed around 400 eV and 530 eV, respectively. From such a result, it is clearly shown that C is configured by a structure doped by N and the obtained resulting material is a Si nanoparticle-N doped carbon core-shell structure.

Experimental Example 11

Like Experimental Example 10, Si nanoparticles having a diameter of about 80 nm and crystallinity and pyridine as an N element-containing carbon source were supplied. However, a reaction was performed by varying vol % ratios of the N element-containing carbon source to an autoclave capacity as illustrated in Table 6 below and then in the obtained Si nanoparticle-N doped carbon source-shell structure, the thickness of the N doped carbon shell was measured.

TABLE 6

| Experimental Example | Vol % ratio | Thickness of N doped carbon shell (nm) |
|---|---|---|
| 11-1 | 1:0.015 | 1 |
| 11-2 | 1:0.0375 | 4 |
| 11-3 | 1:0.06 | 6 |
| 11-4 | 1:0.12 | 9 |
| 11-5 | 1:0.2 | 15 |

FIGS. 29A to 29E illustrate images obtained by measuring resulting materials obtained in Experimental Examples 2-1 to 2-5 by HRTEM. It can be seen that while an amount of N element-containing carbon source is increased, the thickness of the N doped carbon layer coated on the surface of the Si nanoparticle is gradually increased to 1, 2, 4, 6, 9, and 15 nm, respectively. As a result, it can be seen that the thickness of the formed N doped carbon shell may be controlled by controlling the vol % ratio of the N element-containing carbon source to the autoclave capacity.

Table 7 below illustrates a result of measuring atomic ratios for resulting materials obtained in Experimental Examples 11-1 to 11-5. It can be verified that while an amount of N element-containing carbon source is increased, the contents of C and N of the N doped carbon layer are also increased.

TABLE 7

| | Element ratio (atomic %) | | | | |
|---|---|---|---|---|---|
| Element | Experimental Example 11-1 | Experimental Example 11-2 | Experimental Example 11-3 | Experimental Example 11-4 | Experimental Example 11-5 |
| C | 19.70 | 24.25 | 35.77 | 44.51 | 62.16 |
| N | 2.52 | 2.57 | 2.60 | 2.63 | 3.05 |
| C | 3.80 | 3.08 | 3.21 | 2.79 | 3.09 |
| Si | 73.98 | 69.11 | 58.48 | 50.07 | 26.69 |
| Tot | 100 | 100 | 100 | 100 | 100 |

Figure 29A:
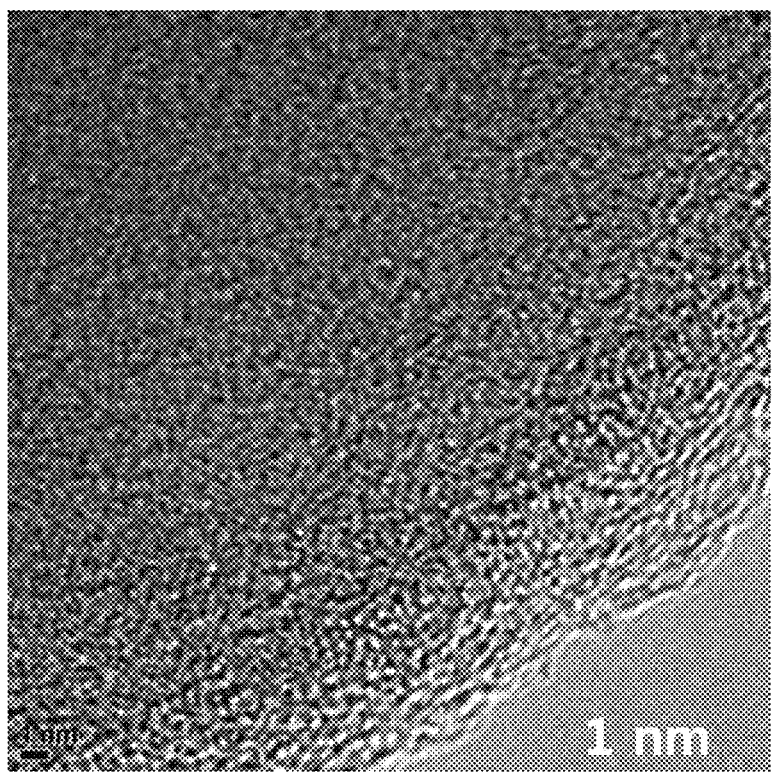
FIGS. 29A to 29E illustrate images obtained by measuring resulting materials obtained in Experimental Examples 2-1 to 2-5 by HRTEM and FIG. 29F illustrates an XPS measurement result for resulting materials obtained in Experimental Examples 2-1, 2-3, and 2-5.
Figure 29B:
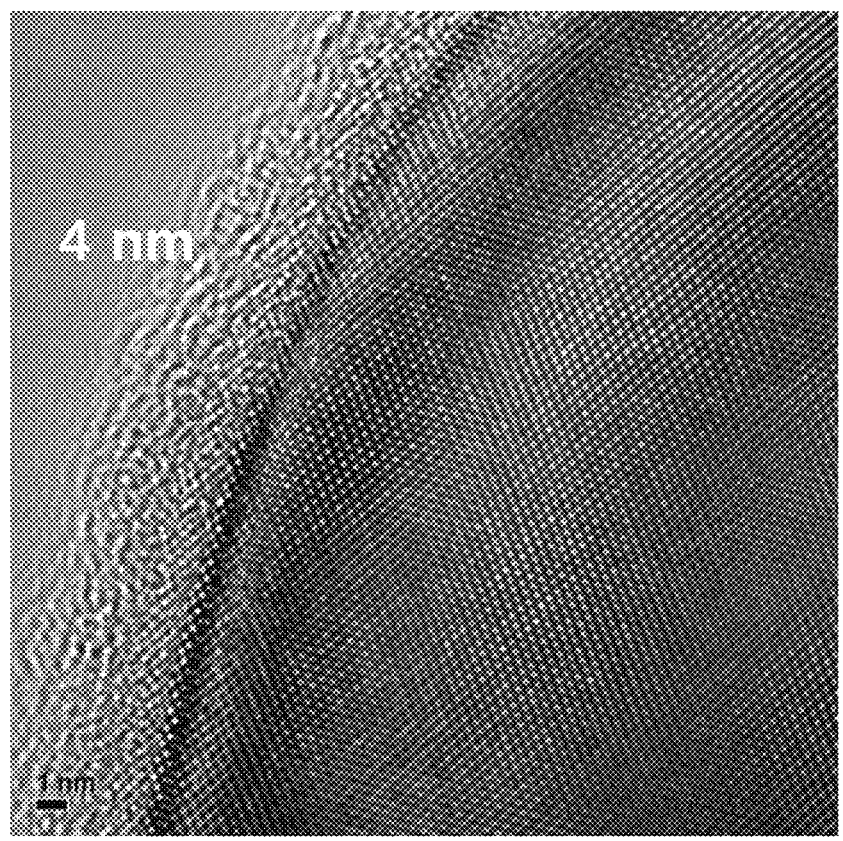
Figure 29C:
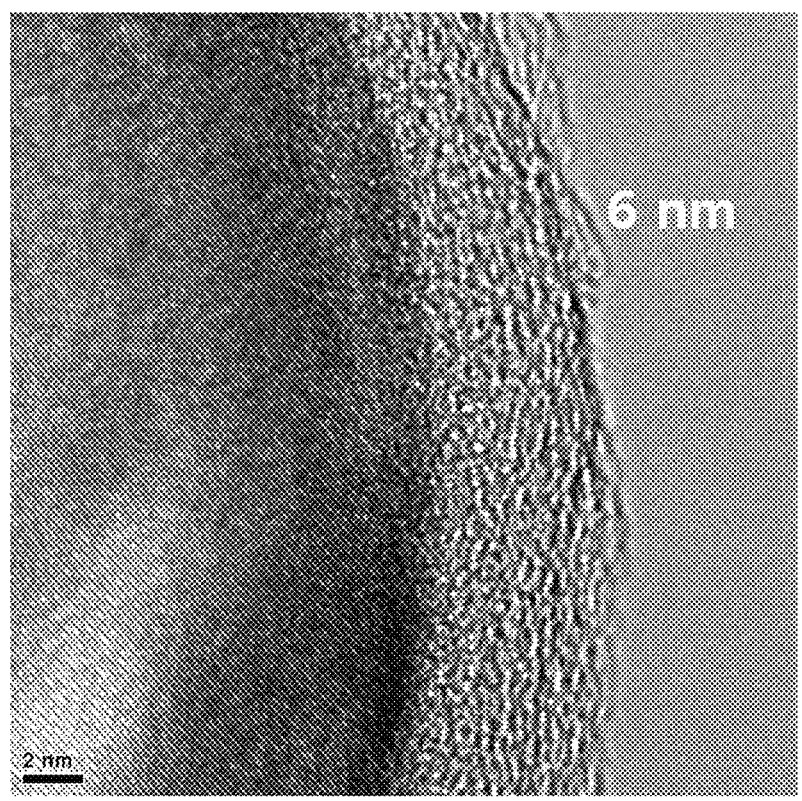
Figure 29D:
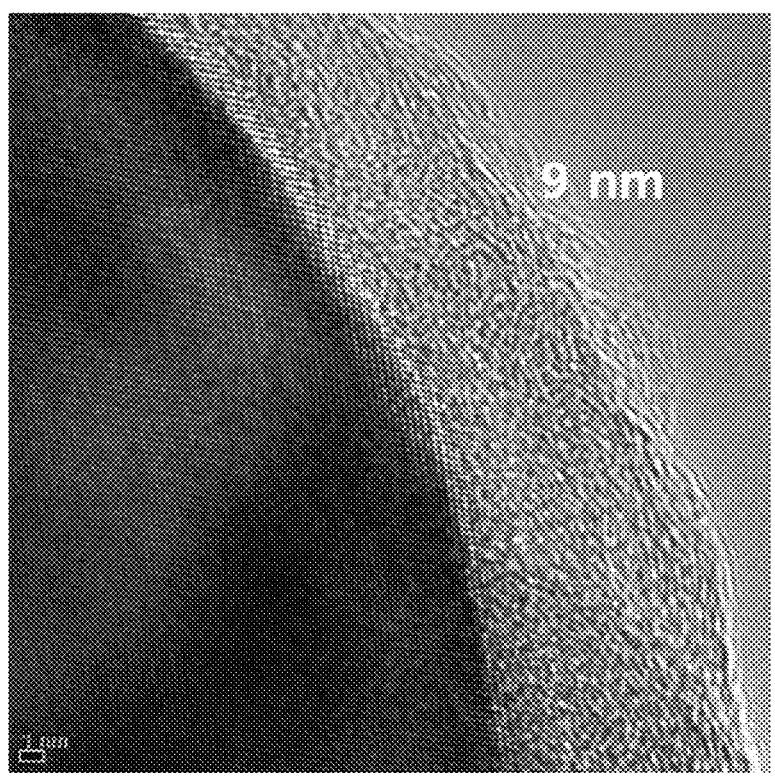
Figure 29E:
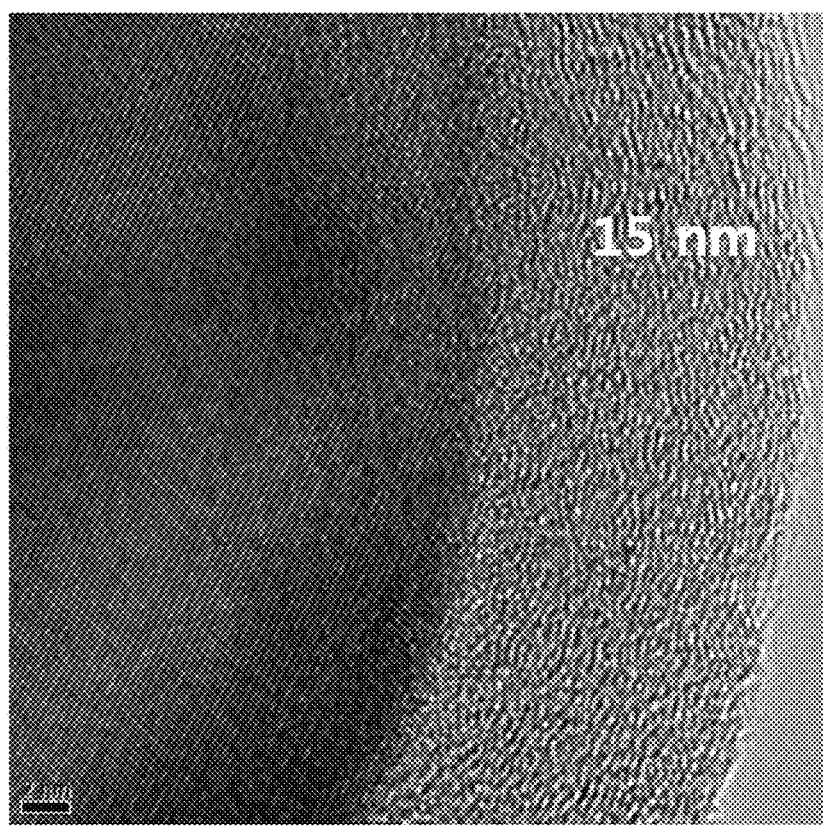
Figure 29F:
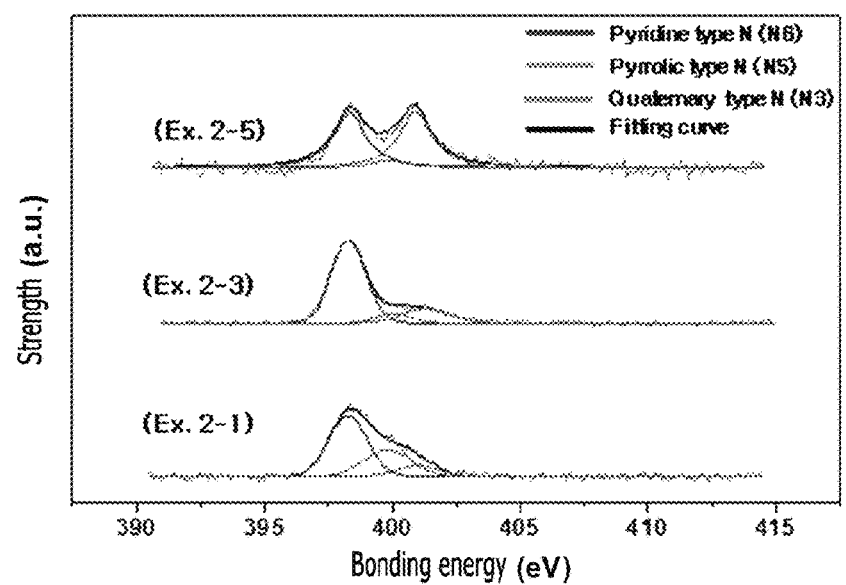

FIG. 29F illustrates a result of measuring an X-ray photoelectron spectroscopy (XPS) for resulting materials obtained in Experimental Examples 11-1 (0.015), 11-3 (0.06), and 11-5 (0.2) in which ratios of a N element-containing carbon source to an autoclave capacity (V pyridine/V autoclave capacity) are different from each other. When a ratio of the N-element containing carbon source is small, pyridine type N (N6) and pyrrolic type N (N5) structures are dominant, but while the ratio of the source is increased, the pyrrolic type N (N5) structure tends to be gradually decreased and a quaternary type (N3) structure tends to be gradually increased.

Experimental Example 12

In Experimental Example 12, in order to determine an effect of the reaction temperature, other conditions were the same as the experiment of Experimental Example 10. A result of measuring a Raman spectrum for the resulting material obtained after varying the reaction temperature as (a) 550###C, (b) 650° C., (c) 750° C., and (d) 850° C. was illustrated in FIG. 30.

Figure 30:
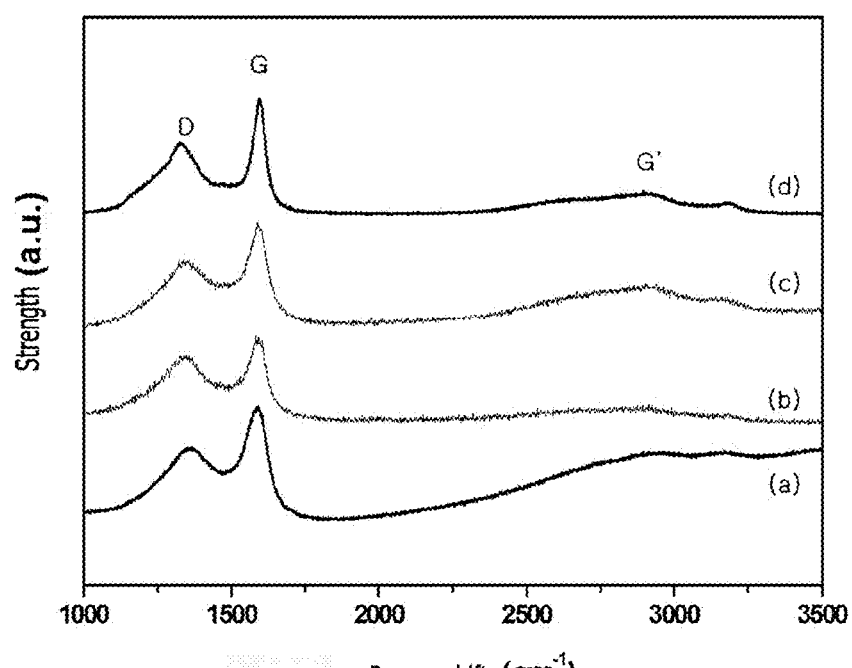
FIG. 30 is a Raman spectrum of resulting materials obtained by varying a reaction temperature.

From the result of FIG. 30, it was verified that as the temperature was increased, sharpness of a G-peak (1590 cm$^{-1}$) meaning crystallinity of the N-doped carbon shell was increased. Accordingly, it can be seen that as the synthesis temperature is increased, the crystallinity of the N-doped carbon shell is enhanced.

Experimental Example 13

In Experimental Example 13, like Experimental Example 10, Si nanoparticles having a diameter of about 80 nm and crystallinity and pyridine as a doped element-containing carbon source were supplied. However, a reaction was performed by varying vol % ratios of a doped element-containing carbon source to an autoclave capacity as illustrated in Table 9 below and then the obtained resulting material was observed. In Experimental Example 13-4, the Si nanoparticles were not supplied, but only the doped element-containing carbon source (pyridine) was supplied.

TABLE 8

| Experimental Example | Vol % ratio | Whether to supply Si nanoparticles | Product |
|---|---|---|---|
| 13-1 | 1:0 | o | Si nanoparticles |
| 13-2 | 1:0.2 | o | 100% Si nanoparticle-N doped carbon core-shell |
| 13-3 | 1:0.3 | o | Si nanoparticle-N doped carbon core-shell & carbon structure having size of 200 to 300 nm |

TABLE 8-continued

| Experimental Example | Vol % ratio | Whether to supply Si nanoparticles | Product |
|---|---|---|---|
| 13-4 | 1:1.0 | x | 100% carbon structure having size of 200 to 300 nm |

Figure 31A:
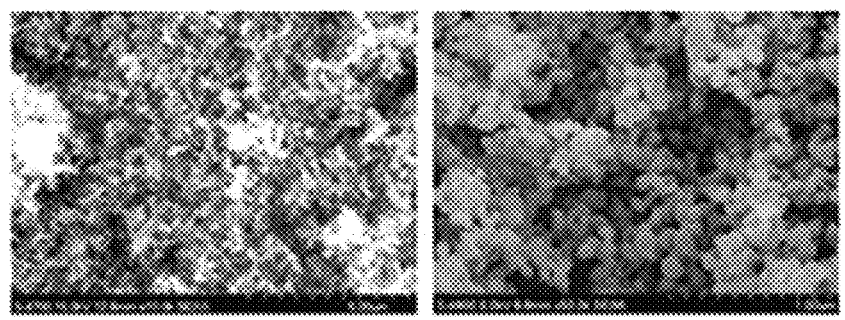
FIGS. 31A to 31D illustrate images obtained by measuring resulting materials obtained in Experimental Examples 4-1 to 4-4 by SEM.
Figure 31B:
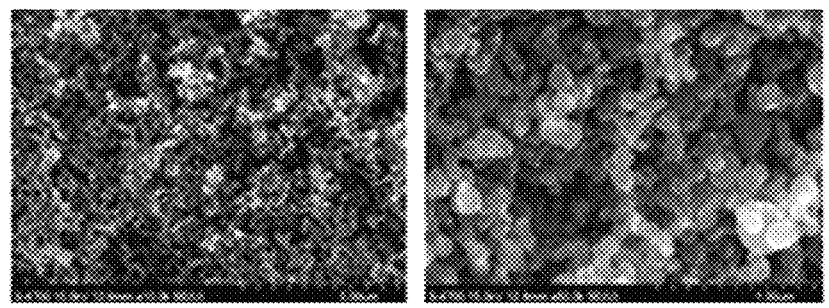
Figure 31C:
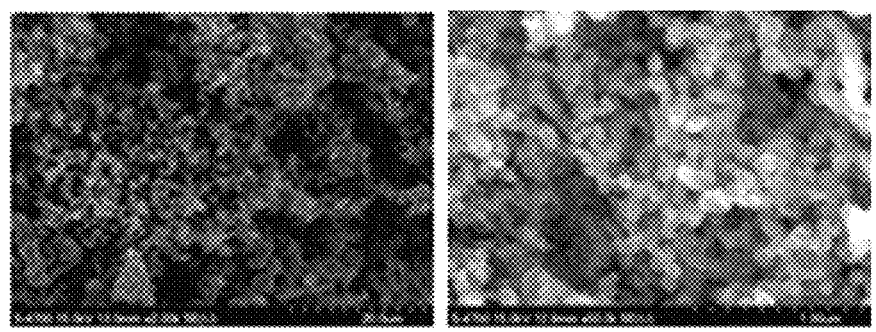
Figure 31D:
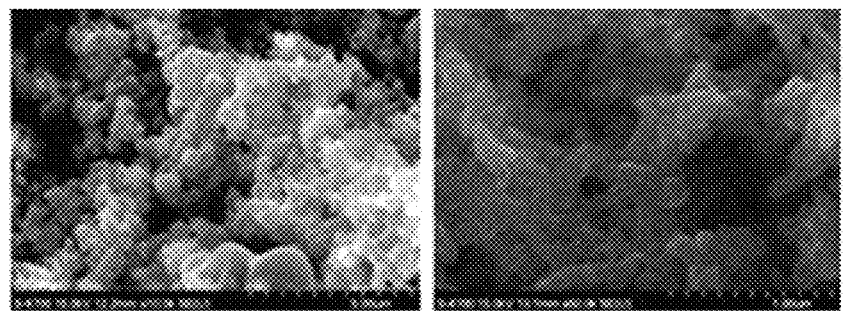

FIGS. 31A to 31D illustrate images obtained by measuring resulting materials obtained in Experimental Examples 13-1 to 13-4 by SEM. In the case where the nanoparticles were supplied and the doped element-containing carbon source was not present, only the Si nanoparticles were present and a large change was not shown (FIG. 31A) and as a value of an autoclave volume to a volume of the doped element-containing carbon source was increased, the thickness of the doped carbon shell in the Si nanoparticle-doped element-containing carbon core-shell structure was increased (FIGS. 31B and 31C). However, it was verified that when the value was equal to or greater than 0.3, carbon structures having sizes of about 200 to 300 nm were simultaneously formed. It was verified that when the Si nanoparticles were not supplied and only the doped element-containing carbon source was supplied, only the carbon structures having sizes of about 200 to 300 nm were generated 100% (FIG. 31D).

As a result, it can be seen that when there is no supply amount of doped element-containing carbon source, bare particles without almost carbon coating are formed as they are, and when the supply amount of doped element-containing carbon source is too large, the nanoparticle-doped carbon core-shell structure is not formed, but the carbon structures having sizes of 200 to 300 nm are mainly formed. Accordingly, it can be seen that it is important to control the supply amount of doped element-containing carbon source in a range of preventing the nanoparticles and the carbon structures having sizes of 200 to 300 nm from being generated.

Experimental Example 14

Experimental Example 14 is to verify whether a Si nanoparticle-doped carbon core-shell structure is formed like Experimental Example 10 in the case of using various doped element-containing carbon sources. Under a condition disclosed in Table 9 below, Si nanoparticles and different doped element-containing carbon sources were supplied and reacted for 10 hour at 750° C. like Experimental Example 10 to obtain the Si nanoparticle-doped carbon core-shell structure.

TABLE 9

| Experimental Example | Si nanoparticle (diameter, property) | doped element-containing carbon source | supply condition |
|---|---|---|---|
| 14-1 | 80 nm, crystalline | acrylonitrile (C3H3N) | autoclave capacity:N containing carbon source = 1:0.06 (vol % ratio) |
| 14-2 | 80 nm, crystalline | melamine (C3H6N6) | Si nanoparticle:N containing carbon source = 1:4 (wt % ratio) |
| 14-3 | 80 nm, crystalline | pyridine + melamine (pyridine:melamine = 1:2 wt % ratio) | Si nanoparticle:N containing carbon source = 1:3 (wt % ratio) |

Figure 32A:
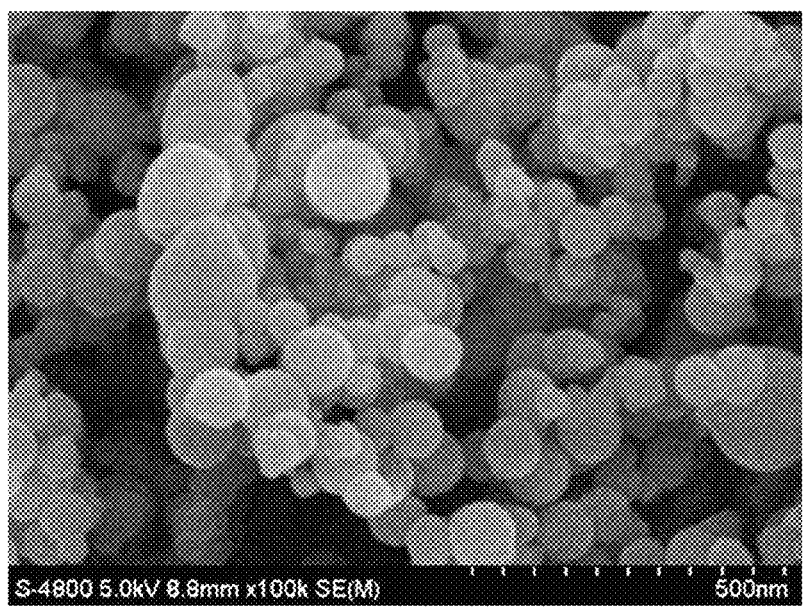
FIGS. 32A and 32B are images obtained by measuring a resulting material obtained in Experimental Example 5-1 by SEM and HRTEM, respectively.
Figure 32B:
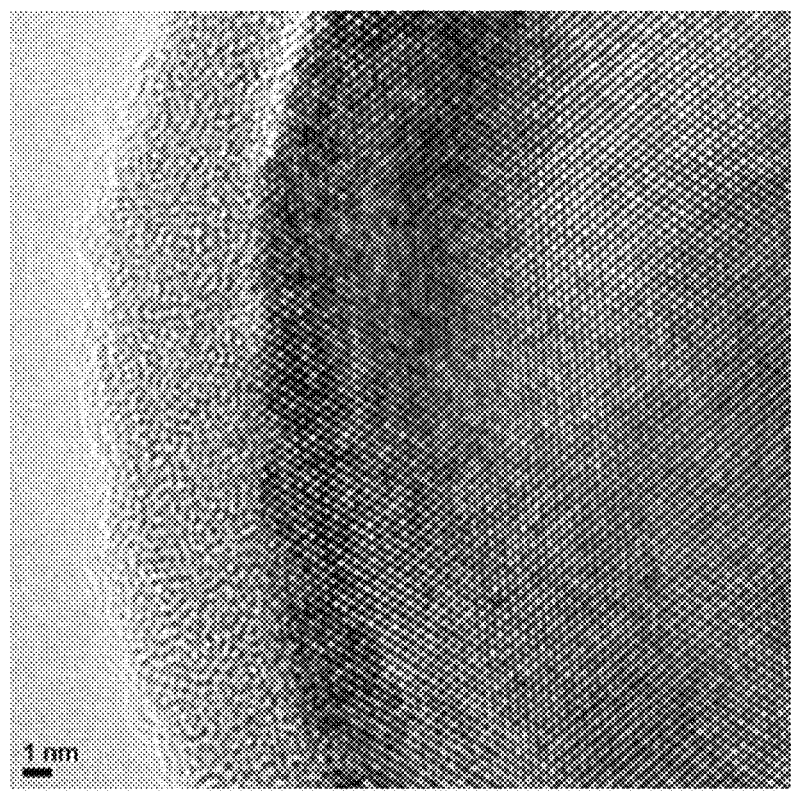

FIGS. 32A and 32B are images obtained by measuring a resulting material obtained in Experimental Example 14-1 by TEM and HRTEM, respectively, and in FIGS. 32A and 32B, it can be seen that an N doped carbon shell is coated on the surface of the Si nanoparticle. In FIG. 32B, it can be seen that a N doped carbon shell having many defects and a thickness of 3 to 4 nm is coated on the surface of the Si nanoparticle. Further, with respect to the obtained resulting material, at the inside of the resulting material obtained from an EDX mapping result, a component was verified as Si and most of outer surface layer was verified as N and C components. In the case of using the same amount of pyridine, it can be seen that a C amount is relatively reduced. This is interpreted that pyridine includes more carbon atoms than acrylonitrile and it is more advantageous to form a carbon hexagonal structure due to a chemical structure.

Figure 33A:
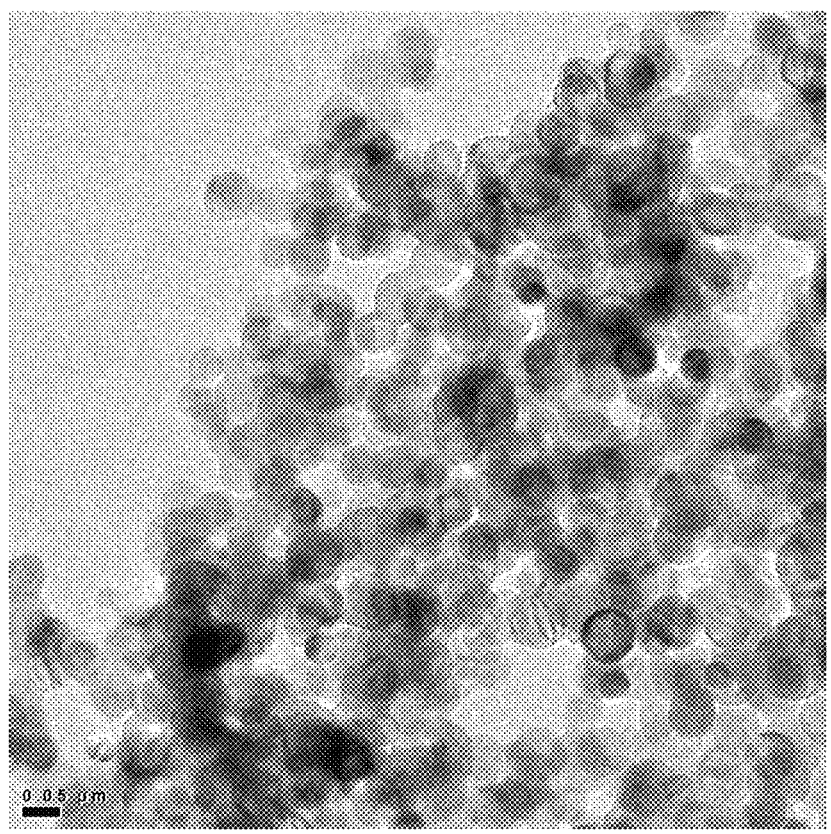
FIGS. 33A and 33B are images obtained by measuring a resulting material obtained in Experimental Example 5-2 by TEM and FIGS. 33C and 33D are an EDX graph and an XPS N(1s) graph of the resulting material obtained in Experimental Example 5-2.
Figure 33B:
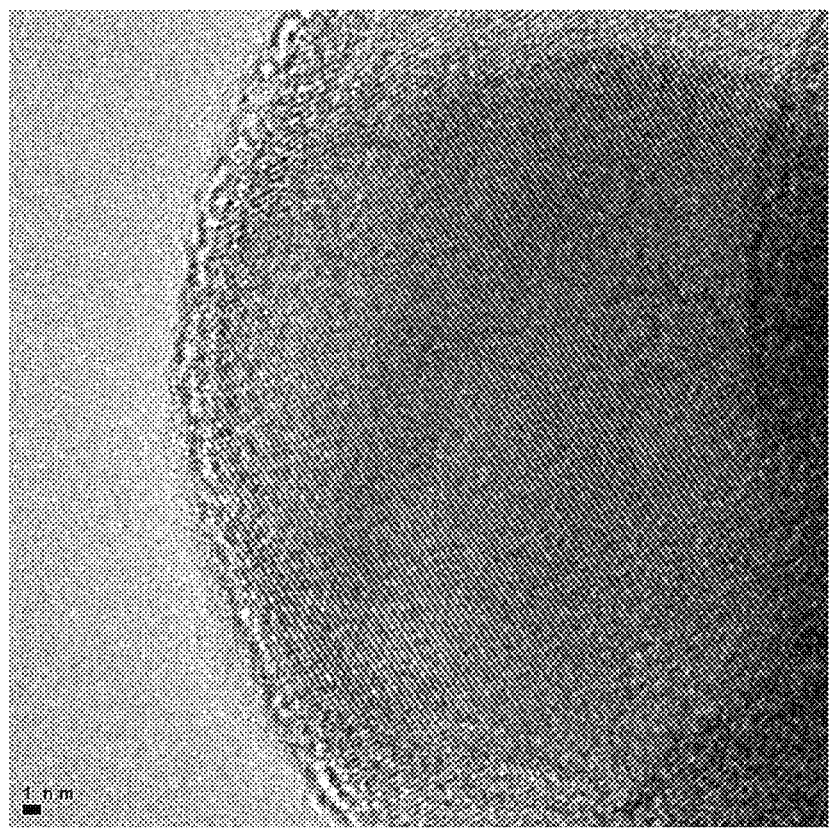
Figure 33C:
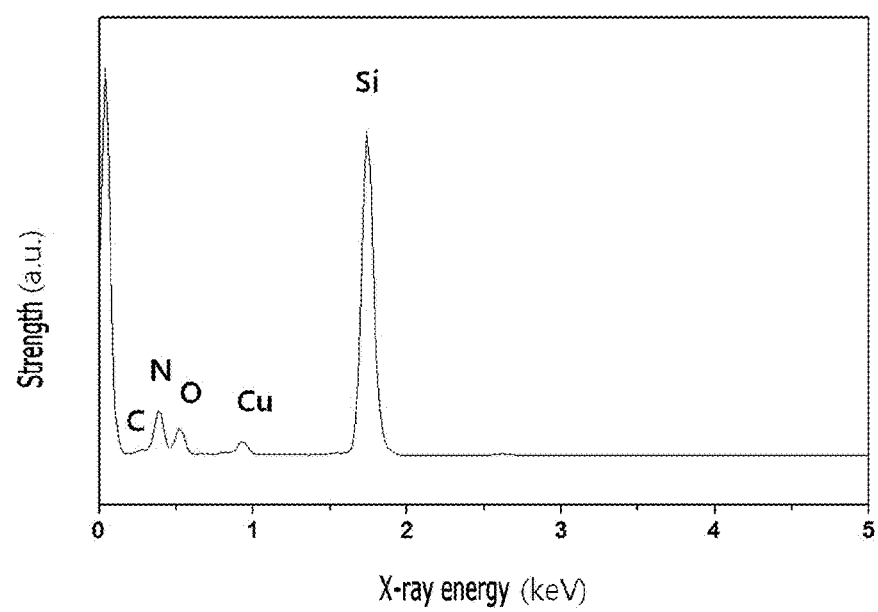
Figure 33D:
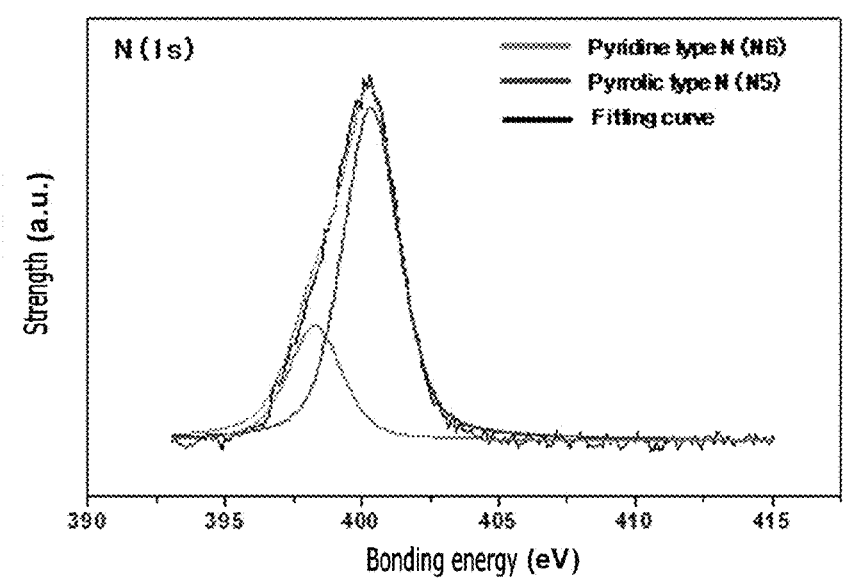

FIGS. 33A and 33B illustrate a result obtained by measuring a resulting material obtained in Experimental Example 14-2 by TEM. In FIGS. 33A and 33B, it can be seen that an N doped carbon shell having many defects and a thickness of less than about 1 nm is coated on the surface of the Si nanoparticle. It can be seen that in the resulting material obtained from an EDX graph of FIG. 33C, a component was verified as Si and most of outer surface layer was configured by C and N components. In the case of using the same amount of pyridine, it can be seen that a C amount is relatively reduced. This is interpreted that pyridine includes more carbon atoms than melamine and it is more advantageous to form a carbon hexagonal structure due to a chemical structure. Meanwhile, melamine is a carbon source containing a large amount of N and an amount of doped N was further increased in the case of using melamine compared with the case of using pyridine. FIG. 33D shows an XPS N(1 s) graph of the corresponding sample. In the case of supplying melamine, unlike the case of supplying pyridine, a pyrrolic type N (N5) structure around 400.2 eV was dominant as compared with a pyridine type N (N6) around 398.2 eV. Meanwhile, a quaternary type N (N3) around 401.3 eV was not observed.

Figure 34A:
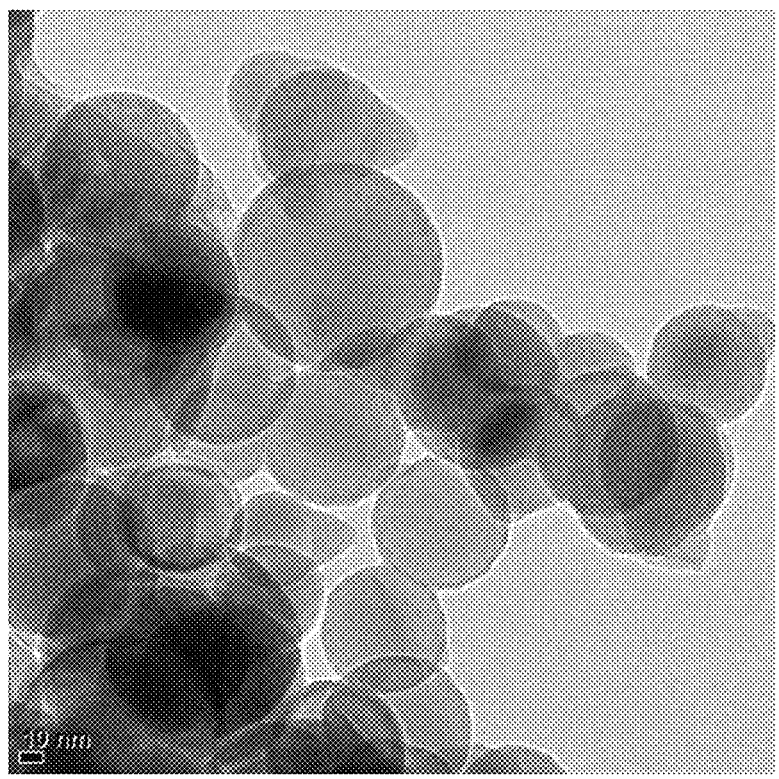
FIGS. 34A and 34B are images obtained by measuring a resulting material obtained in Experimental Example 5-3 by TEM and FIG. 34C is an EDX graph thereof.
Figure 34B:
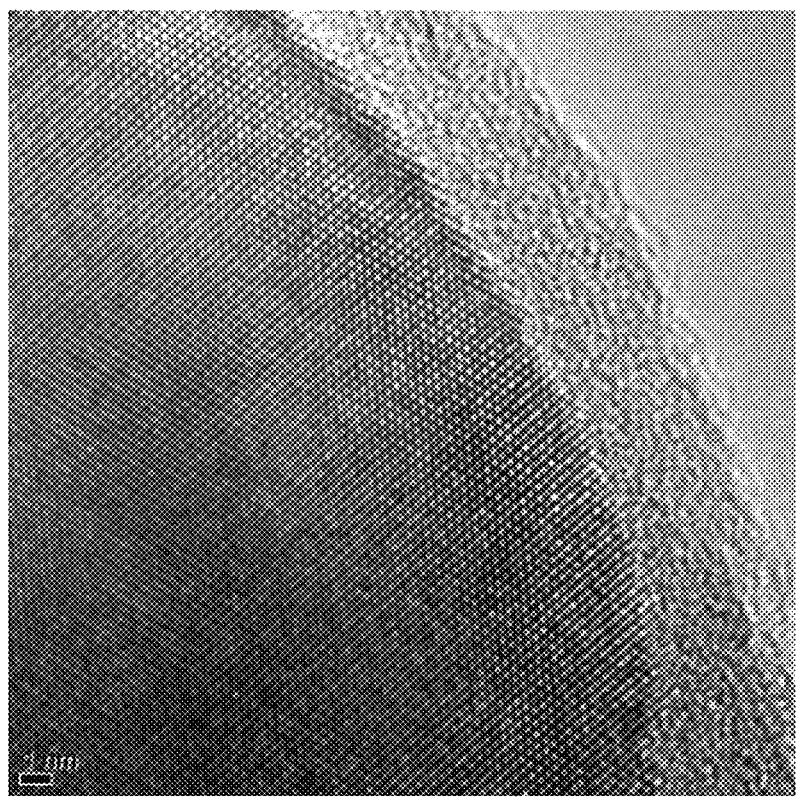
Figure 34C:
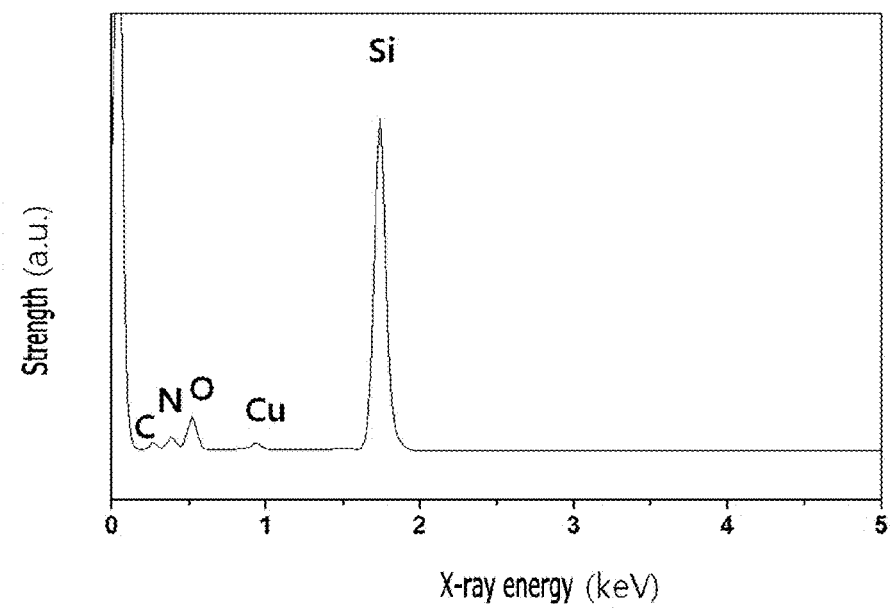

FIGS. 34A and 34B illustrate a result obtained by measuring a resulting material obtained in Experimental Example 14-3 by TEM. In FIGS. 34A and 34B, it can be seen that an N doped carbon shell having many defects and a thickness of about 3 nm is coated on the surface of the Si nanoparticle. It can be seen that in the resulting material obtained from an EDX graph of FIG. 34C, a component was verified as Si and most of outer surface layer was configured by C and N components. Further, it can be seen that because melamine includes less carbon atoms than pyridine and it is more disadvantageous to form a carbon hexagonal structure due to a chemical structure, in the case of the same amount of pyridine, a relative C amount is reduced, but is increased as compared with Experimental Example 5-2 using only melamine. This represents that pyridine containing many C atoms and melamine containing N atoms are mixed and used and thus a combination of C and N may be controlled by controlling a ratio of pyridine and melamine.

Experimental Example 15

Experimental Example 15 is to verify whether a nanoparticle-doped carbon core-shell structure is formed like Experimental Example 10 in the case of using other nanoparticles other than Si. Under a condition disclosed in Table 10 below, various nanoparticles and doped element-containing carbon sources were supplied and reacted with each other for 1 hour at 750° C. to obtain a nanoparticle-doped carbon core-shell structure.

TABLE 10

| Experimental Example | Si nanoparticle (diameter, property) | doped element-containing carbon source | supply condition (autoclave capacity:N containing carbon source) (vol % ratio) |
|---|---|---|---|
| 15-1 | Ge (<200 nm, crystalline) | pyridine ($C_5H_5N$) | 1:0.12 |
| 15-2 | $SnO_2$ (50 nm, crystalline) | pyridine ($C_5H_5N$) | 1:0.15 |
| 15-3 | $LiMn_2O_4$ (500 nm, crystalline) | pyridine ($C_5H_5N$) | 1:0.06 |

Figure 35A:
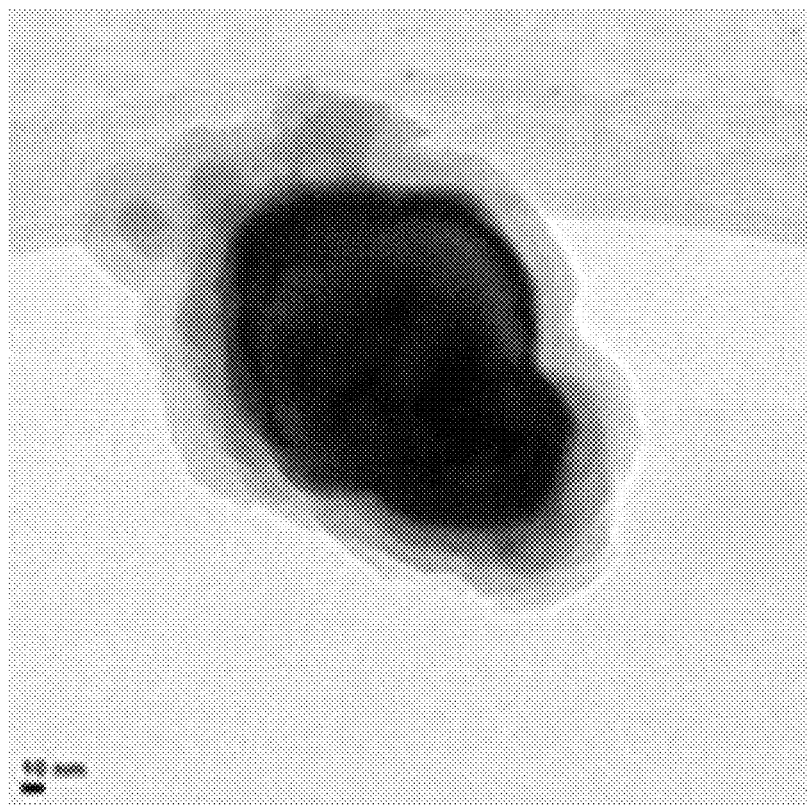
FIGS. 35A and 35B are a TEM image and an EDX line graph of a resulting material obtained in Experimental Example 6-1, respectively.
Figure 35B:
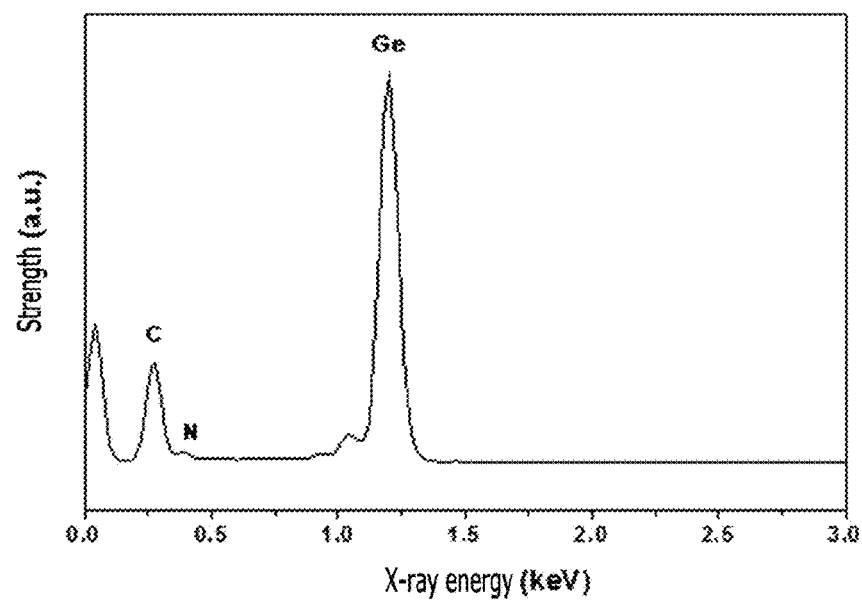

FIG. 35A is an image obtained by measuring a resulting material obtained in Experimental Example 15-1 by TEM and it can be verified that a carbon shell with a thickness of 15 nm is coated on the surface of a Ge nanoparticle. In addition, a diffraction pattern obtained from a fast Fourier transform (FFT) for the obtained resulting material verifies that an internal core is crystalline Ge. FIG. 35B is an EDX line graph for the obtained resulting material and it was verified that an internal component was Ge and most of outer surface layer was configured by C and N components.

Figure 36A:
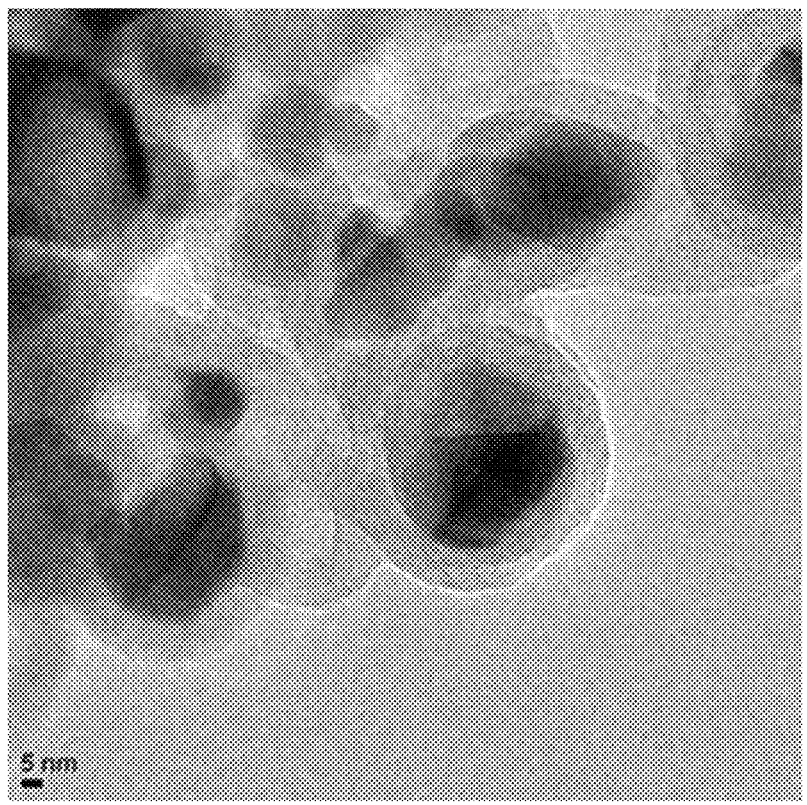
FIGS. 36A and 36B are images obtained by measuring a resulting material obtained in Experimental Example 6-2 by TEM and FIGS. 36C and 36D are an FFT image and an EDX line graph of the resulting material obtained in Experimental Example 6-2.
Figure 36B:
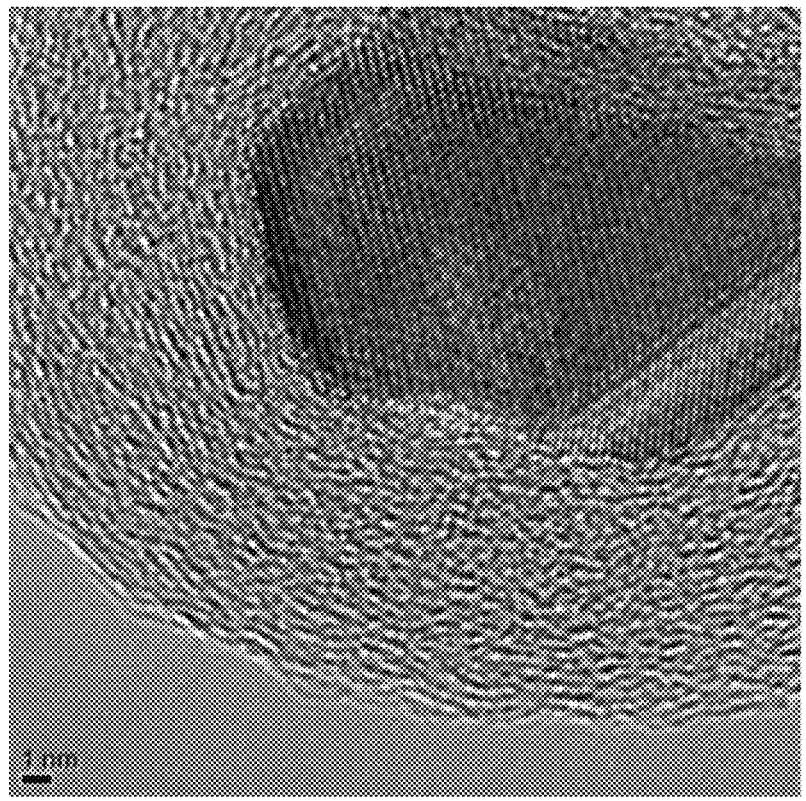
Figure 36C:
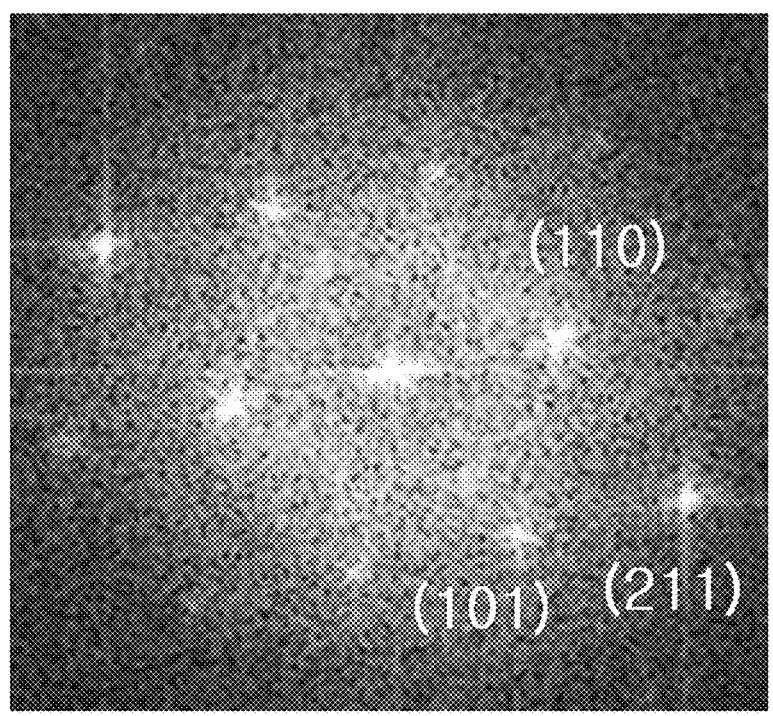
Figure 36D:
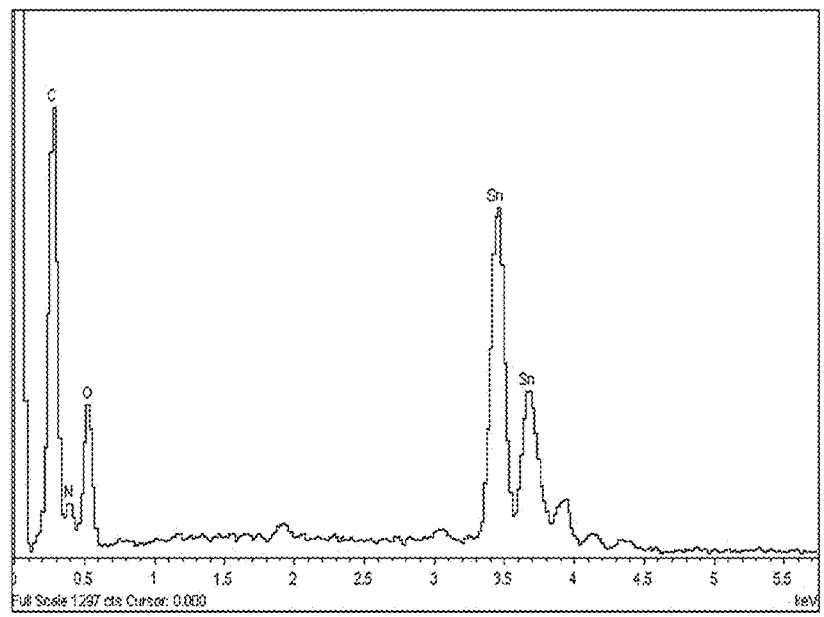

FIGS. 36A and 36B are images obtained by measuring a resulting material obtained in Experimental Example 15-2 by TEM. It can be seen that $SnO_2$ nanoparticles are uniformly coated with an N doped carbon layer. FIG. 36C is an FFT image for the obtained resulting material and it can be seen that from a diffraction pattern, an internal material is $SnO_2$ nanoparticles having a tetragonal structure. FIG. 36D is an EDX line graph for the obtained resulting material and it can be seen that Sn and C are dominantly observed, a large amount of O component is observed, and as a result, in a synthesis process, the $SnO_2$ nanoparticles are not reduced to Sn in a pressure pyrolysis process of a pyridine source. Further, it can be seen that N is derived from an N component doped on carbon.

Figure 37A:
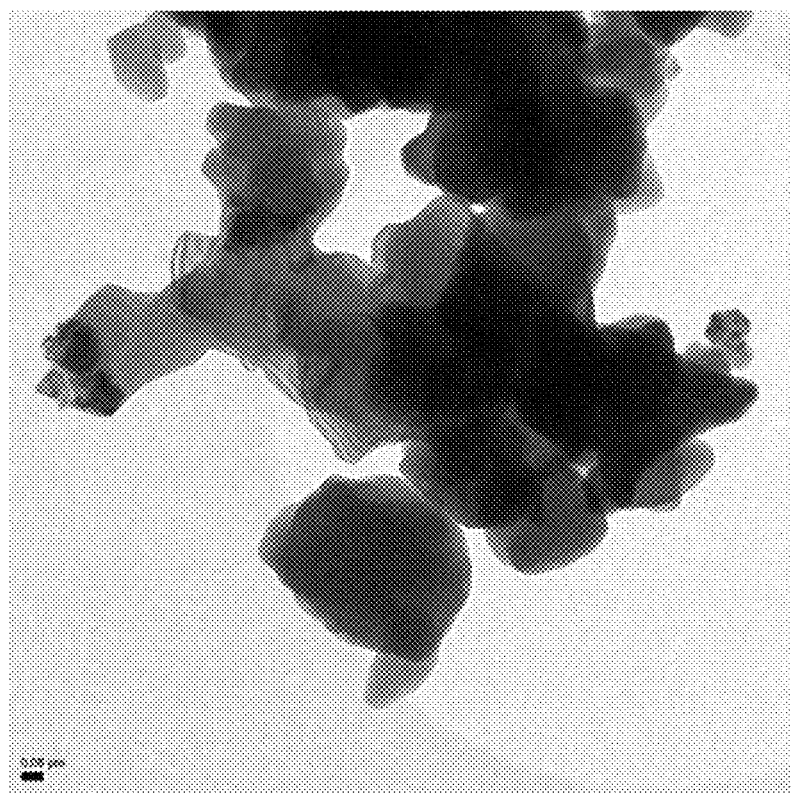
FIGS. 37A and 37B are TEM and HRTEM images of resulting materials obtained in Experimental Example 6-3, respectively.
Figure 37B:
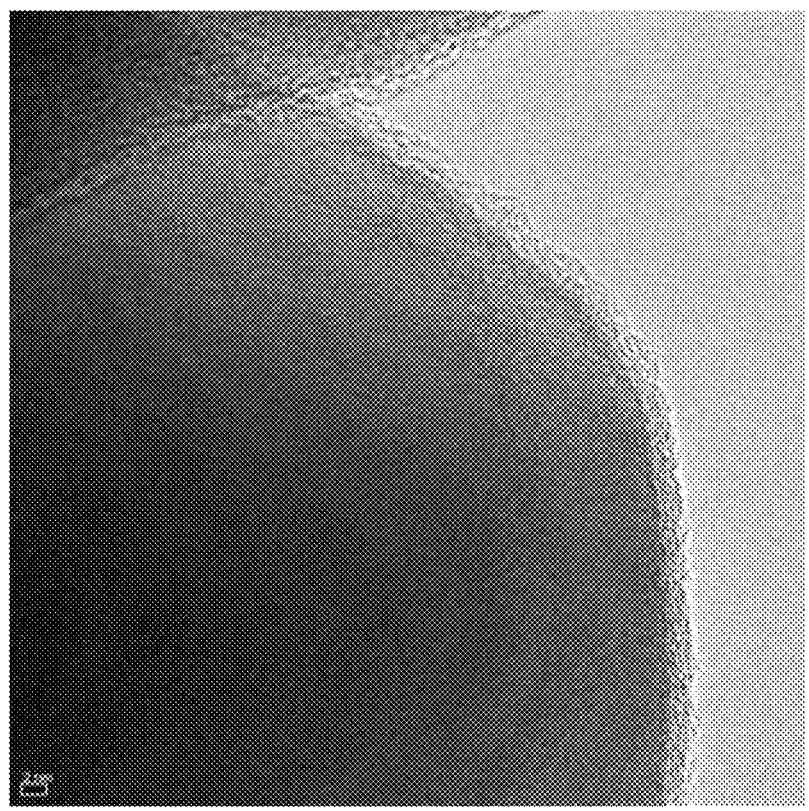

FIGS. 37A and 37B are TEM and HRTEM images of a resulting material obtained in Experimental Example 15-3, respectively. In FIGS. 37A and 37B, it can be seen that an N doped carbon layer having many defects is coated on the surface of crystalline $LiMn_2O_4$ nanoparticles with a uniform thickness. Further, with respect to the obtained resulting material, it is verified that at the inside of the resulting material obtained from the EDX mapping result, a component is $LiMn_2O_4$ and most of outer surface layer is verified as N and C components. The inside is configured by Mn and O, and Li is not detected from EDX resolution due to a small molecular weight and thus is verified through an EELS component analysis.

Experimental Example 16

Si nanoparticles having a diameter of about 80 nm and crystallinity and triphenyl borane (($C_5H_5)_3B$) as a B element-containing carbon source were supplied in an autoclave at atmospheric pressure and room temperature. In this case, the carbon source was supplied to have wt % of the triphenyl borane to the Si nanoparticles of 1:0.4. The autoclave was fully closed and a temperature was increased to 750° C., and then reaction was performed for 1 hour. After the reaction was completed, when the autoclave was cooled to the room temperature and the temperature of the autoclave dropped to the room temperature, a pressure control valve was slowly opened in order to lower the pressure in the autoclave to the atmospheric pressure, and then a Si nanoparticle-B-doped carbon core-shell structure was obtained.

Figure 38A:
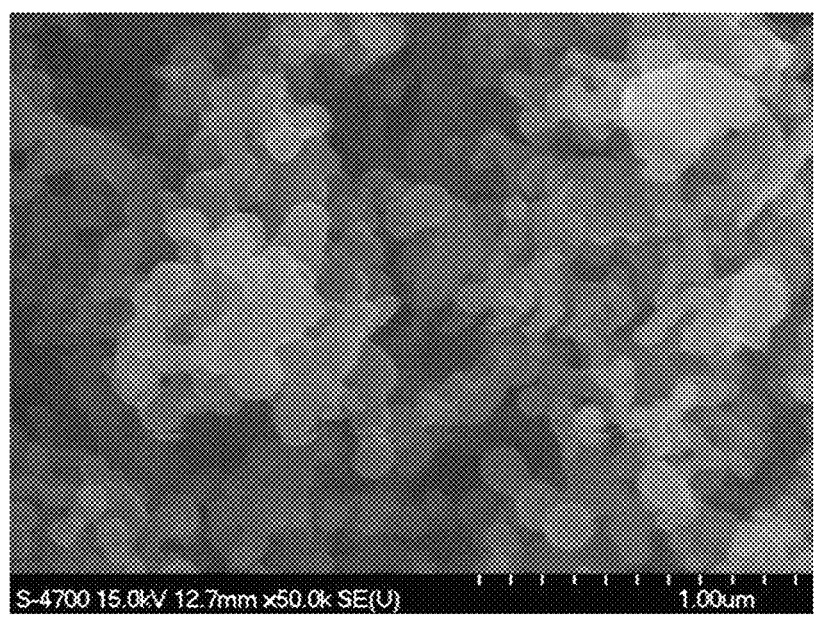
FIGS. 38A and 38B are an SEM image and an EDX graph of a resulting material obtained in Experimental Example 7, respectively.
Figure 38B:
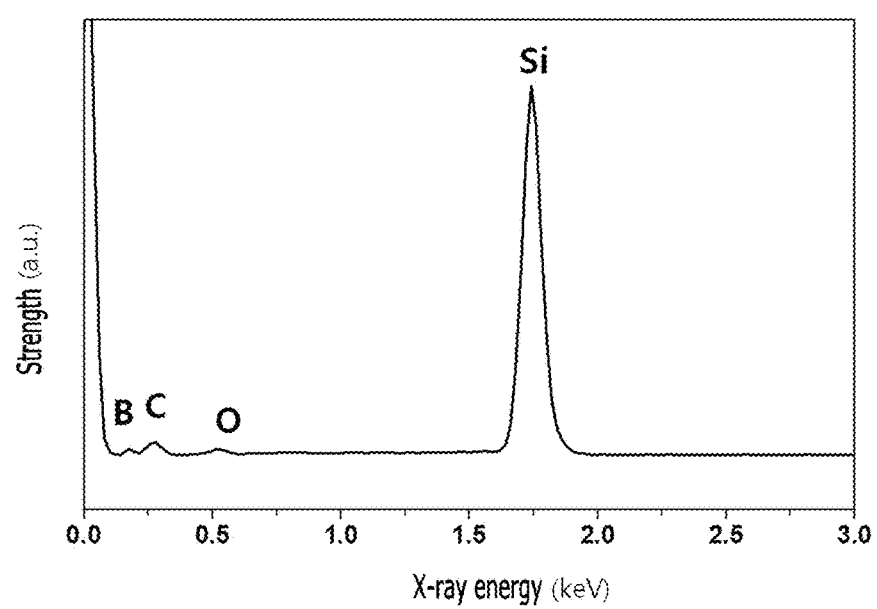

FIG. 38A illustrates an SEM image after B doped carbon coating. It can be verified that a Si nanoparticle is coated with a B doped carbon layer well. FIG. 38B is an EDX graph and it can be seen that a Si component is dominantly observed. In the sample, it was observed that the content of C component was smaller than that of pyridine coating. This can be interpreted that the coating layer is very small. It can be seen that in the sample, an O component is very little. It can be interpreted that a small amount of B component is observed and thus B is doped on the carbon layer.

Experimental Example 17

Si nanoparticles having a diameter of about 80 nm and crystallinity and a mixed source in which pyridine and triphenyl borane are mixed with 1:1 wt % as a B element-containing carbon source were supplied in an autoclave at atmospheric pressure and room temperature. In this case, it was supplied to have wt % of the mixed source of pyridine and triphenyl borane to the Si nanoparticles of 1:0.4. Thereafter, the reaction was performed like Experimental example 16 to obtain a Si nanoparticle-N, B doped carbon core-shell structure.

Figure 39A:
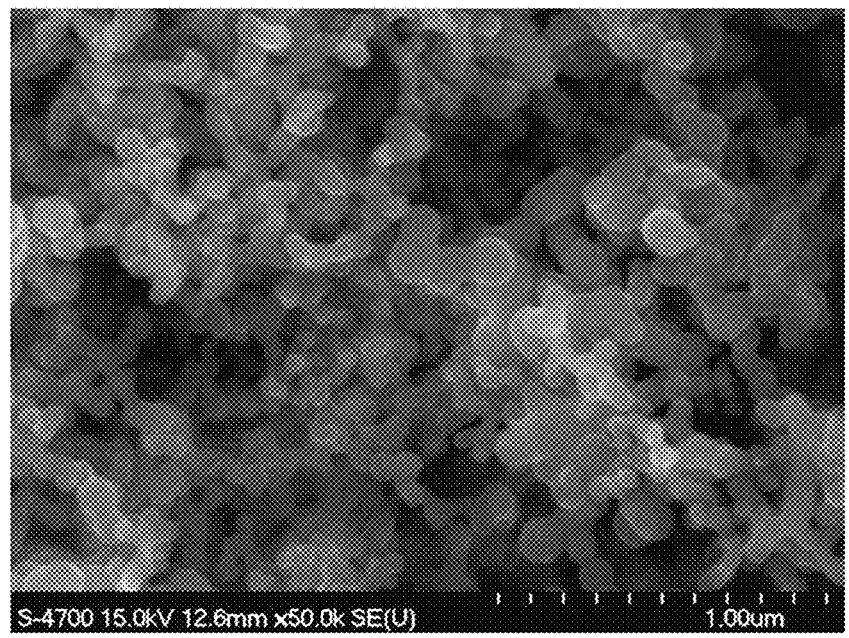
FIGS. 39A and 39B are an SEM image and an EDX graph of a resulting material obtained in Experimental Example 8, respectively.
Figure 39B:
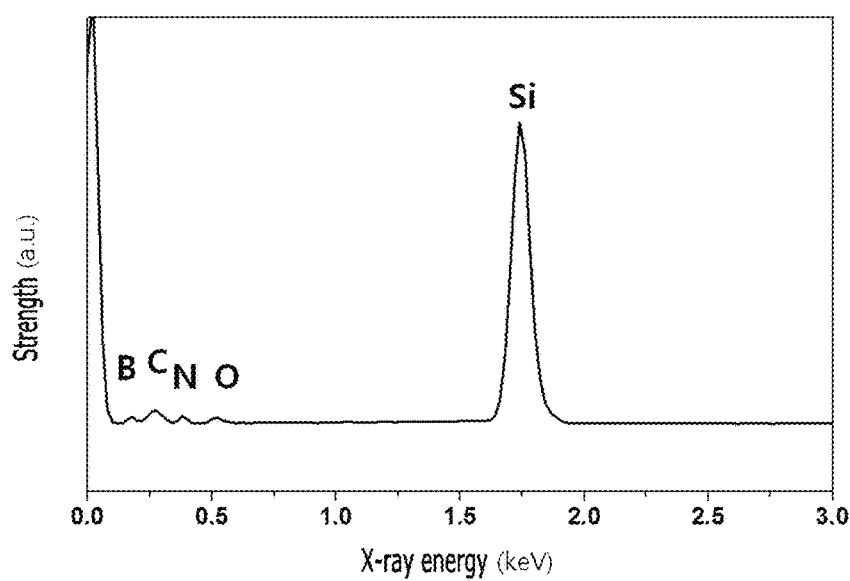

FIG. 39A illustrates an SEM image after N, B doped carbon coating. It can be verified that a Si nanoparticle is coated with an N, B doped carbon layer well. FIG. 39B is an EDX graph and it can be seen that a Si component is dominantly observed. In the sample, it was observed that the content of C component was smaller than that of pyridine coating. This can be interpreted that the coating layer is very small. It can be seen that in the sample, an O component is very little. It can be interpreted that a small amount of B component is observed and thus N and B are doped on the carbon layer.

Experimental Example 18

Only pyridine was supplied in an autoclave at atmospheric pressure and room temperature, the autoclave was fully closed and a temperature was increased to 750° C., and then reaction was performed for 1 hour. After the reaction was completed, the autoclave was cooled to the room temperature, and when the temperature of the autoclave dropped to the room temperature, a pressure control valve was slowly opened in order to lower the pressure in the autoclave to the atmospheric pressure, and then an N doped nanoscale carbon structure was obtained.

Figure 40A:
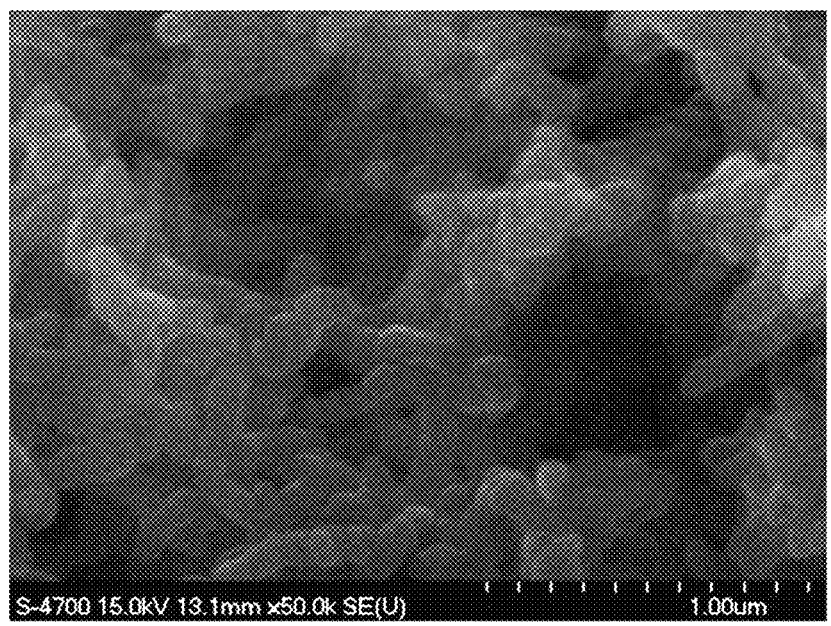
FIGS. 40A and 40B are an SEM image and an EDX graph of a resulting material obtained in Experimental Example 9, respectively.
Figure 40B:
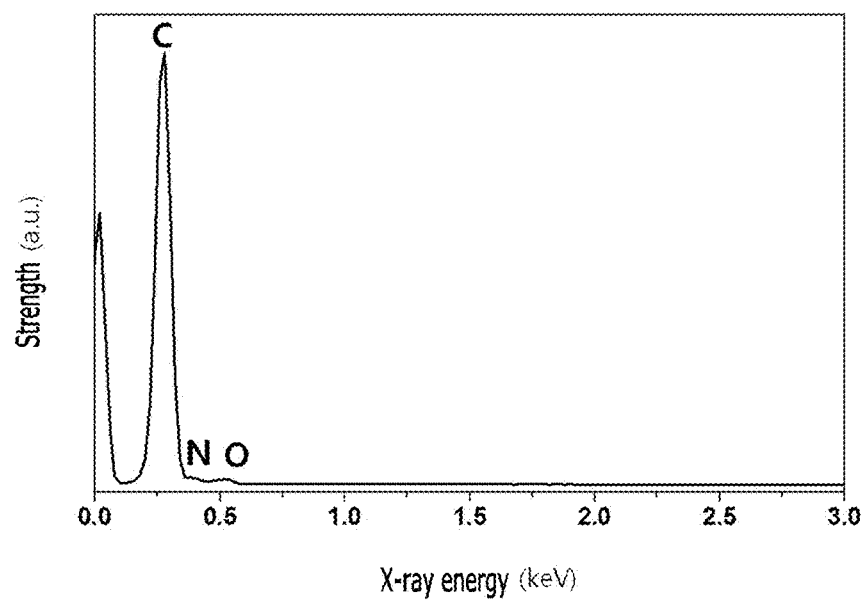

FIG. 40A is an SEM image of the N doped nanoscale carbon structure. FIG. 40B is an EDX graph and illustrates that a synthesized resulting material is an N doped carbon structure.

Experimental Example 19

Experimental Example 19 is to show that a metal nanoparticle-doped carbon core-shell structure can be produced by using a metal oxide nanoparticle as a starting material. Like Experimental Example 10, $SnO_2$ nanoparticles having a diameter of about 50 nm and crystalline and pyridine as a doped element-containing carbon source were supplied in an autoclave at atmospheric pressure and room temperature. In this case, it was supplied to have a Vol % ratio of the doped element-containing carbon source to an autoclave capacity of 1:0.15. The autoclave was fully closed and a temperature was increased to 750° C., and then reaction was performed for 1 hour. After the reaction was completed, the autoclave was cooled to the room temperature, when the temperature of the autoclave dropped to the room temperature, a pressure control valve was slowly opened in order to lower the pressure in the autoclave to the atmospheric pressure, and then a $SnO_2$ nanoparticle-N doped carbon core-shell structure was obtained. Subsequently, the obtained $SnO_2$ nanoparticle-N doped carbon core-shell structure was reduced for 1 hour at 750° C. at a hydrogen atmosphere containing 10 vol % of $H_2$ gas in argon gas to obtain a Sn nanoparticle-N doped carbon core-shell structure.

Figure 41A:
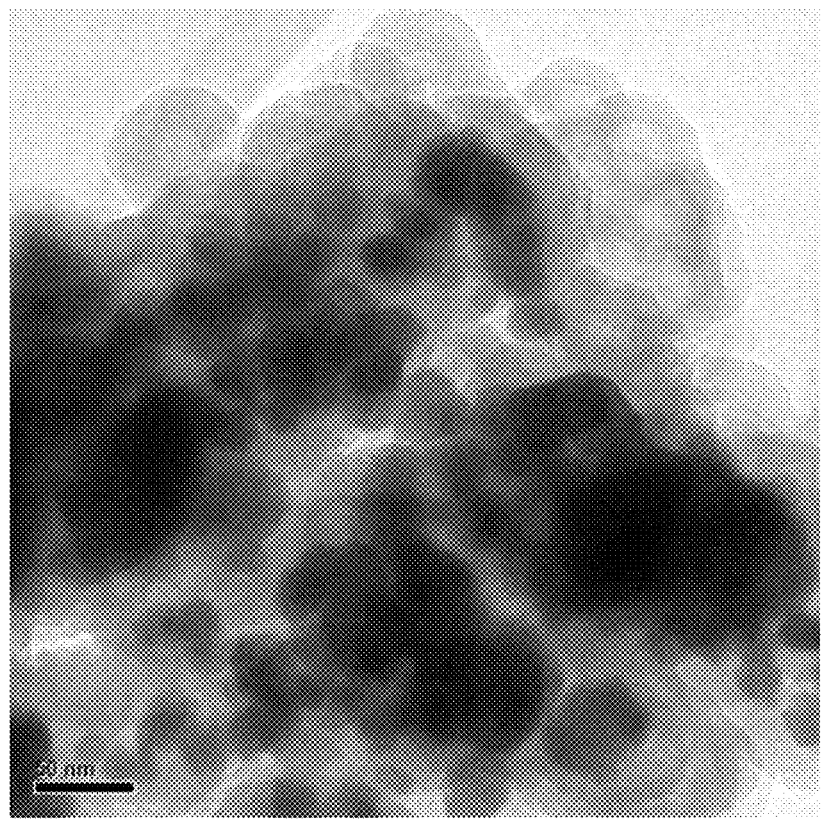
FIGS. 41A to 41C are a TEM image, an FFT image, and an EDX graph of a resulting material obtained in Experimental Example 10.
Figure 41B:
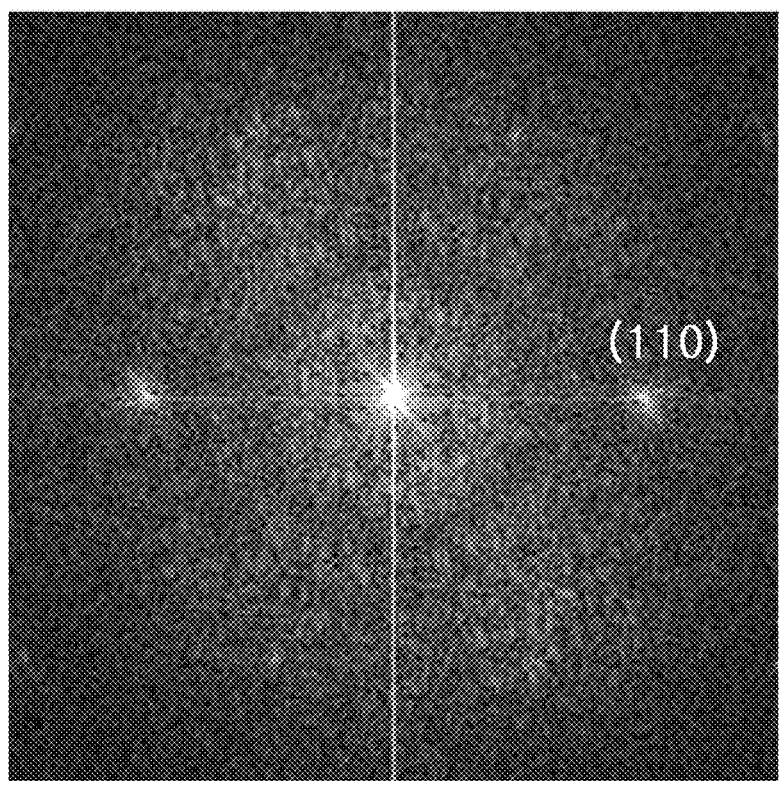
Figure 41C:
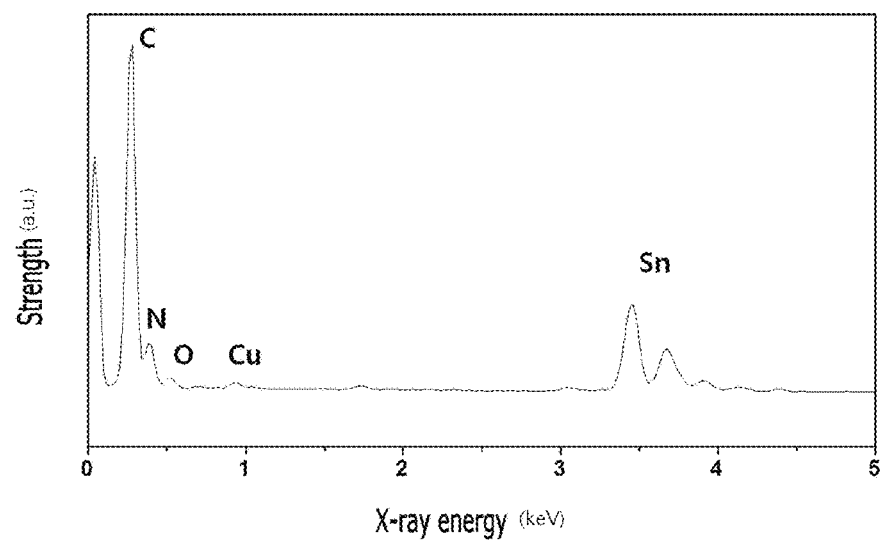

FIG. 41A is a TEM image of the Sn nanoparticle-N doped carbon core-shell structure. FIG. 41B is an FFT image of the Sn nanoparticle-N doped carbon core-shell structure, and it can be seen that an internal material is Sn nanoparticles having a tetragonal structure. FIG. 41C is an EDX graph and it can be verified that Sn and C are dominantly observed. In the sample, it can be verified that when it is observed that an O component almost disappears, in a reduction process, a $SnO_2$ nanoparticle is reduced to Sn by $H_2$ source. The N value is the same as before reduction, and thus it can be seen that in the reduction process, N is doped on C as it is.

Experimental Example 20

Experimental Example 20 is to show that crystallinity of the obtained core-shell may be enhanced through heat treatment. Like Experimental Example 10, Si nanoparticles having a diameter of about 80 nm and crystalline and pyridine as an N element-containing carbon source were supplied in an autoclave at atmospheric pressure and room temperature. In this case, it was supplied to have a Vol % ratio of the pyridine to an autoclave capacity of 1:0.06. The autoclave was fully closed and a temperature was increased to 750° C., and then reaction was performed for 1 hour. After the reaction was completed, the autoclave was cooled to the room temperature, when the temperature of the autoclave dropped to the room temperature, a pressure control valve was slowly opened in order to lower the pressure in the autoclave to the atmospheric pressure, and then a Si nanoparticle-N-doped carbon core-shell structure was obtained. Subsequently, the obtained Si nanoparticle-N doped carbon core-shell structure was heated for 2 hours at an inert atmosphere of 1,100° C. and 1,300° C.

Figure 42A:
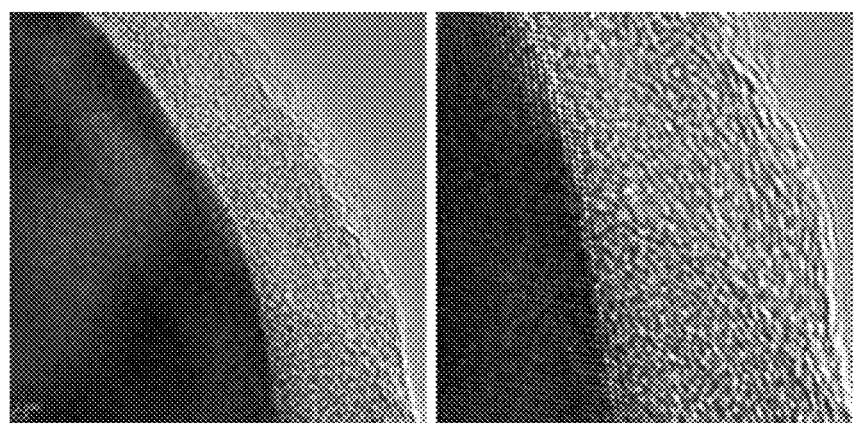
FIG. 42A is an HRTEM image illustrating an Si nanoparticle-N-doped carbon core-shell structure before heat treatment.
Figure 42B:
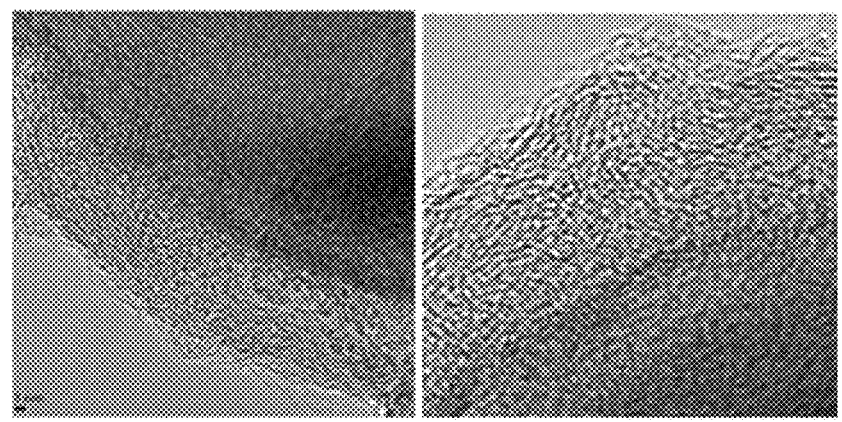
FIG. 42B is an HRTEM image illustrating an Si nanoparticle-N-doped carbon core-shell structure heated at 1,100° C.
Figure 42C:
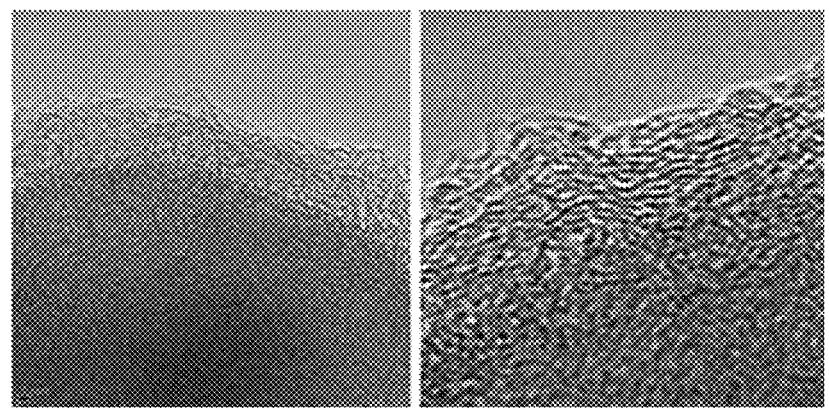
FIG. 42C is an HRTEM image illustrating an Si nanoparticle-N-doped carbon core-shell structure heated at 1,300° C.

FIG. 42A is an HRTEM image illustrating an Si nanoparticle-N doped carbon core-shell structure before heat treatment, FIG. 42B is an HRTEM image illustrating an Si nanoparticle-N doped carbon core-shell structure heated at 1,100° C., and FIG. 42C is an HRTEM image illustrating an Si nanoparticle-N doped carbon core-shell structure heated at 1,300° C.

In FIG. 42A, it can be verified that the carbon shell before heat treatment has many defects and crystallinity thereof is not good. In FIG. 42B, it can be verified that many defects are still present in the carbon shell, but the crystallinity thereof is good. In FIG. 42C, as compared with the case of heat treatment at 1,100° C., in the case of heat treatment at 1,300° C., it can be seen that more defects are decreased and the crystallinity is more excellent.

FIGS. 43A to 43D illustrate XPS graphs for C (1s), N (1s), Si (2p), and O (1s) for a raw sample Si, an Si nanoparticle-N doped carbon core-shell structure before heat treatment, an Si nanoparticle-N doped carbon core-shell structure heated at 1,100° C., and an Si nanoparticle-N doped carbon core-shell structure heated at 1,300° C., respectively.

Figure 43A:
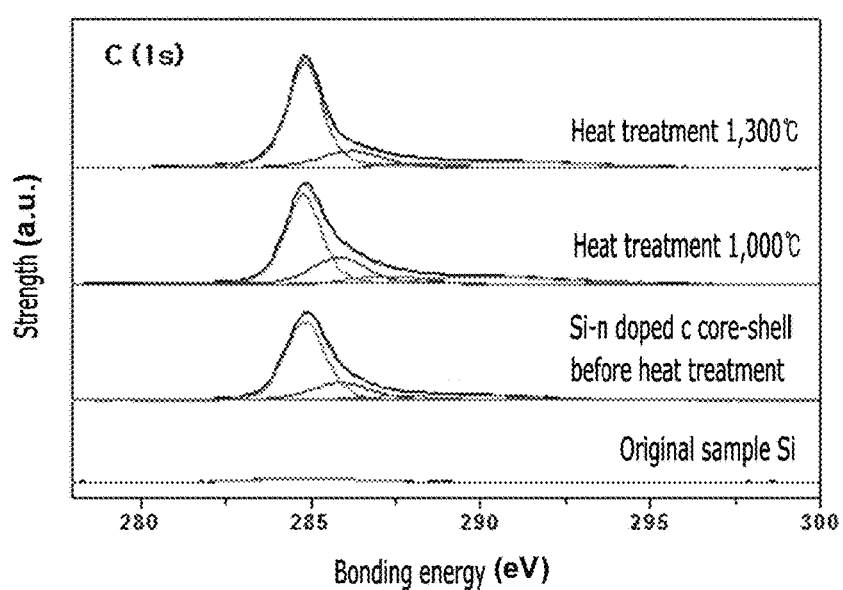
FIGS. 43A to 43D illustrate XPS graphs for C (1s), N (1s), Si (2p), and O (1s) for a raw sample Si, an Si nanoparticle-N-doped carbon core-shell structure before heat treatment, an Si nanoparticle-N-doped carbon core-shell structure heated at 1,100° C., and an Si nanoparticle-N-doped carbon core-shell structure heated at 1,300° C., respectively.

FIG. 43A illustrates detailed peaks for C (1s). A carbon bond of a typical graphite structure is shown around 284.8 eV, 285.3 eV is a peak related with a defect of the carbon structure, and peaks around 289 eV and 290 eV are related with C—O and $CO_3^-$, respectively. In the raw sample Si, carbon only at an impurity level is included. In the Si nanoparticle-N doped carbon core-shell structure before heat treatment which is synthesized at 750° C., a C 1(s) graph for a typical carbon structure is observed. This shows that carbon coating is performed well. As the heat treatment temperature is increased, particularly, in the sample heated at 1,300° C., it is verified that sharpness and strength of the peak corresponding to the carbon bond of the typical graphite structure are increased around 284.8 eV. This means that as verified in FIG. 42C, the crystallinity of the carbon structure is increased.

Figure 43B:
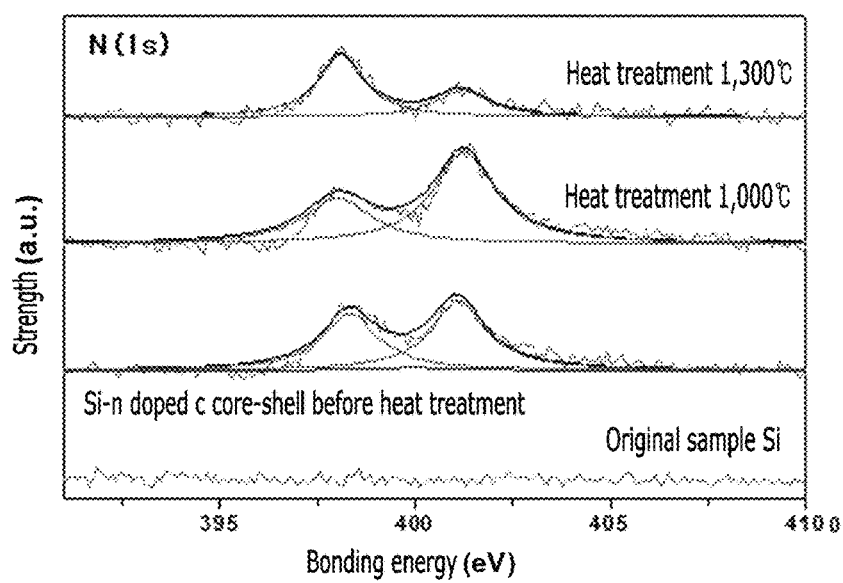

FIG. 43B illustrates detailed peaks for N (1s). In other words, FIG. 43B is graphs for structural features of N doped on the carbon structure. 398.2 eV illustrates a pyridine type N6 doping structure, 400.2 eV illustrates a pyrrolic type N5 doping structure, and 401.2 eV illustrates a quaternary N3 doping structure. In the raw sample Si, a structure by an N component is not observed. In the Si nanoparticle-N doped carbon core-shell structure before heat treatment which is synthesized at 750° C., an N 1(s) graph for a typical N doped carbon structure is observed. The pyridine type N6 doping structure of 398.2 eV, the pyrrolic type N5 doping structure of 400.2 eV, and the quaternary type N3 doping structure of 401.2 eV all are observed. The pyridine type and the quaternary type are dominantly shown. As the heat treatment temperature is increased, particularly, in the sample heated at 1,300° C., a structural change of the quaternary type is noticeably verified.

In FIGS. 29F, 33D, and 43B, it can be seen that the N doped carbon structure may be changed by controlling a type, a used amount, and a treatment temperature of the N containing carbon source.

Figure 43C:
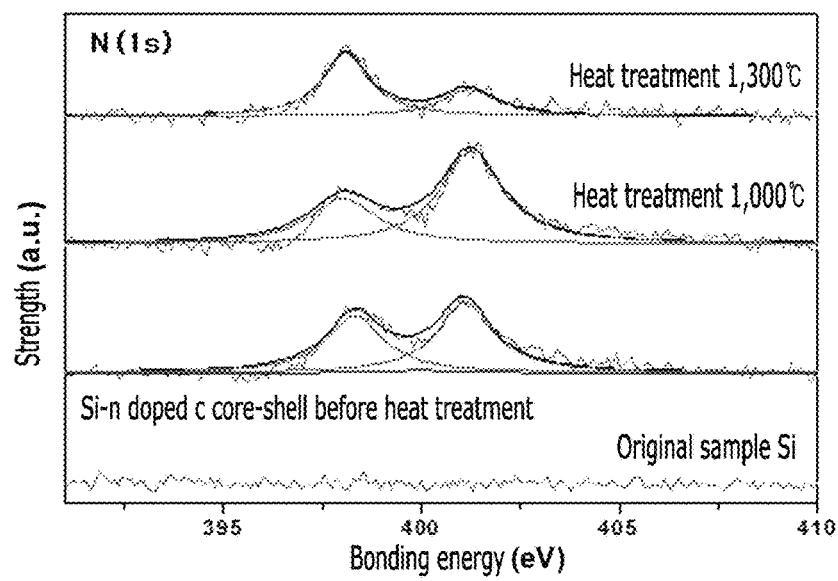

FIG. 43C is graphs for Si (2p). In other words, FIG. 43C is graphs for a structure of the Si nanoparticle corresponding to the core. 99.4 eV illustrates a typical Si structure, 101.7 eV illustrates a silicon nitride structure, and 103.4 eV illustrates a silicon oxide (SiOx 0<x2) structure. It is shown that most of raw sample Si is a pure Si structure corresponding to 99.4 eV, and some of the silicon oxide peak is observed around 103.4 eV. This illustrates information on a natural oxide layer formed on the surface of the nanoparticle. In the Si nanoparticle-N doped carbon core-shell structure before heat treatment which is synthesized at 750° C., the Si peak is slightly reduced. This is determined because the exposure of Si is relatively small by the carbon shell formed on the Si surface. Further, the silicon nitride peak corresponding to 101.7 eV is newly observed. This shows that in the process of forming the N doped carbon shell, the surface of Si as the core is partially doped with N to form the silicon nitride layer. As the heat treatment temperature is increased, it is observed that the strength of the peak for silicon nitride is gradually increased. This shows that the N component included in the carbon shell has a large effect on the Si core in addition to the increase of the heat treatment temperature.

Figure 43D:
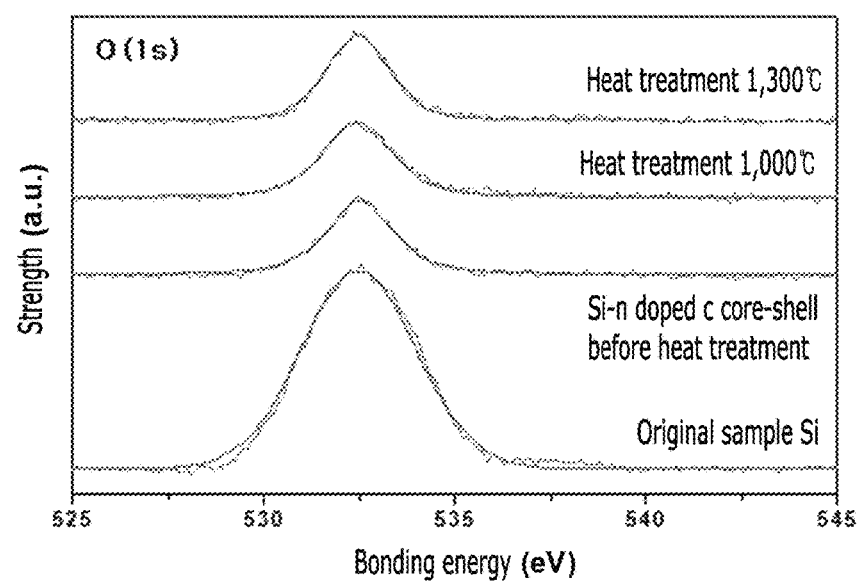

FIG. 43D illustrates detailed peaks for O (1s). Most of oxygen peaks observed in 532.4 eV notify information on an oxide layer formed on the Si surface.

Experimental Example 21

According to the method described in Experimental Example 10, a negative active material constituted by a Si—N/C core-shell structure and a negative active material constituted by a Si nanoparticle raw sample (bare Si) were prepared, respectively.

A mixture of the negative active material, a denka black (DB) as a conductive material, styrene butadiene rubber (SBR) as a binder, and carboxymethyl cellulose (CMC) as a thickener was mixed with a wt % of 6:2:2, respectively, and water was added thereto to produce slurry. The slurry was dried for 15 minutes at room temperature and then dried again for 30 minutes at 90° C. in a vacuum state in order to completely remove the remaining solvent. The produced slurry was coated on a copper foil as a negative current collector with a thickness of 40 to 80 μm. A negative electrode having the loading degree of the active material of 1 to 2 g/cm$^2$ was prepared.

As a positive electrode, a metal lithium foil of 1.8 cm$^2$ was used, and a polyethylene separation membrane was interposed between the negative electrode and the positive electrode to prepare an electrode assembly. 1M of $LiPF_6$ was added to a non-aqueous electrolyte solvent in which ethylene carbonate (EC) and diethylene carbonate (DEC) were mixed with a vol % ratio of 1:1 to prepare a non-aqueous electrolyte, and then the non-aqueous electrolyte was injected to the electrode assembly to prepare a coin type half cell using the prepared negative electrode. The prepared half cell was thereafter aged for 24 hours at 40° C.

With respect to the prepared half cell, a charge and discharge test was performed. During charging and discharging, 0.01 to 1.5 V (vs Li/Li$^+$) areas were used and the charge and discharge test was performed by a CC/CV method of 0.2 C rate. A reference capacity of Si is about 3,600 mAh/g.

Figure 44:
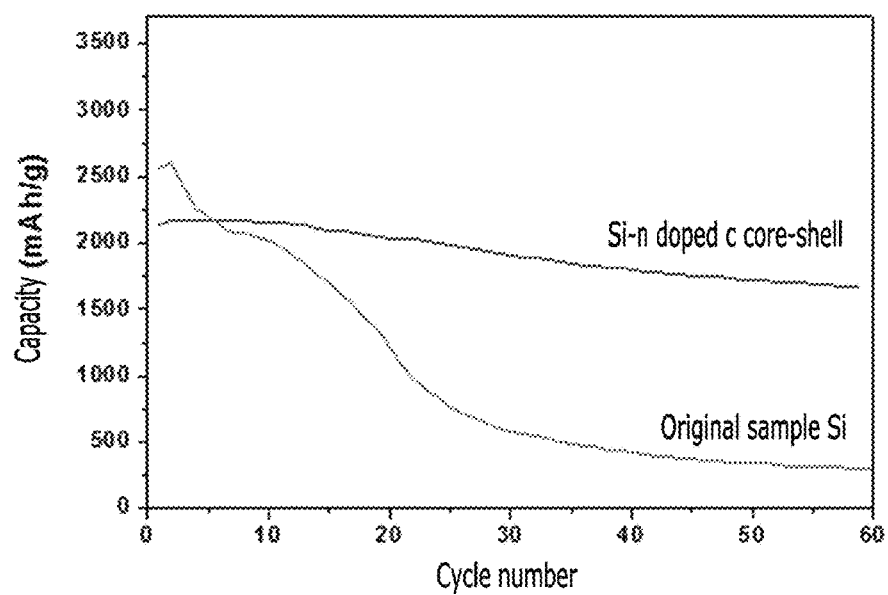
FIG. 44 is a graph illustrating charging and discharging test results of a half cell having an Si—N/C core-shell negative active material having an N-doped carbon layer and a half cell having a bare Si negative active material.

The result is illustrated in FIG. 44. In FIG. 44, as the result of the charge and discharge cycle test, it can be seen that the Si—N/C core-shell negative active material having the N doped carbon layer has significantly improved performance as compared with a bare Si negative active material. In the case of I.C.E (%), a Si—N/C core-shell sample is 85.26 and the bare Si sample is 88.12, and the two samples are similar to each other, but a retention capacity (@ 60) after 60 cycles is shown as 72.4 in the Si—N/C core-shell sample and 10.57 in the bare Si sample. Accordingly, it can be verified that in the case of the Si—N/C core-shell sample, the retention capacity is enhanced by about eight times larger than that of the bare Si sample. This shows that when the N doped carbon layer is coated on Si, it is a great help to improve long-term stability and performance of Si.

Experimental Example 22

According to the method described in Experimental Example 10, a negative active material constituted by a Si—N/C core-shell structure and a negative active material constituted by a Si—C core-shell were prepared, respectively.

A coin type half cell was prepared by the same method as Experimental Example 21.

With respect to the prepared half cell, a charge and discharge test was performed. During charging and discharging, 0.01 to 1.5 V (vs Li/Li$^+$) areas were used and the charge and discharge test was performed by a CC/CV method of 0.2 C rate.

Figure 45:
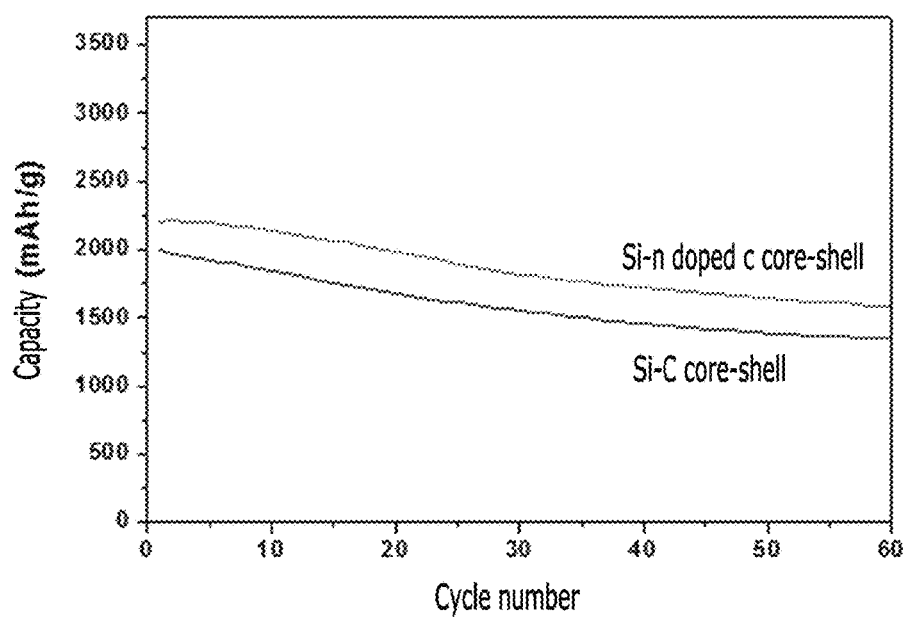
FIG. 45 is a graph illustrating charging and discharging test results of a half cell having an Si—N/C core-shell negative active material having an N-doped carbon layer and a half cell having an Si—C core-shell negative active material.

The result is illustrated in FIG. 45. In FIG. 45, as the result of the charge and discharge cycle test, it can be seen that the Si—N/C core-shell negative active material having the N doped carbon layer has significantly improved performance as compared with the Si—C core-shell negative active material. In the case of I.C.E (%), the Si—N/C core-shell sample is 85.26 and the Si—C core-shell sample is 82.7, and the two samples are similar to each other, but a retention capacity (@ 60) after 60 cycles is shown as 72.4 in the Si—N/C core-shell sample and 67.5 in the Si—C core-shell sample. Accordingly, it can be verified that in the case of the Si—N/C core-shell sample, the retention capacity is enhanced by about 15% larger than that of the Si—N/C core-shell sample. This shows that when the N doped carbon layer is coated on Si, it is a great help to improve long-term stability and performance of Si.

Experimental Example 23

A negative active material constituted by a N doped nanoscale carbon structure prepared in Experimental Example 18 was prepared.

A coin type half cell was produced by the same method as Experimental Example 21.

With respect to the prepared half cell, a charge and discharge test was performed. During charging and discharging, 0.01 to 1.5 V (vs Li/Li$^+$) areas were used and the charge and discharge test was performed by a CC/CV method of 0.2 C rate.

Figure 46:
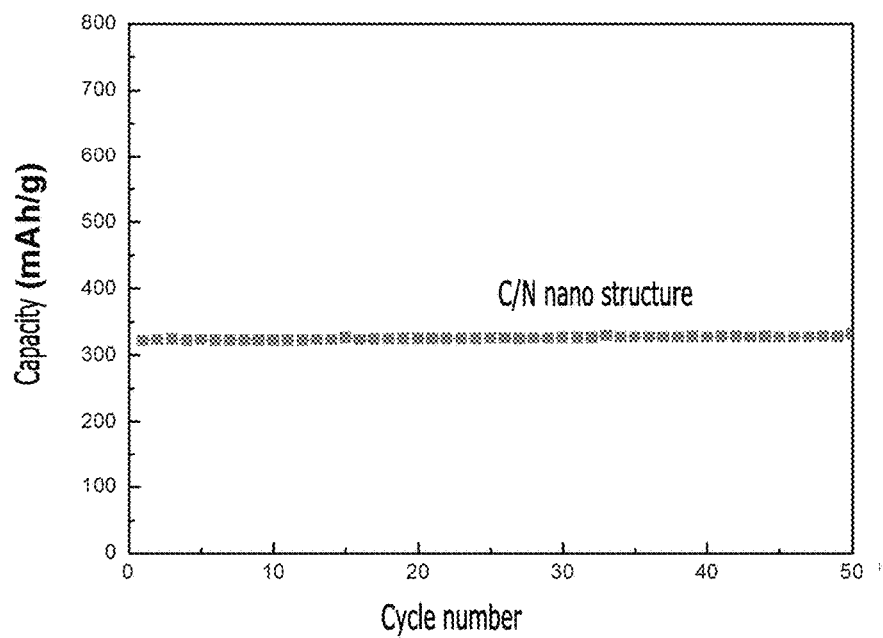
FIG. 46 is a graph illustrating a charging and discharging test result of a half cell having an N-doped nano-scaled carbon structure active material.

The result is illustrated in FIG. 46. In FIG. 46, as the result of the charge and discharge cycle test, an initial capacity of the N doped nanoscale carbon structure was 321.9 mAh/g and even after 50 charge and discharge cycles, the capacity was maintained almost 100% as it is. As a result, it can be seen that the N doped nanoscale carbon structure can be used as a long-term stable lithium battery material.

Hereinabove, the method of doped carbon coating on nanoparticles was described with reference to FIGS. 28 to 46, and hereinafter, a method of synthesizing lithium doped nanoparticles according to exemplary embodiments of the present invention will be described.

Figure 47:
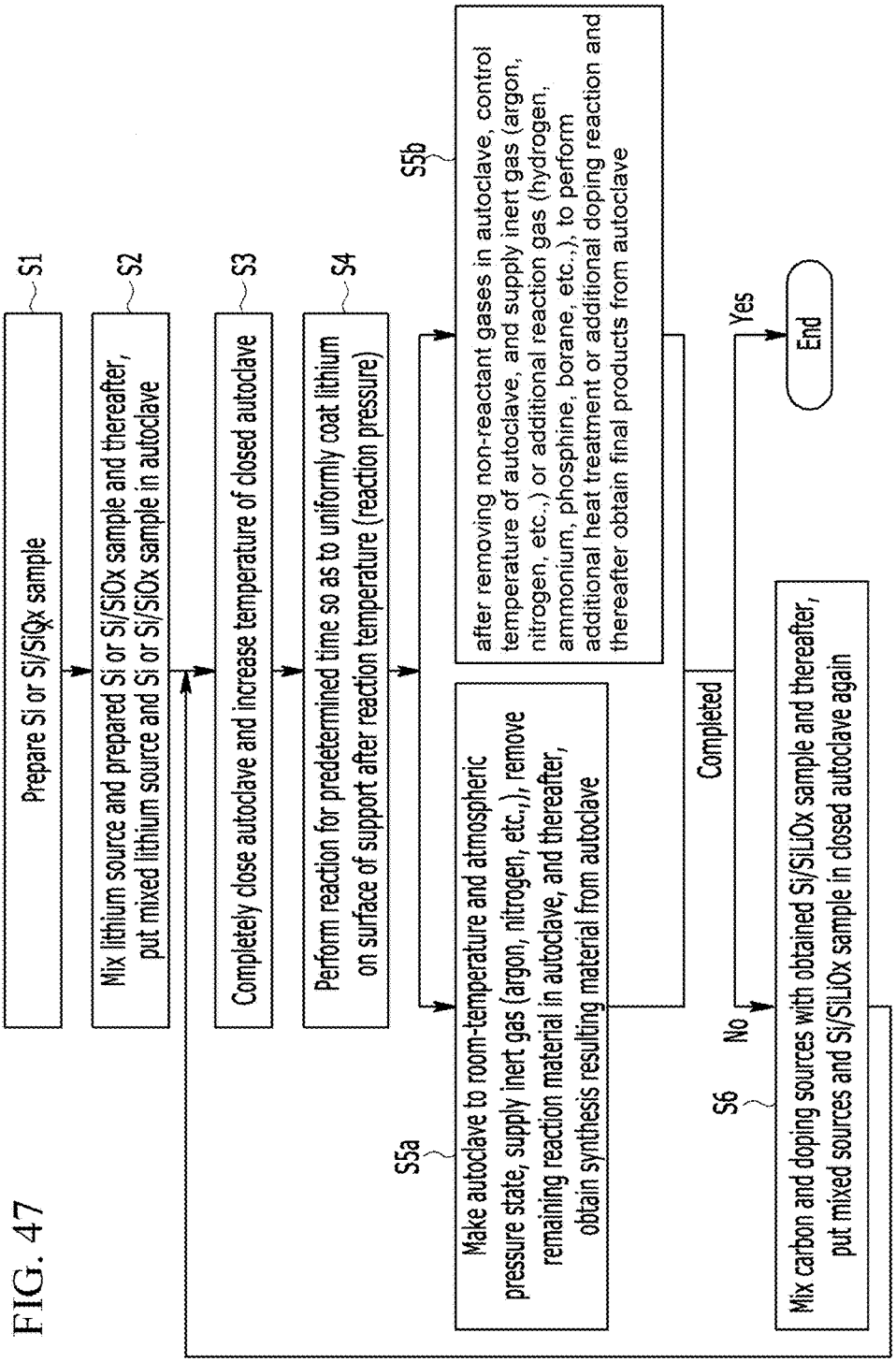
FIG. 47 is a flowchart illustrating a method of synthesizing lithium doped nanoparticles according to exemplary embodiments of the present invention.

FIG. 47 is a flowchart illustrating a method of synthesizing lithium doped nanoparticles according to exemplary embodiments of the present invention. The description for substantially the same parts of the method of carbon coating on nanoparticles and the method of doped carbon coating on the nanoparticles described with reference to FIGS. 1 to 46 is omitted and only different parts will be described.

First, a Si or Si/SiOx sample is prepared (S1).

Subsequently, a lithium source and the prepared Si or Si/SiOx sample are mixed and then supplied to a high-temperature and pressure closed type autoclave (S2).

The lithium source may use lithium acetylacetonate ($LiO_2C_5H_7$), lithium carbonante, ($Li_2CO_3$), Lithium sulfide (LiS), lithium hydride (LiH), lithium dimethylamide ($C_2H_6LiN$), lithium acetoacetate ($LiO_3C_4H_5$), or the like, but it is just exemplified and not limited thereto.

Subsequently, the autoclave is fully closed and the temperature of the closed autoclave rises (S3).

The reaction temperature may vary according to a material or a capacity of the autoclave. In the exemplary embodiments of the present invention, the temperature rises to be 450 to 750° C., preferably 500 to 750° C. When the temperature reaches the reaction temperature, the reaction is performed for a predetermined time such that lithium may be evenly coated on the surface of the nanoparticles (S4).

While the temperature of the autoclave rises up to the reaction temperature, the lithium source supplied for coating is evaporated or pyrolyzed in the autoclave and thus the internal pressure of the autoclave is increased. As a result, self-generation pressure by a gas constant corresponding to the synthesis temperature is generated in the autoclave.

When the reaction is completed, the autoclave is made to the room temperature and atmospheric pressure state and then a resulting material coated with lithium is obtained (S5a).

When the reaction is completed, the autoclave is cooled to the room temperature again. When the temperature of the autoclave drops to the room temperature, a pressure control valve is slowly opened so as to lower the pressure in the autoclave to the atmospheric pressure. When the autoclave finally reaches the room temperature and atmospheric pressure state, the inside of the autoclave is purged by using inert gas such as argon or nitrogen and the autoclave is opened to obtain the synthesized resulting material in the autoclave.

The synthesized resulting material becomes lithium doped SiOx-Si, lithium doped C—SiOx-Si, and lithium doped N-doped C—SiOx-Si according to the used lithium source.

Figure 48:
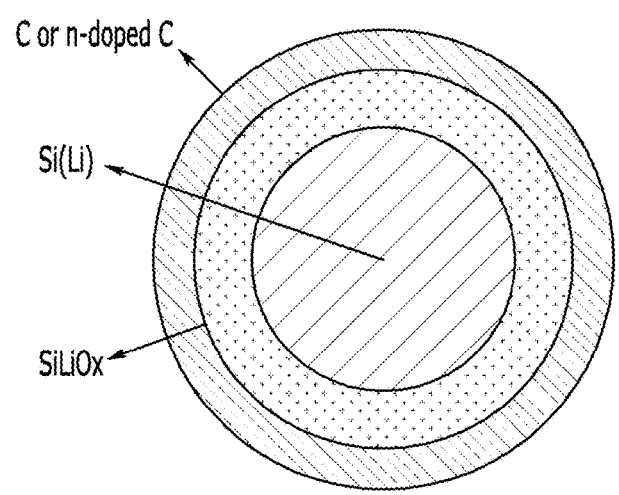
FIG. 48 is a schematic of a synthesized resulting material according to FIG. 47.

In FIG. 48, a schematic diagram of the synthesized resulting material is exemplified. Lithium is mainly doped in SiOx and some of lithium is doped in Si. In addition, the lithium doped SiOx-Si is covered by carbon coating or N doped carbon coating.

As another method, after removing non-reactant gases in the autoclave, control the temperature of the autoclave, and supply inert gas (argon, nitrogen, or the like) or additional reaction gas (hydrogen, ammonium, phosphine, borane, etc) to perform additional heat treatment or additional doping reaction and thereafter final products is obtained. (S5b).

After the synthesized resulting material is obtained in the autoclave, if necessary, the carbon source is mixed with the obtained lithium doped SiOx-Si, lithium doped C—SiOx-Si, and lithium doped N-doped C—SiOx-Si samples and put in the closed autoclave again and then the reaction may be additionally performed (S6). In this case, the reaction temperature may be set to be higher than the above reaction temperature. Carbon source may be carbon source without doping element or doped element-containing carbon source. When the carbon source is the carbon source without doping element, doping source may be mixed with the carbon source without doping element. In this case doping source may be ammonium, phosphine, borane, etc. For example, the temperature rises to be 750 to 950° C. In this case, the carbon coated SiLiOx-LiSi and the doped carbon coated SiLiOx-LiSi may be formed.

Figure 49:
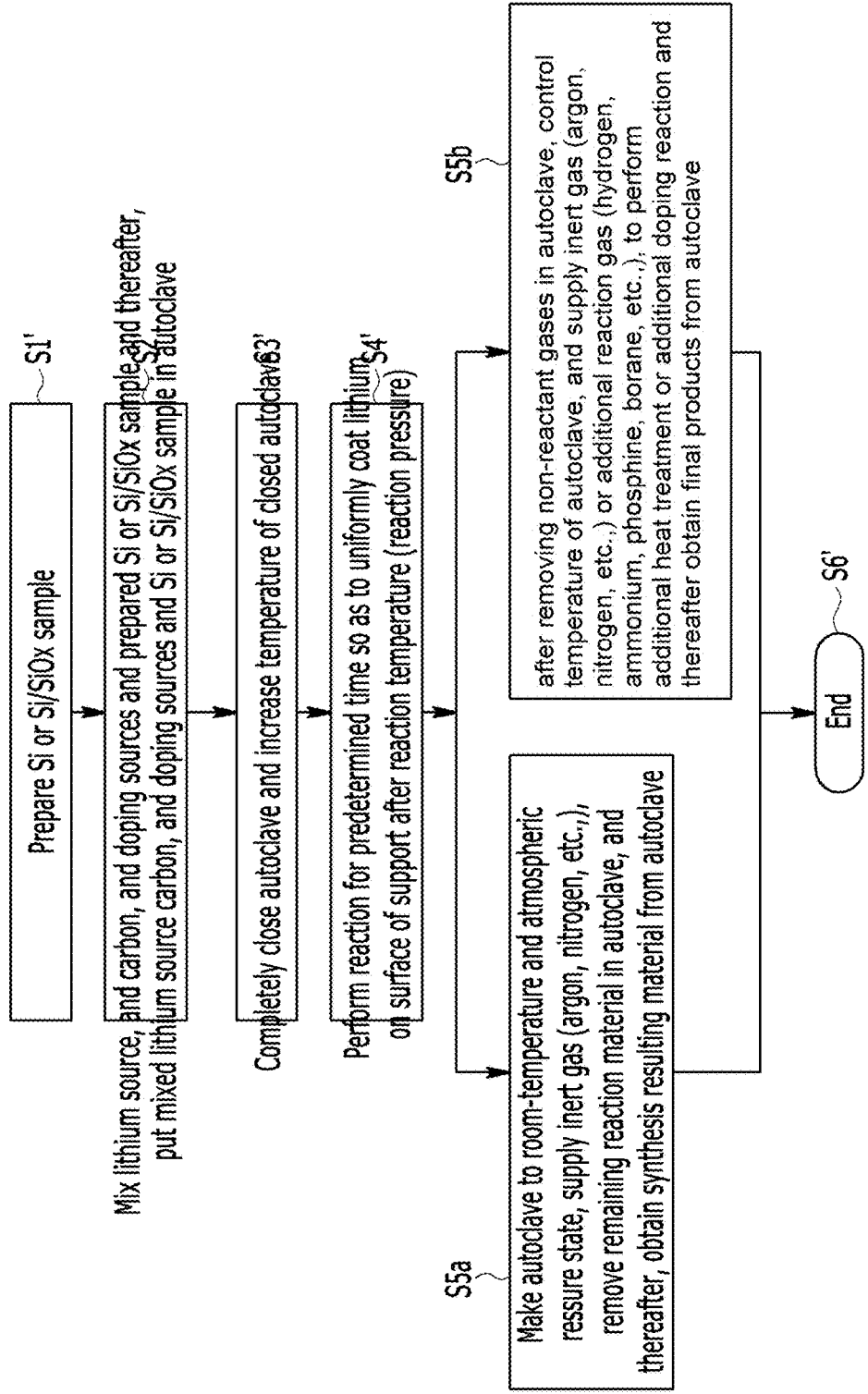
FIG. 49 is another flowchart illustrating a method of synthesizing lithium doped nanoparticles according to exemplary embodiments of the present invention.

Hereinafter, a method of synthesizing nanoparticles according to exemplary embodiments of the present invention will be described with reference to a flowchart illustrated in FIG. 49.

First, a Si or Si/SiOx sample is prepared (Si).

Subsequently, a lithium source and a carbon source are mixed with the prepared Si or Si/SiOx sample and then the mixture is supplied to a high-temperature and pressure closed type autoclave (S2').

Carbon source may be carbon source without doping element or doped element-containing carbon source. When the carbon source is the carbon source without doping element, doping source may be mixed with the carbon source without doping element and lithium source. In this case doping source may be ammonium, phosphine, borane, etc.

The subsequent processes are performed by the same method as the method described in FIG. 47 to obtain the resulting material.

Figure 50:
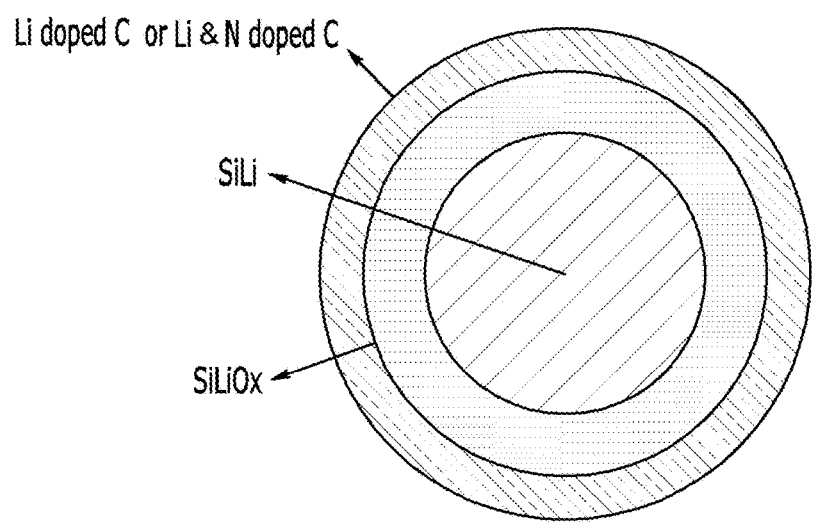
FIG. 50 is a schematic of a synthesized resulting material according to FIG. 49.

In this case, as illustrated in a schematic diagram of FIG. 50, Li is randomly doped and present in the carbon coating layer or the N doped carbon coating layer, the SiOx layer, and the Si core.

Experimental Example 24

Si nanoparticles having a diameter of about 100 nm and crystallinity and benzene ($C_6H_6$) as a carbon source were just supplied in an autoclave at atmospheric pressure and room temperature. The autoclave was fully closed and a temperature was increased to 750° C., and then reaction was performed for 1 hour. After the reaction was completed, the autoclave was cooled to the room temperature, and when the temperature of the autoclave dropped to the room temperature, a pressure control valve was slowly opened in order to lower the pressure in the autoclave to the atmospheric pressure, and then a Si nanoparticle-carbon core-shell structure was obtained.

Meanwhile, under the same condition, the reaction was performed by supplying lithium acetylacetonate as a lithium source instead of a carbon source.

Figure 51A:
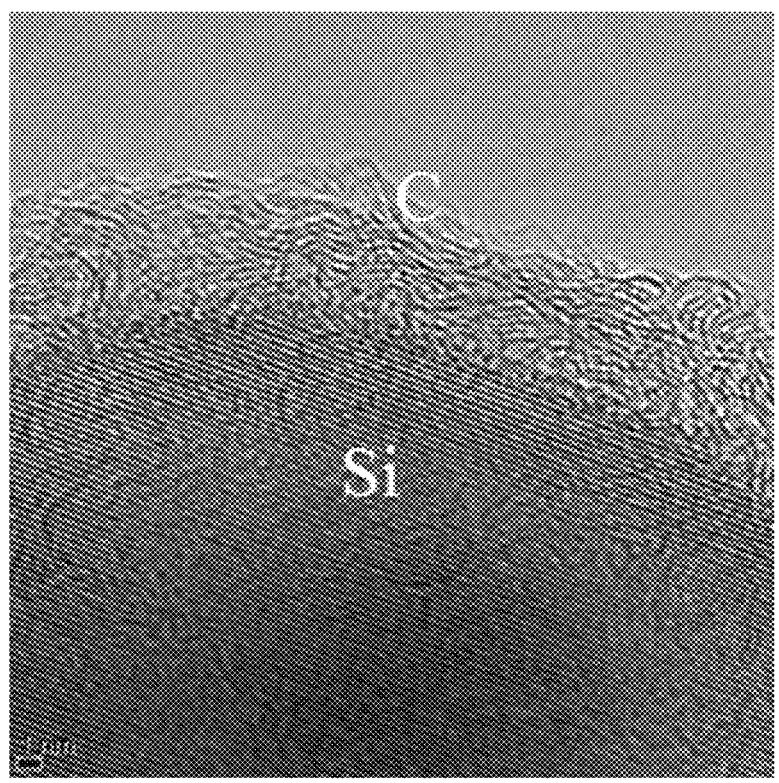
FIG. 51A illustrates a HRTEM image in the case of supplying only a carbon source and FIG. 51B illustrates a HRTEM image in the case of supplying only a lithium source.
Figure 51B:
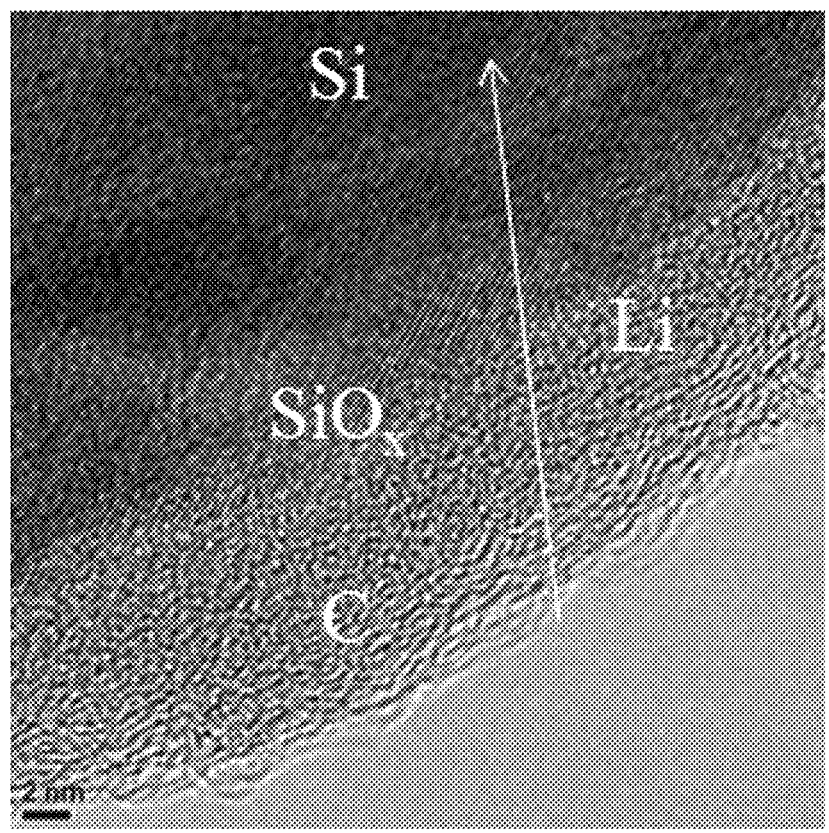

FIG. 51A illustrates a HRTEM image in the case of supplying only the carbon source and FIG. 51B illustrates a HRTEM image in the case of supplying only the lithium source. Referring to FIG. 51A, in the case of supplying only the carbon source, only the crystalline carbon layer is verified on the Si surface. On the other hand, referring to FIG. 51B, in the case of supplying only the lithium source, it can be seen that an amorphous $SiO_x$ layer on the Si surface and a very thin crystalline carbon layer thereon are formed and lithium is randomly doped.

Experimental Example 25

Si—SiOx nanoparticles having a diameter of about 100 nm and crystallinity and lithium acetylacetonate as a lithium source were mixed and then supplied in an autoclave at atmospheric pressure and room temperature. The autoclave was fully closed and a temperature was increased to 750° C., and then reaction was performed for 1 hour.

Figure 52A:
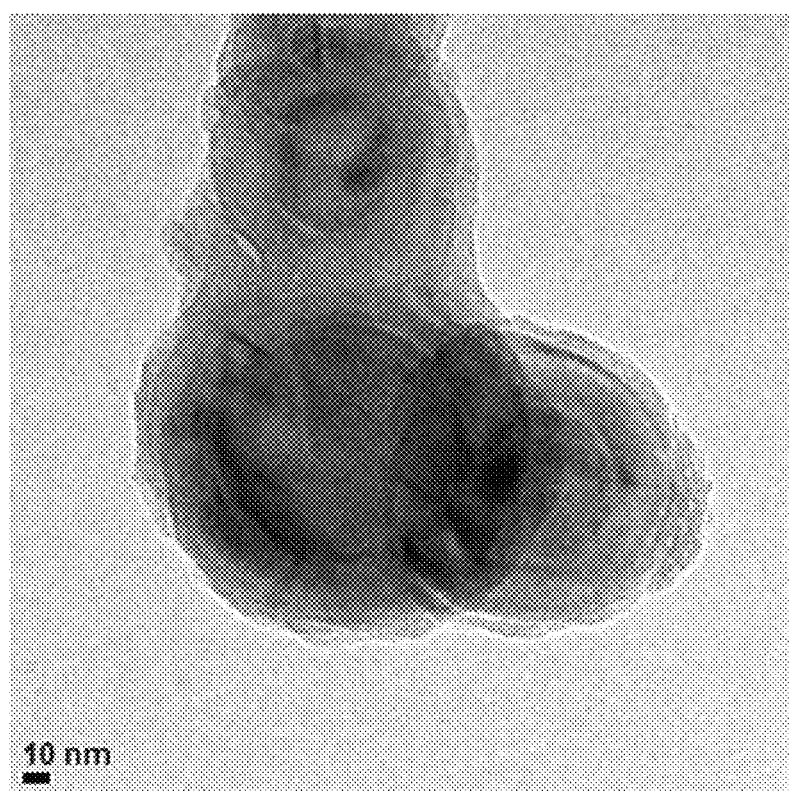
FIGS. 52A and 52B illustrate TEM and HRTEM images of a resulting material obtained in Experimental Example 25, respectively.
Figure 52B:
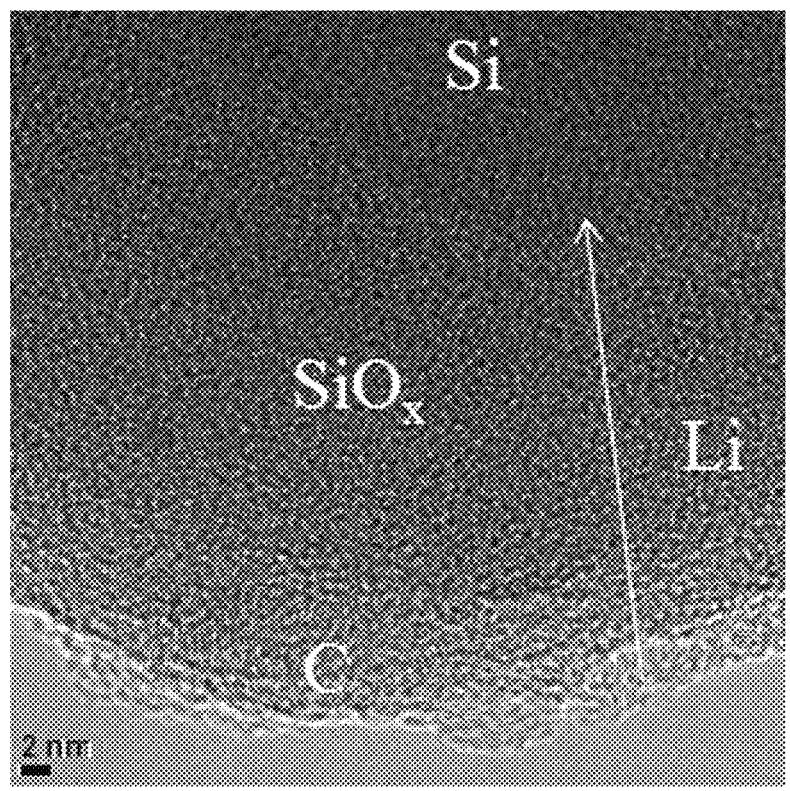

FIGS. 52A and 52B illustrate TEM and HRTEM images of the obtained resulting material, respectively. In FIGS. 52A and 52B, in the case of supplying only the lithium source, it can be seen that an amorphous $SiO_x$ layer on the Si surface and a very thin crystalline carbon layer thereon are formed and lithium is randomly doped.

Experimental Example 26

Si—SiOx nanoparticles having a diameter of about 100 nm and crystallinity, a carbon source, and a lithium source were mixed together and then supplied to an autoclave. As the carbon source, benzene was used and as the lithium source, lithium acetylacetonate was used.

Figure 53:
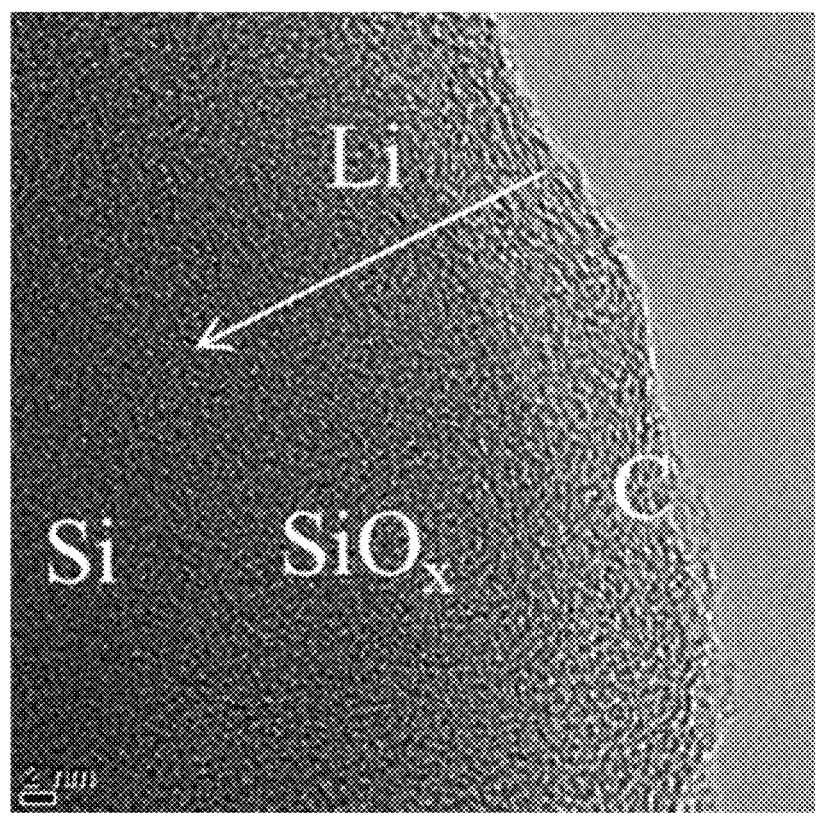
FIG. 53 illustrates an HRTEM image of a resulting material obtained in Experimental Example 26.

FIG. 53 illustrates an HRTEM image of the obtained resulting material. In the case of supplying both the carbon source and the lithium source, it can be seen that an amorphous $SiO_x$ layer on the Si surface and a very thick crystalline carbon layer thereon are formed and lithium is randomly doped.

Experimental Example 27

Si—SiOx nanoparticles, a carbon source, and a lithium source were mixed together and then supplied to an autoclave. As the carbon source, pyridine containing nitrogen was used and as the lithium source, lithium acetylacetonate was used.

Figure 54:
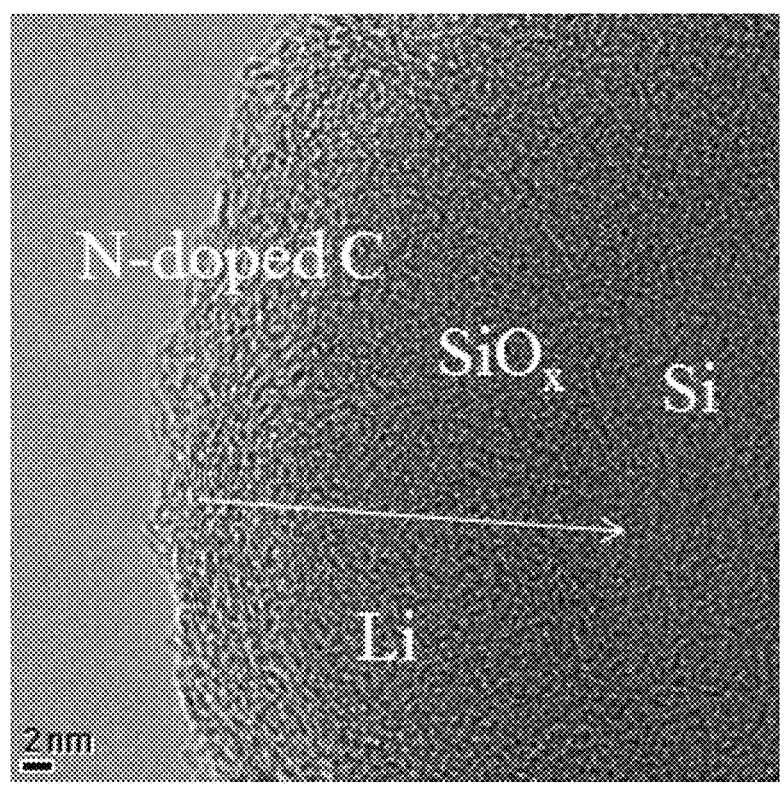
FIG. 54 illustrates an HRTEM image of a resulting material obtained in Experimental Example 27.

FIG. 54 illustrates an HRTEM image of the obtained resulting material. In the case of supplying both the carbon source containing nitrogen and the lithium source, it can be seen that an amorphous $SiO_x$ layer on the Si surface and a very thick N-doped crystalline carbon layer thereon are formed and lithium is randomly doped.

Experimental Example 28

First, Si—SiOx nanoparticles and lithium acetylacetonate reacted with each other for 1 hour in a temperature range of 450 to 750° C. to primarily synthesize lithium doped C—SiOx-Si.

Subsequently, the lithium doped C—SiOx-Si and pyridine as a carbon source containing nitrogen were mixed and reacted with each other for 1 hour in a temperature range of 750 to 950° C. to secondarily synthesize N-doped C—SiLiOx-LiSi containing nitrogen doped carbon coating.

Figure 55:
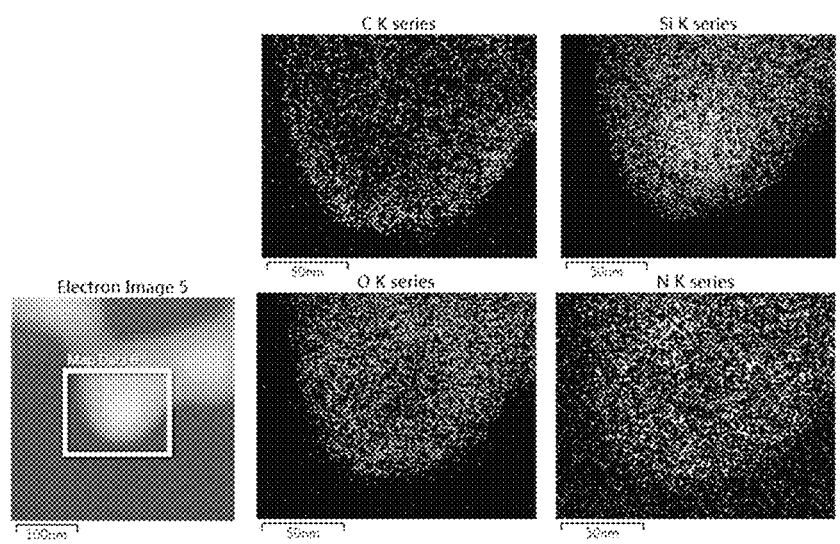
FIG. 55 illustrates an EDX mapping result of a resulting material obtained in Experimental Example 27.

An energy dispersive X-ray (EDX) mapping result for the secondarily synthesized resulting material is illustrated in FIG. 55. In FIG. 55, it can be seen that amorphous $SiLiO_x$ is formed on the Si surface and a metallic Li is partially doped in Si. Further, it can be seen that a very thick N doped crystalline carbon layer is formed in the secondary synthesis to finally obtain a N doped C—$SiLiO_x$-LiSi structure.

Further, as a result of performing an electron energy loss spectroscopy (EELS) measurement, Si and Li are not discovered on the carbon layer, but Si and Li components are observed in the SiOx part and thus this part is SiLiOx, and Si and Li components are observed in the Si part and thus this part is SiLi.

According to the method described with reference to FIGS. 47 to 55, lithium doped SiOx-Si, lithium doped C—SiOx-Si, lithium doped N-doped C—SiOx-Si, carbon coated SiLiOx-LiSi, and doped-carbon coated SiLiOx-LiSi may be easily produced. The formed nanoparticles can reduce an amount of ions which are consumed in the oxide layer during charging and discharging of lithium ions. Accordingly, the materials are used as a lithium battery electrode to largely improve performance of the lithium battery.

Hereinafter, in Experimental Examples, a method of carbon coating on nanoparticles or a method of doped carbon coating using waste plastic will be described.

Experimental Example 29

Si nanoparticles having a diameter of about 100 nm and crystallinity and a waste polystyrene film $(C_8H_8)_n$) as a carbon source were supplied in an autoclave at atmospheric pressure and room temperature. The autoclave was fully closed and a temperature was increased to 750° C., and then reaction was performed for 1 hour. After the reaction was completed, the autoclave was cooled to the room temperature and when the temperature of the autoclave dropped to the room temperature, a pressure control valve was slowly opened in order to lower the pressure in the autoclave to the atmospheric pressure, and then a Si nanoparticle-carbon core-shell structure was obtained.

Figure 56:
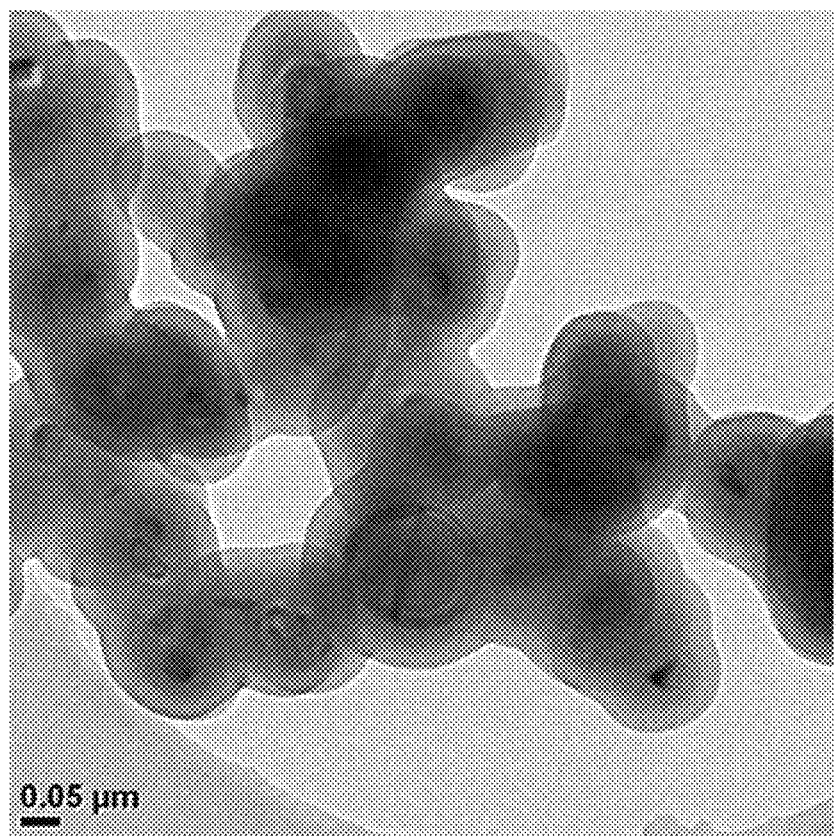
FIG. 56 illustrates a TEM image of a resulting material obtained in Experimental Example 29.

FIG. 56 is a TEM photograph for a synthesized resulting material and it can be seen that a uniform carbon layer of about 10 nm is coated on the surface of the Si nanoparticle.

Experimental Example 30

Except for using a waste polypropylene film $((C_3H_6)_n)$ instead of the waste polystyrene film, Experimental Example 30 is performed the same as Experimental Example 1 to obtain a synthesized resulting material.

Figure 57:
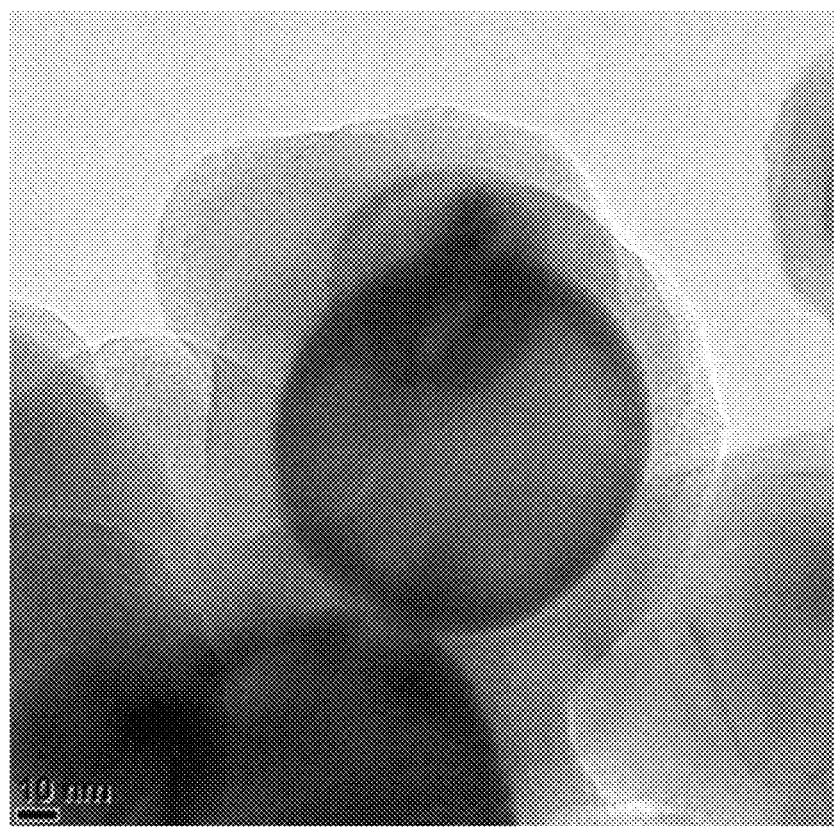
FIG. 57 illustrates a TEM image of a resulting material obtained in Experimental Example 30.

FIG. 57 is a TEM photograph for a synthesized resulting material and it can be seen that a uniform carbon layer of about 10 nm is coated on the surface of the Si nanoparticle.

Experimental Example 31

Except for using a waste polyethylene glove $((C_2H_4)_n)$ instead of the waste polystyrene film, Experimental Example 31 is performed the same as Experimental Example 1 to obtain a synthesized resulting material.

Figure 58:
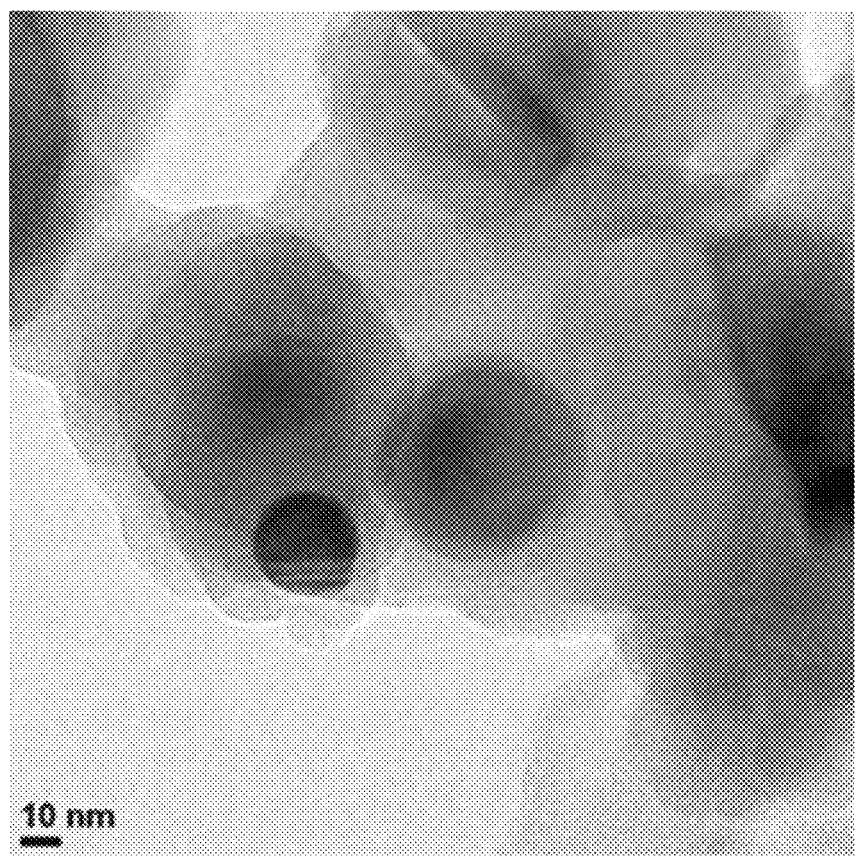
FIG. 58 illustrates a TEM image of a resulting material obtained in Experimental Example 31.

FIG. 58 is a TEM photograph for a synthesized resulting material and it can be seen that a uniform carbon layer of about 10 nm is coated on the surface of the Si nanoparticle.

Experimental Example 32

Except for using acrylonitrile butadiene styrene (ABS) $((C_8H_8.C_4H_6.C_3H_3N)_n)$ instead of the waste polystyrene film, Experimental Example 32 is performed the same as Experimental Example 1 to obtain a synthesized resulting material.

Figure 59A:
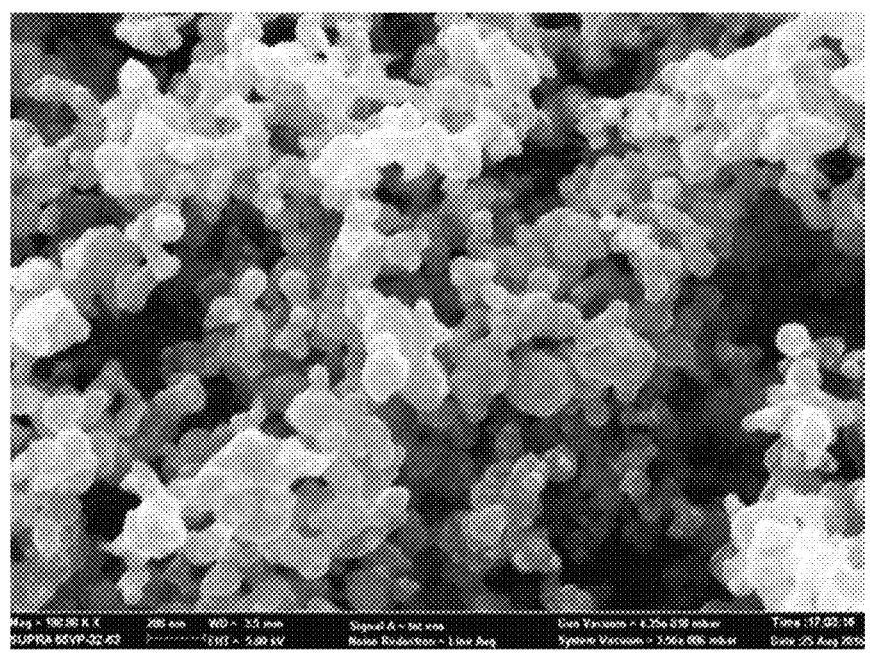
FIG. 59A is an SEM photograph for a resulting material obtained in Experimental Example 32.
Figure 59B:
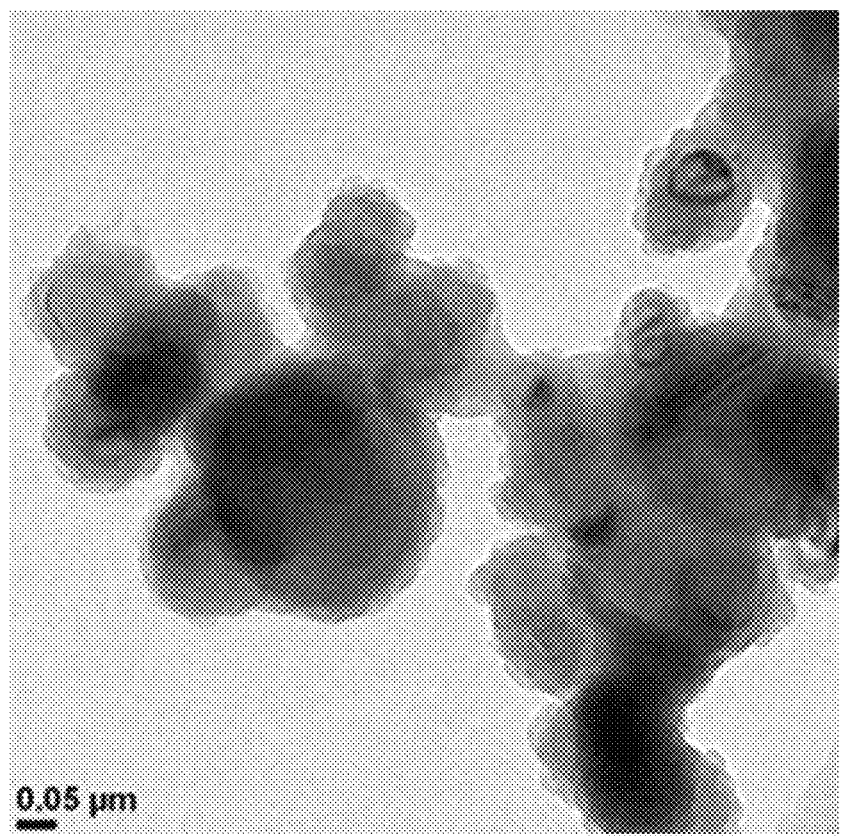
FIG. 59B is a TEM photograph therefor.
Figure 59C:
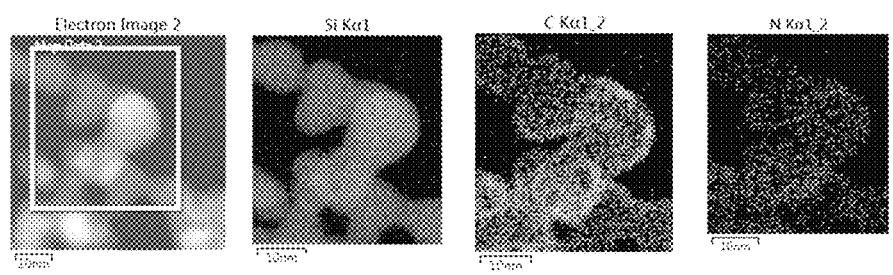
FIG. 59C is an EDX mapping photograph therefor.

FIG. 59A is a scanning electron microscopy (SEM) photograph for the synthesized resulting material, FIG. 59B is a TEM photograph therefor, and FIG. 59C is an EDX mapping photograph therefor. From the photographs of FIGS. 59A to 59C, it can be seen that a uniform N-doped carbon layer of about 10 nm is coated on the surface of the Si nanoparticle.

Experimental Example 33

Except for using a waste polystyrene foam instead of the waste polystyrene film and further adding and using pyridine as an N doped source, Experimental Example 33 is performed the same as Experimental Example 1 to obtain a synthesized resulting material.

Figure 60A:
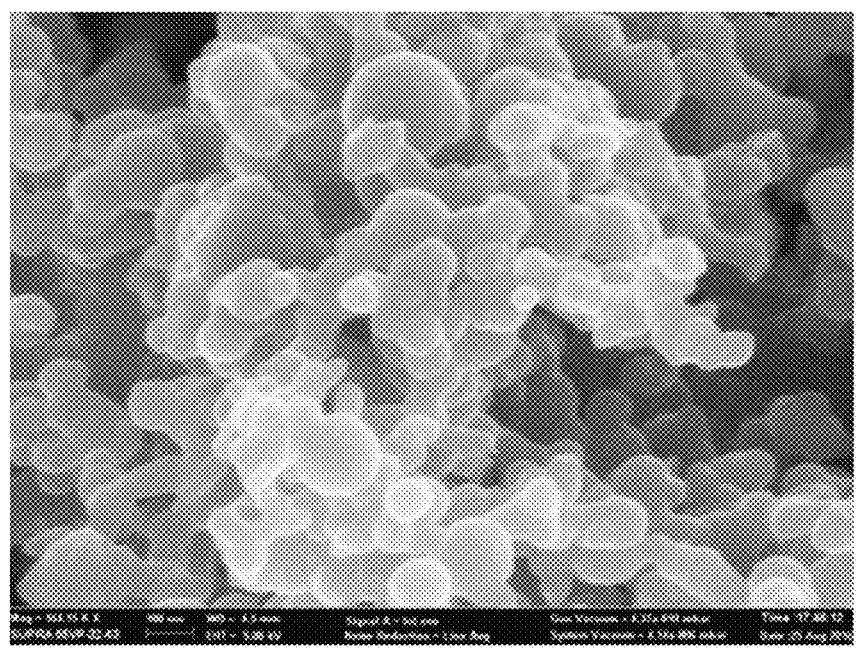
FIG. 60A is an SEM photograph for a resulting material obtained in Experimental Example 33.
Figure 60B:
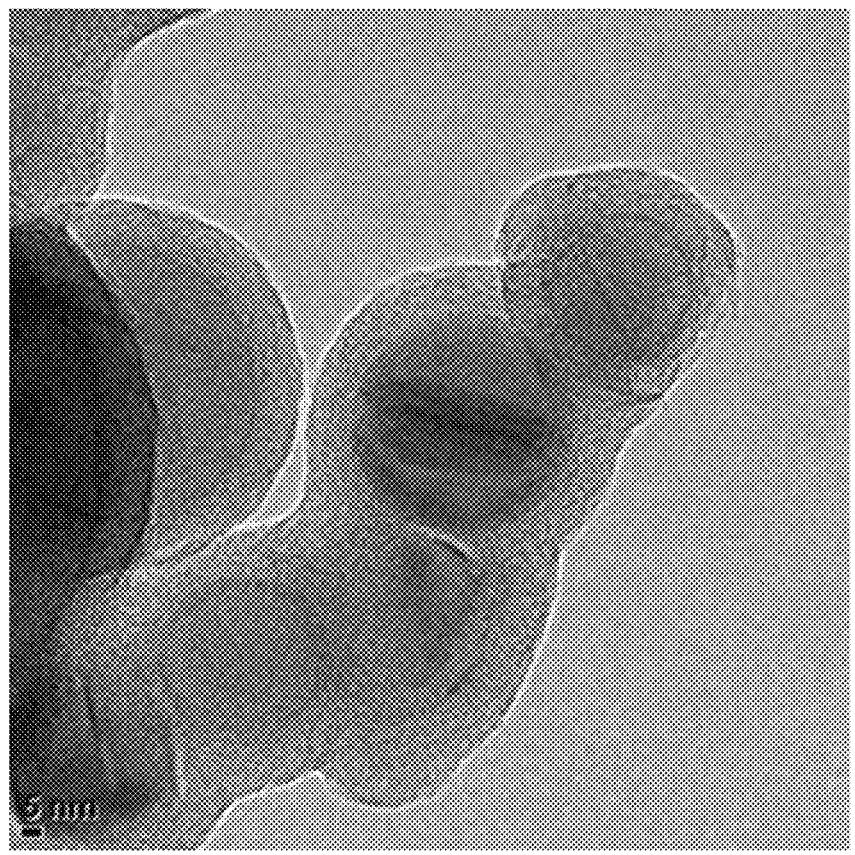
FIG. 60B is a TEM photograph therefor.
Figure 60C:
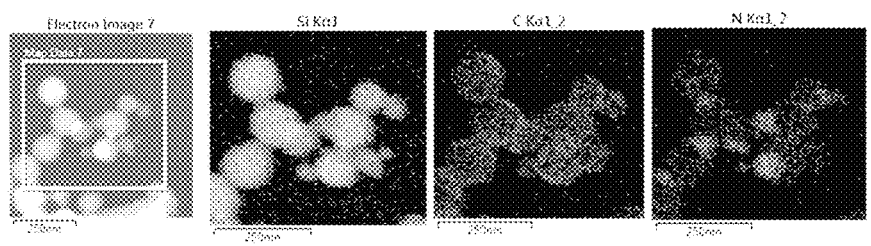
FIG. 60C is an EDX mapping photograph therefor.

FIG. 60A is an SEM photograph for the synthesized resulting material, FIG. 60B is a TEM photograph therefor, and FIG. 60C is an EDX mapping photograph therefor. From the photographs of FIGS. 60A to 60C, it can be seen that a uniform N-doped carbon layer of about 10 nm is coated on the surface of the Si nanoparticle.

Experimental Example 34

Like Experimental Example 31, a synthesis reaction is performed by using a waste polyethylene glove, and then heat treatment is further performed for about 1 hr by immediately increasing a temperature to 950° C. and supplying hydrogen gas (20 Vol/% $H_2$ in Ar) in the same autoclave.

Figure 61:
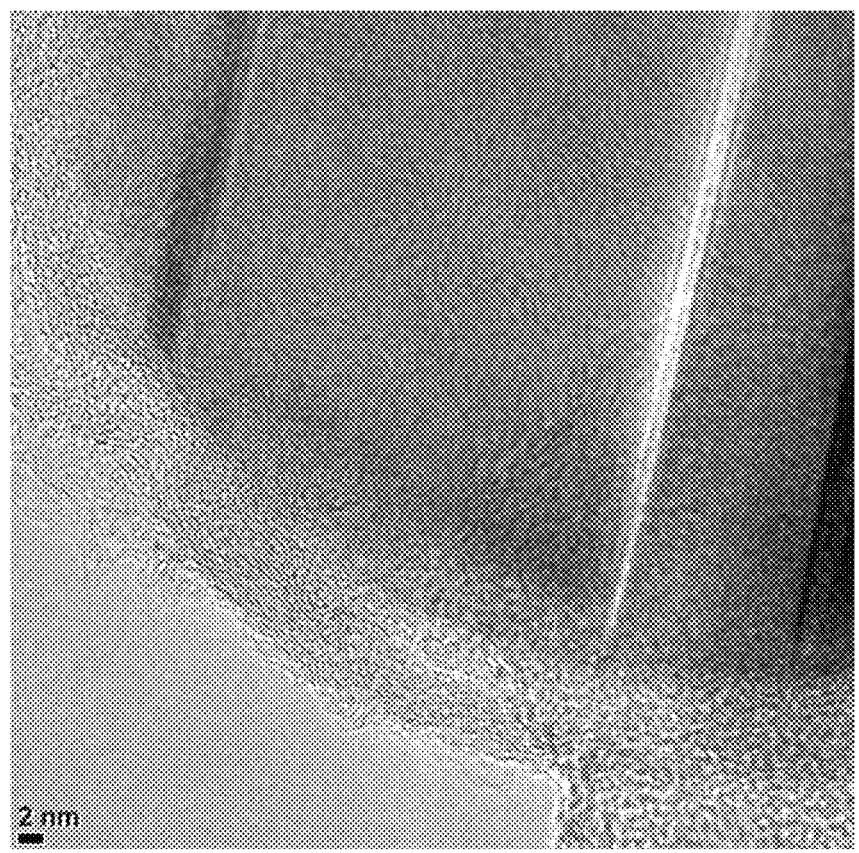
FIG. 61 illustrates a TEM image of a resulting material obtained in Experimental Example 34.

FIG. 61 is a TEM photograph for a synthesized resulting material and it can be seen that a uniform carbon layer of about 10 nm is coated on the surface of the Si nanoparticle and the crystallinity of the carbon layer is further improved.

According to the method of carbon coating on the nanoparticle or the method of doped carbon coating using the waste plastic described with reference to FIGS. 56 to 61, the waste plastic which can cause serious environmental pollution when is not naturally decomposed but left in an environment as it is can be reused as a very economical method. Particularly, materials which can be applied in much various fields including electrochemical materials such as fuel cells, batteries, and reverse electrodialysis salinity gradient power generation, application using magnetic materials such as a ultra-conductor or a bio-diagnostic material, desalination materials, and the like by using the waste plastic can be economically synthesized.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A method including:
   supplying only nanoparticles and sources of any one or two or more combinations selected from a group which consists of a carbon source, a doping source, a carbon source capable of providing a doped element, and a waste plastic source into a high-temperature and high-pressure closed autoclave;
   completely closing the high-temperature and high-pressure closed autoclave; and
   forming a core-shell structure of the nanoparticle-a carbon shell or a core-shell structure of the nanoparticle-a carbon shell having the doped element by a single process under self-generated pressure and a first reaction temperature in the range of 500 to 850° C. by heating the autoclave,
   wherein the method further comprises an additional functioning:
   making the autoclave to a high-temperature and atmospheric state by removing gas from the autoclave in a state of high-temperature and high-pressure and thereafter, purging the autoclave by using an inert gas;
   changing temperature up to a second reaction temperature for functioning and performing reaction while supplying a reaction gas; and
   cooling the autoclave to room-temperature while purging the autoclave with an inert gas.

2. The method of claim 1, wherein
   the sources are used to form the carbon shell or the carbon shell having the doped element without loss during the forming of the core-shell structure of the nanoparticle-a carbon shell or the core-shell structure of the nanoparticle-a carbon shell having the doped element.

3. The method of claim 1, wherein
   the sources are solid and the sources are supplied based on a weight ratio (wt % ratio) of the nanoparticles and the carbon source,
   the sources are the liquid and the sources are supplied based on a volume ratio (Vol % ratio) of a capacity of the autoclave and the carbon source, and
   the source is gas and the sources are supplied based on a pressure of the gas, which is set based on the volume of the autoclave.

4. The method of claim 1, wherein
   the carbon source is benzene ($C_6H_6$), toluene ($C_7H_8$), styrene ($C_8H_8$), indene ($C_9H_8$), hexane ($C_6H_{14}$), octane ($C_8H_{18}$), paraffin oil ($C_xH_y$), naphthalene ($C_{10}H_8$), anthracene ($C_{14}H_{10}$), fluorene ($C_{13}H_{10}$), solid paraffin ($C_xH_y$), pyrene ($C_{16}H_{10}$) or polymers, polyethylene ($C_2H_4$)n/polypropylene($C_3H_6$)n/polystyrene ($C_8H_8$)n which consist of monomers having 2 to 8 carbon atoms, acetylene ($C_2H_2$), ethylene ($C_2H_4$), propane ($C_3H_8$), or methane ($CH_4$),
   the doped element is N and the carbon source capable of providing doped element is melamine ($C_3H_6N_6$), pyridine ($C_5H_5N$), acrylonitrile ($C_3H_3N$), Pyrrole ($C_4H_5N$), or mixed gas of ammonia ($NH_3$) and hydrocarbon gas,
   the doped element is P and the carbon source capable of providing doped element is tributylphosphine ([$CH_3(CH_2)_3$]$_3$P) or phosphorine ($C_5H_5P$),
   the doped element is B and the carbon source capable of providing doped element is triphenylborane ((C6H5)3B), borinine (C5H5B), triethylborane ((C2H5)3B), trimethylboron (B(CH3)3), or trimethylboron-d9 (B(CD3)3),
   the doped element is Li and the carbon source capable of providing doped element is lithium acetylacetonate ($LiO_2C_5H_7$), lithium carbonante ($Li_2CO_3$), lithium sulfide (LiS), lithium hydride (LiH), lithium dimethylamide ($NLi(CH_3)_2$), or lithium acetoacetate ($LiO_3C_4H_5$),
   the doped element is two types or more and the carbon source capable of providing doped element is borane dimethylamine, borane pyridine, borane trimethylamine, borane-ammonia, tetrabutylammonium cyanoborohydride, ammonium tetraphenylborate, tetrabutylammonium borohydride, tetramethylammonium triacetoxyborohydride, 2,4,6-triphenylborazine, or borane diphenylphosphine, or
   the waste plastic source is polyethylene, polypropylene, polystyrene, or acrylonitrile butadiene styrene.

5. The method of claim 1, wherein
   the doped element is N and the N doped carbon is any one selected from a group which consists of pyridine type N, pyrrole type N, and quaternary type N.

6. The method of claim 1, wherein
   the waste plastic source is supplied while being mixed with liquid carbon source and doping containing carbon source.

7. The method of claim 1, wherein
   the nanoparticles are metal, a metal oxide, a semiconductor material, or a semiconductor oxide.

8. The method of claim 1, wherein:
   the nanoparticles in the supplying are the metal oxide or semiconductor oxide nanoparticles, and
   the metal oxide is reduced to the metal or the semiconductor oxide is reduced to the semiconductor material by further performing hydrogen heat treatment.

9. The method of claim 1, wherein:
   crystallinity of the shell is increased by further performing subsequent heat treatment.

10. The method of claim 1, wherein:
    the shell is functionalized by further performing subsequent coating treatment.

11. The method of claim 1, wherein:
    the plurality of nanoparticle-carbon core-shell structures or the plurality of core-shell structured of the nanoparticle-doped carbon are coated with a carbon layer or a doped carbon layer again to form a carbon shell connection structure having a micron size.

12. The method of claim 1, wherein:
the nanoparticle-carbon core-shell structure or the core-shell structure of the nanoparticle-doped carbon is synthesized,
a state of the autoclave is made to an atmospheric-pressure and high-temperature state by removing non-reaction gas which remains in the autoclave while reaction is not completed,
hydrogen gas is collected and the gas is removed in the process of removing the non-reaction gas, and
the nanoparticle-carbon core-shell structure or the core-shell structure of the nanoparticle-doped carbon is functionalized while controlling a temperature of the autoclave or supply of reaction gas.

* * * * *